United States Patent
Baird-Smith

(10) Patent No.: US 10,559,027 B2
(45) Date of Patent: Feb. 11, 2020

(54) METHODS AND SYSTEMS TO PROCESS A SELECTION OF A BROWSER BACK BUTTON

(71) Applicant: eBay Inc., San Jose, CA (US)

(72) Inventor: Anselm Paul Baird-Smith, Boulogne-Billancourt (FR)

(73) Assignee: eBay Inc., San Jose, CA (US)

( * ) Notice: Subject to any disclaimer, the term of this patent is extended or adjusted under 35 U.S.C. 154(b) by 1027 days.

(21) Appl. No.: 14/809,496

(22) Filed: Jul. 27, 2015

(65) Prior Publication Data

US 2015/0331591 A1 Nov. 19, 2015

Related U.S. Application Data

(63) Continuation of application No. 11/241,824, filed on Sep. 29, 2005, now Pat. No. 9,134,884.
(Continued)

(51) Int. Cl.
*G06F 3/0481* (2013.01)
*G09G 5/14* (2006.01)
(Continued)

(52) U.S. Cl.
CPC ....... *G06Q 30/0641* (2013.01); *G06F 3/0484* (2013.01); *G06F 3/04842* (2013.01);
(Continued)

(58) Field of Classification Search
CPC .... G06F 3/0481; G06F 3/0482; G06F 3/0483; G06F 9/4443; G09G 5/14; H04N 5/44591
See application file for complete search history.

(56) References Cited

U.S. PATENT DOCUMENTS 5,175,681 A 12/1992 Iwai et al.
5,537,586 A 7/1996 Amram et al.
(Continued)

FOREIGN PATENT DOCUMENTS

CN 1293785 A 5/2001
CN 1333896 A 1/2002
(Continued)

OTHER PUBLICATIONS

"U.S. Appl. No. 09/730,538, Advisory Action dated May 9, 2007", 3 pgs.
(Continued)

*Primary Examiner* — Arpan P. Savla
*Assistant Examiner* — Erik V Stitt
(74) *Attorney, Agent, or Firm* — SBMC

(57) ABSTRACT

Methods and systems to process a selection of a browser back button are described. The system includes a server that receives a request, over a network, for an initial user interface and communicates the initial user interface to a client machine. The initial user interface includes a client application program that monitors and identifies whether a storage location in a hidden frame is updated by a browser. The browser updates the storage location with a first user interface identifier in response to receipt of a single browser back navigation element selection. The client application program associates the first user interface identifier to a second user interface identifier responsive to the identification of the storage location as being updated. The client application program displays the second user interface in a visible frame responsive to the identification of the storage location as being updated.

20 Claims, 38 Drawing Sheets

Related U.S. Application Data

(60) Provisional application No. 60/666,549, filed on Mar. 30, 2005.

(51) Int. Cl.

| | | |
|---|---|---|
| *G06F 3/0482* | (2013.01) | |
| *G06Q 30/06* | (2012.01) | |
| *G06F 3/0484* | (2013.01) | |
| *H04L 29/08* | (2006.01) | |
| *H04L 29/06* | (2006.01) | |
| *G06F 16/955* | (2019.01) | |
| *G06F 16/957* | (2019.01) | |
| *G06F 16/9038* | (2019.01) | |
| *G06Q 30/08* | (2012.01) | |

(52) U.S. Cl.
CPC ........ *G06F 16/9038* (2019.01); *G06F 16/955* (2019.01); *G06F 16/957* (2019.01); *G06Q 30/06* (2013.01); *G06Q 30/0601* (2013.01); *G06Q 30/0603* (2013.01); *G06Q 30/08* (2013.01); *H04L 67/02* (2013.01); *H04L 67/42* (2013.01)

(56) References Cited

U.S. PATENT DOCUMENTS

| | | |
|---|---|---|
| 5,740,425 A | 4/1998 | Povilus |
| 5,787,417 A | 7/1998 | Hargrove |
| 5,822,123 A | 10/1998 | Davis et al. |
| 5,844,554 A | 12/1998 | Geller et al. |
| 5,845,278 A | 12/1998 | Kirsch et al. |
| 5,848,424 A | 12/1998 | Scheinkman et al. |
| 5,950,173 A | 5/1999 | Perkowski |
| 5,969,717 A | 10/1999 | Ikemoto |
| 6,029,141 A | 2/2000 | Bezos et al. |
| 6,038,560 A | 3/2000 | Wical |
| 6,044,363 A | 3/2000 | Mori et al. |
| 6,076,088 A | 6/2000 | Paik et al. |
| 6,083,276 A | 7/2000 | Davidson et al. |
| 6,119,101 A | 9/2000 | Peckover |
| 6,122,648 A | 9/2000 | Roderick |
| 6,144,958 A | 11/2000 | Ortega et al. |
| 6,151,601 A | 11/2000 | Papierniak et al. |
| 6,185,558 B1 | 2/2001 | Bowman et al. |
| 6,216,264 B1 | 4/2001 | Maze et al. |
| 6,230,156 B1 | 5/2001 | Hussey |
| 6,233,571 B1 | 5/2001 | Egger et al. |
| 6,237,030 B1 * | 5/2001 | Adams ................ G06F 16/9574 709/218 |
| 6,256,623 B1 | 7/2001 | Jones |
| 6,266,649 B1 | 7/2001 | Linden et al. |
| 6,311,194 B1 | 10/2001 | Sheth et al. |
| 6,313,854 B1 * | 11/2001 | Gibson .................... G09G 5/14 715/788 |
| 6,345,315 B1 | 2/2002 | Mishra |
| 6,351,755 B1 | 2/2002 | Najork et al. |
| 6,366,914 B1 | 4/2002 | Stern |
| 6,385,602 B1 | 5/2002 | Tso et al. |
| 6,400,996 B1 | 6/2002 | Hoffberg et al. |
| 6,401,084 B1 | 6/2002 | Ortega et al. |
| 6,410,084 B1 | 6/2002 | Klare et al. |
| 6,434,556 B1 | 8/2002 | Levin et al. |
| 6,453,312 B1 | 9/2002 | Goiffon et al. |
| 6,453,339 B1 | 9/2002 | Schultz et al. |
| 6,460,058 B2 | 10/2002 | Koppolu et al. |
| 6,470,383 B1 * | 10/2002 | Leshem .................. G06F 11/32 709/223 |
| 6,476,833 B1 | 11/2002 | Moshfeghi |
| 6,490,567 B1 | 12/2002 | Gregory |
| 6,493,000 B1 * | 12/2002 | Wynn ................ G06F 17/30861 707/E17.107 |
| 6,498,795 B1 | 12/2002 | Zhang et al. |
| 6,510,434 B1 | 1/2003 | Anderson et al. |
| 6,539,377 B1 | 3/2003 | Culliss |
| 6,549,935 B1 | 4/2003 | Lapstun et al. |
| 6,553,404 B2 | 4/2003 | Stern |
| 6,567,797 B1 | 5/2003 | Schuetze et al. |
| 6,574,609 B1 | 6/2003 | Downs et al. |
| 6,587,837 B1 | 7/2003 | Spagna et al. |
| 6,597,381 B1 | 7/2003 | Eskridge et al. |
| 6,598,026 B1 | 7/2003 | Ojha et al. |
| 6,606,619 B2 | 8/2003 | Ortega et al. |
| 6,611,812 B2 | 8/2003 | Hurtado et al. |
| 6,631,522 B1 | 10/2003 | Erdelyi |
| 6,633,316 B1 | 10/2003 | Maddalozzo et al. |
| 6,641,037 B2 | 11/2003 | Williams |
| 6,647,383 B1 | 11/2003 | August et al. |
| 6,665,379 B1 | 12/2003 | Brown et al. |
| 6,667,751 B1 | 12/2003 | Wynn et al. |
| 6,668,273 B1 | 12/2003 | Rust |
| 6,697,800 B1 | 2/2004 | Jannink et al. |
| 6,697,823 B2 | 2/2004 | Otsuka et al. |
| 6,697,824 B1 | 2/2004 | Bowman-Amuah |
| 6,727,927 B1 | 4/2004 | Dempski |
| 6,732,088 B1 | 5/2004 | Glance |
| 6,760,890 B2 | 7/2004 | Makinen |
| 6,785,671 B1 | 8/2004 | Bailey et al. |
| 6,801,229 B1 | 10/2004 | Tinkler |
| 6,810,333 B2 | 10/2004 | Adedeji et al. |
| 6,820,111 B1 | 11/2004 | Rubin et al. |
| 6,853,982 B2 | 2/2005 | Smith et al. |
| 6,856,967 B1 | 2/2005 | Woolston et al. |
| 6,892,193 B2 | 5/2005 | Bolle et al. |
| 6,904,410 B1 | 6/2005 | Weiss et al. |
| 6,907,574 B2 | 6/2005 | Xu et al. |
| 6,928,425 B2 | 8/2005 | Grefenstette |
| 6,948,120 B1 | 9/2005 | Delgobbo et al. |
| 6,963,867 B2 | 11/2005 | Ford et al. |
| 6,976,053 B1 | 12/2005 | Tripp et al. |
| 6,978,264 B2 | 12/2005 | Chandrasekar et al. |
| 6,978,445 B2 | 12/2005 | Laane |
| 6,990,534 B2 | 1/2006 | Mikhailov et al. |
| 7,013,423 B2 | 3/2006 | Blaschke et al. |
| 7,085,736 B2 | 8/2006 | Keezer et al. |
| 7,099,885 B2 | 8/2006 | Hellman et al. |
| 7,114,128 B2 | 9/2006 | Koppolu et al. |
| 7,146,627 B1 | 12/2006 | Ismail |
| 7,203,615 B2 | 4/2007 | Mao et al. |
| 7,203,675 B1 | 4/2007 | Papierniak et al. |
| 7,225,199 B1 | 5/2007 | Green et al. |
| 7,228,298 B1 | 6/2007 | Raines |
| 7,277,879 B2 | 10/2007 | Varadarajan |
| 7,295,995 B1 | 11/2007 | York et al. |
| 7,362,311 B2 | 4/2008 | Filner et al. |
| 7,366,721 B1 | 4/2008 | Bennett et al. |
| 7,395,502 B2 | 7/2008 | Gibbons et al. |
| 7,421,421 B2 | 9/2008 | Newbold |
| 7,429,987 B2 | 9/2008 | Leah et al. |
| 7,430,739 B2 | 9/2008 | Vellanki et al. |
| 7,447,646 B1 | 11/2008 | Agarwal et al. |
| 7,480,872 B1 | 1/2009 | Ubillos |
| 7,536,672 B1 | 5/2009 | Ruehle |
| 7,546,539 B2 * | 6/2009 | Kibilov ............ G06F 17/30876 715/712 |
| 7,564,377 B2 | 7/2009 | Kimchi et al. |
| 7,634,461 B2 | 12/2009 | Oral et al. |
| 7,640,267 B2 | 12/2009 | Spivack et al. |
| 7,673,340 B1 | 3/2010 | Cohen et al. |
| 7,685,074 B2 | 3/2010 | Linden et al. |
| 7,720,315 B2 | 5/2010 | Mirtich et al. |
| 7,761,791 B2 | 7/2010 | Kobashi et al. |
| 7,831,601 B2 | 11/2010 | Oral |
| 7,882,447 B2 | 2/2011 | Chandler et al. |
| 7,886,156 B2 | 2/2011 | Franchi |
| 7,890,533 B2 | 2/2011 | Pollara |
| 8,086,502 B2 | 12/2011 | Krishnamurthy et al. |
| 8,090,698 B2 | 1/2012 | Billingsley et al. |
| 8,126,907 B2 | 2/2012 | Knighton et al. |
| 8,194,985 B2 | 6/2012 | Grigsby et al. |
| 8,260,656 B1 | 9/2012 | Harbick et al. |
| 8,260,764 B1 | 9/2012 | Gruber |
| 8,261,196 B2 | 9/2012 | Oral et al. |

(56) References Cited

U.S. PATENT DOCUMENTS

| | | |
|---|---|---|
| 8,301,512 B2 | 10/2012 | Hamilton et al. |
| 8,306,872 B2 | 11/2012 | Inoue et al. |
| 8,402,068 B2 | 3/2013 | Clendinning et al. |
| 8,489,438 B1 | 7/2013 | Ibrahim |
| 8,688,535 B2 | 4/2014 | Yuan |
| 8,768,937 B2 | 7/2014 | Clendinning et al. |
| 8,819,039 B2 | 8/2014 | Grove et al. |
| 8,849,693 B1 | 9/2014 | Koyfman et al. |
| 8,863,002 B2 | 10/2014 | Chandler et al. |
| 8,924,377 B2 | 12/2014 | Wade et al. |
| 8,972,899 B2 | 3/2015 | Carlsson et al. |
| 9,058,332 B1 | 6/2015 | Darby |
| 9,076,173 B2 | 7/2015 | Hamilton et al. |
| 9,134,884 B2 | 9/2015 | Baird-Smith |
| 9,171,056 B2 | 10/2015 | Clendinning et al. |
| 9,262,056 B2 | 2/2016 | Leon et al. |
| 9,286,412 B2 | 3/2016 | Maslovskis |
| 9,412,128 B2 | 8/2016 | Clendinning et al. |
| 9,436,660 B2 | 9/2016 | Carreno-fuentes et al. |
| 9,710,841 B2 | 7/2017 | Ainsworth, III et al. |
| 9,740,996 B2 | 8/2017 | Gao |
| 10,497,051 B2 | 12/2019 | Leon et al. |
| 2001/0011276 A1 | 8/2001 | Durst, Jr. et al. |
| 2001/0031251 A1 | 10/2001 | Bologna et al. |
| 2001/0032163 A1 | 10/2001 | Fertik et al. |
| 2001/0037251 A1 | 11/2001 | Nojima et al. |
| 2002/0004735 A1 | 1/2002 | Gross |
| 2002/0010794 A1 | 1/2002 | Stanbach, Jr. et al. |
| 2002/0016839 A1 | 2/2002 | Smith et al. |
| 2002/0026353 A1 | 2/2002 | Porat et al. |
| 2002/0040359 A1 | 4/2002 | Green et al. |
| 2002/0052894 A1 | 5/2002 | Bourdoncle et al. |
| 2002/0055878 A1 | 5/2002 | Burton et al. |
| 2002/0057297 A1 | 5/2002 | Grimes et al. |
| 2002/0060702 A1 | 5/2002 | Sugimoto et al. |
| 2002/0077900 A1 | 6/2002 | Thompson et al. |
| 2002/0080157 A1 | 6/2002 | Chickles et al. |
| 2002/0082893 A1 | 6/2002 | Barts et al. |
| 2002/0082953 A1 | 6/2002 | Batham et al. |
| 2002/0083448 A1 | 6/2002 | Johnson |
| 2002/0103789 A1 | 8/2002 | Turnbull et al. |
| 2002/0103791 A1 | 8/2002 | Janz et al. |
| 2002/0103797 A1 | 8/2002 | Goel et al. |
| 2002/0107861 A1 | 8/2002 | Clendinning et al. |
| 2002/0120554 A1 | 8/2002 | Vega |
| 2002/0120619 A1 | 8/2002 | Marso et al. |
| 2002/0123912 A1 | 9/2002 | Subramanian et al. |
| 2002/0135567 A1 | 9/2002 | Chan |
| 2002/0152222 A1 | 10/2002 | Holbrook |
| 2002/0154157 A1 | 10/2002 | Sherr et al. |
| 2002/0156688 A1 | 10/2002 | Horn et al. |
| 2002/0188527 A1 | 12/2002 | Dillard et al. |
| 2002/0194081 A1 | 12/2002 | Perkowski |
| 2002/0194087 A1 | 12/2002 | Spiegel et al. |
| 2003/0009495 A1 | 1/2003 | Adjaoute |
| 2003/0018652 A1 | 1/2003 | Heckerman et al. |
| 2003/0020449 A1 | 1/2003 | Smith |
| 2003/0025737 A1 | 2/2003 | Breinberg |
| 2003/0033161 A1 | 2/2003 | Walker et al. |
| 2003/0036964 A1 | 2/2003 | Boyden et al. |
| 2003/0050893 A1 | 3/2003 | Hirabayashi |
| 2003/0050916 A1 | 3/2003 | Ortega et al. |
| 2003/0055806 A1 | 3/2003 | Wong et al. |
| 2003/0061147 A1 | 3/2003 | Fluhr et al. |
| 2003/0066031 A1* | 4/2003 | Laane ............... G06F 17/30899 715/234 |
| 2003/0071832 A1 | 4/2003 | Branson |
| 2003/0074368 A1 | 4/2003 | Schuetze et al. |
| 2003/0074369 A1 | 4/2003 | Schuetze et al. |
| 2003/0078747 A1 | 4/2003 | Sutton |
| 2003/0083961 A1 | 5/2003 | Bezos et al. |
| 2003/0093585 A1* | 5/2003 | Allan ............... G06F 17/3089 719/330 |
| 2003/0105682 A1 | 6/2003 | Dicker et al. |
| 2003/0105853 A1 | 6/2003 | Morito et al. |
| 2003/0115167 A1* | 6/2003 | Sharif ............... G06F 3/0489 |
| 2003/0123850 A1 | 7/2003 | Jun et al. |
| 2003/0154044 A1 | 8/2003 | Lundstedt et al. |
| 2003/0167213 A1 | 9/2003 | Jammes et al. |
| 2003/0171911 A1 | 9/2003 | Fairweather |
| 2003/0172060 A1 | 9/2003 | Uchikado |
| 2003/0172357 A1 | 9/2003 | Kao et al. |
| 2003/0182310 A1 | 9/2003 | Charnock et al. |
| 2003/0195877 A1 | 10/2003 | Ford et al. |
| 2003/0200156 A1 | 10/2003 | Roseman et al. |
| 2003/0204449 A1 | 10/2003 | Kotas et al. |
| 2003/0216971 A1 | 11/2003 | Sick et al. |
| 2003/0217052 A1 | 11/2003 | Rubenczyk et al. |
| 2003/0233350 A1 | 12/2003 | Dedhia et al. |
| 2004/0001104 A1 | 1/2004 | Sommerer et al. |
| 2004/0004633 A1 | 1/2004 | Perry et al. |
| 2004/0006602 A1 | 1/2004 | Bess et al. |
| 2004/0015416 A1 | 1/2004 | Foster et al. |
| 2004/0019536 A1 | 1/2004 | Ashkenazi et al. |
| 2004/0054672 A1 | 3/2004 | Tsuchitani et al. |
| 2004/0061706 A1 | 4/2004 | Cronin et al. |
| 2004/0070627 A1 | 4/2004 | Shahine et al. |
| 2004/0078457 A1 | 4/2004 | Tindal |
| 2004/0083206 A1 | 4/2004 | Wu et al. |
| 2004/0107194 A1 | 6/2004 | Thorpe |
| 2004/0128320 A1 | 7/2004 | Grove et al. |
| 2004/0139059 A1 | 7/2004 | Conroy et al. |
| 2004/0148611 A1 | 7/2004 | Manion et al. |
| 2004/0153378 A1 | 8/2004 | Perkowski |
| 2004/0168118 A1 | 8/2004 | Wong et al. |
| 2004/0177319 A1 | 9/2004 | Horn |
| 2004/0205334 A1 | 10/2004 | Rennels |
| 2004/0210479 A1 | 10/2004 | Perkowski et al. |
| 2004/0243478 A1 | 12/2004 | Walker et al. |
| 2004/0243485 A1 | 12/2004 | Borenstein et al. |
| 2004/0249794 A1 | 12/2004 | Nelson et al. |
| 2004/0254851 A1 | 12/2004 | Himeno et al. |
| 2004/0254950 A1 | 12/2004 | Musgrove et al. |
| 2004/0260621 A1 | 12/2004 | Foster et al. |
| 2004/0260677 A1 | 12/2004 | Malpani et al. |
| 2004/0261016 A1 | 12/2004 | Glass et al. |
| 2004/0267731 A1 | 12/2004 | Gino Monier et al. |
| 2005/0010871 A1 | 1/2005 | Ruthfield et al. |
| 2005/0028083 A1 | 2/2005 | Kircher et al. |
| 2005/0030322 A1 | 2/2005 | Gardos |
| 2005/0033849 A1 | 2/2005 | Matz |
| 2005/0039111 A1 | 2/2005 | Abe et al. |
| 2005/0044066 A1 | 2/2005 | Hooper et al. |
| 2005/0080769 A1 | 4/2005 | Gemmell et al. |
| 2005/0114682 A1 | 5/2005 | Zimmer et al. |
| 2005/0114782 A1 | 5/2005 | Klinger |
| 2005/0132297 A1 | 6/2005 | Milic-Frayling et al. |
| 2005/0144073 A1 | 6/2005 | Morrisroe et al. |
| 2005/0171627 A1 | 8/2005 | Funk et al. |
| 2005/0197141 A1 | 9/2005 | Jiang et al. |
| 2005/0201562 A1 | 9/2005 | Becker et al. |
| 2005/0204292 A1 | 9/2005 | Kibilov et al. |
| 2005/0235310 A1 | 10/2005 | Bies |
| 2005/0251409 A1 | 11/2005 | Johnson et al. |
| 2005/0257131 A1* | 11/2005 | Lim ............... G06F 17/30905 715/205 |
| 2005/0289039 A1 | 12/2005 | Greak |
| 2005/0289105 A1 | 12/2005 | Cosic |
| 2005/0289168 A1 | 12/2005 | Green et al. |
| 2006/0020360 A1 | 1/2006 | Wu |
| 2006/0031216 A1 | 2/2006 | Semple et al. |
| 2006/0036715 A1 | 2/2006 | Ghattu |
| 2006/0059440 A1 | 3/2006 | Pry |
| 2006/0085477 A1 | 4/2006 | Phillips et al. |
| 2006/0106683 A1 | 5/2006 | Fisher et al. |
| 2006/0106859 A1 | 5/2006 | Eugene et al. |
| 2006/0143158 A1 | 6/2006 | Ruhl et al. |
| 2006/0190352 A1 | 8/2006 | Zeidman |
| 2006/0224406 A1 | 10/2006 | Leon et al. |
| 2006/0224571 A1 | 10/2006 | Leon et al. |
| 2006/0224954 A1 | 10/2006 | Chandler et al. |
| 2006/0224960 A1 | 10/2006 | Baird-Smith |
| 2007/0027887 A1 | 2/2007 | Baldwin |
| 2007/0112968 A1 | 5/2007 | Schwab |

(56) References Cited

U.S. PATENT DOCUMENTS

| | | |
|---|---|---|
| 2007/0118441 A1 | 5/2007 | Chatwani et al. |
| 2007/0130207 A1 | 6/2007 | Pate et al. |
| 2007/0150365 A1 | 6/2007 | Bolivar |
| 2007/0179848 A1 | 8/2007 | Jain et al. |
| 2007/0214431 A1 | 9/2007 | Amadio et al. |
| 2007/0255810 A1 | 11/2007 | Shuster |
| 2007/0260495 A1 | 11/2007 | Mace et al. |
| 2008/0059331 A1 | 3/2008 | Schwab |
| 2008/0208857 A1 | 8/2008 | Liu et al. |
| 2009/0113475 A1 | 4/2009 | Li |
| 2009/0172517 A1 | 7/2009 | Kalicharan |
| 2009/0216627 A1 | 8/2009 | Carden et al. |
| 2009/0304267 A1 | 12/2009 | Tapley et al. |
| 2010/0076867 A1 | 3/2010 | Inoue et al. |
| 2010/0086192 A1 | 4/2010 | Grigsby et al. |
| 2010/0214302 A1 | 8/2010 | Melcher et al. |
| 2011/0093494 A1 | 4/2011 | Chandler et al. |
| 2011/0099085 A1 | 4/2011 | Hamilton et al. |
| 2012/0265744 A1 | 10/2012 | Berkowitz et al. |
| 2013/0198183 A1 | 8/2013 | Clendinning et al. |
| 2013/0297437 A1 | 11/2013 | Hamilton et al. |
| 2014/0304220 A1 | 10/2014 | Clendinning et al. |
| 2014/0372244 A1 | 12/2014 | Grove et al. |
| 2015/0020017 A1 | 1/2015 | Chandler et al. |
| 2016/0027086 A1 | 1/2016 | Clendinning et al. |
| 2016/0155185 A1 | 6/2016 | Leon et al. |

FOREIGN PATENT DOCUMENTS

| | | |
|---|---|---|
| CN | 1335949 A | 2/2002 |
| CN | 1351302 A | 5/2002 |
| CN | 106021435 A | 10/2016 |
| EP | 1841195 A1 | 10/2007 |
| JP | 2002-99772 A | 4/2002 |
| WO | WO-1037540 A2 | 5/2001 |
| WO | 2002/054292 A2 | 7/2002 |
| WO | 2002/054292 A3 | 11/2003 |
| WO | 2004/097562 A2 | 11/2004 |
| WO | WO-2006107333 A1 | 10/2006 |
| WO | WO-2006107335 A1 | 10/2006 |
| WO | WO-2007061975 A2 | 5/2007 |
| WO | WO-2007061975 A3 | 5/2007 |
| WO | 2007/078560 A2 | 7/2007 |
| WO | 2007/078560 A3 | 10/2007 |

OTHER PUBLICATIONS

"U.S. Appl. No. 09/730,538, Advisory Action dated Aug. 7, 2007", 3 pgs.

"U.S. Appl. No. 09/730,538, Advisory Action dated Dec. 23, 2003", 2 pgs.

"U.S. Appl. No. 09/730,538, Amendment filed Sep. 20, 2012", 16 pgs.

"U.S. Appl. No. 09/730,538, Amendment Under 37 CFR 41.33 dated Jul. 30, 2007", 8 pgs.

"U.S. Appl. No. 09/730,538, Appeal Brief filed Aug. 2, 2007", 30 pgs.

"U.S. Appl. No. 09/730,538, Decision on Appeal dated Jul. 20, 2012", 6 pgs.

"U.S. Appl. No. 09/730,538, Examiner's Answer dated Jun. 23, 2009", 9 pgs.

"U.S. Appl. No. 09/730,538, Examiner's Answer dated Jul. 21, 2009", 9 pgs.

"U.S. Appl. No. 09/730,538, Final Office Action dated Feb. 28, 2007", 8 pgs.

"U.S. Appl. No. 09/730,538, Final Office Action dated Apr. 3, 2006", 9 pgs.

"U.S. Appl. No. 09/730,538, Final Office Action dated Aug. 11, 2003", 7 pgs.

"U.S. Appl. No. 09/730,538, Final Office Action dated Dec. 7, 2004", 8 pgs.

"U.S. Appl. No. 09/730,538, Non Final Office Action dated Feb. 6, 2004", 7 pgs.

"U.S. Appl. No. 09/730,538, Non Final Office Action dated May 4, 2005", 8 pgs.

"U.S. Appl. No. 09/730,538, Non Final Office Action dated Sep. 19, 2006", 8 pgs.

"U.S. Appl. No. 09/730,538, Non-Final Office Action dated Feb. 27, 2003", 6 pgs.

"U.S. Appl. No. 09/730,538, Notice of Allowance dated Nov. 5, 2012", 16 pgs.

"U.S. Appl. No. 09/730,538, Pre-Appeal Brief Request filed May 29, 2007", 5 pgs.

"U.S. Appl. No. 09/730,538, Response filed Jan. 17, 2006 to Non-Final Office Action dated May 4, 2005", 19 pgs.

"U.S. Appl. No. 09/730,538, Response filed Mar. 7, 2005 to Final Office Action dated Dec. 7, 2004", 19 pgs.

"U.S. Appl. No. 09/730,538, Response filed Apr. 30, 2007 to Final Office Action dated Feb. 28, 2007", 18 pgs.

"U.S. Appl. No. 09/730,538, Response filed May 27, 2003 to Non Final Office Action dated Feb. 27, 2003", 11 pgs.

"U.S. Appl. No. 09/730,538, Response filed May 28, 2004 to Non-Final Office Action dated Feb. 6, 2004", 17 pgs.

"U.S. Appl. No. 09/730,538, Response filed Jul. 3, 2006 to Final Office Action dated Apr. 3, 2006", 17 pgs.

"U.S. Appl. No. 09/730,538, Response filed Aug. 1, 2005 to Non Final Office Action dated May 4, 2005", 16 pgs.

"U.S. Appl. No. 09/730,538, Response filed Nov. 25, 2003 to Final Office Action dated Aug. 11, 2003", 19 pgs.

"U.S. Appl. No. 09/730,538, Response filed Nov. 30, 2006 to Non Final Office Action dated Sep. 19, 2006", 14 pgs.

"U.S. Appl. No. 09/730,538, Response to Notice of Non-Compliant Appeal Brief filed Jan. 14, 2008", 17 pgs.

"U.S. Appl. No. 10/648,125, Advisory Action dated Feb. 11, 2009", 3 pgs.

"U.S. Appl. No. 10/648,125, Advisory Action dated Jun. 9, 2005", 4 pgs.

"U.S. Appl. No. 10/648,125, Appeal Brief filed Jul. 16, 2010", 35 pgs.

"U.S. Appl. No. 10/648,125, Appeal Decision dated Jan. 30, 2014", 12 pgs.

"U.S. Appl. No. 10/648,125, Decision on Pre-Appeal Brief Request dated Apr. 16, 2010", 2 pgs.

"U.S. Appl. No. 10/648,125, Examiner Interview Summary filed Jun. 12, 2014", 1 pg.

"U.S. Appl. No. 10/648,125, Examiner Interview Summary dated Jan. 6, 2006", 3 pgs.

"U.S. Appl. No. 10/648,125, Examiner Interview Summary dated Mar. 28, 2014", 2 pgs.

"U.S. Appl. No. 10/648,125, Examiner Interview Summary dated Oct. 16, 2008", 2 pgs.

"U.S. Appl. No. 10/648,125, Examiner's Answer to Appeal Brief dated Oct. 14, 2010", 47 pgs.

"U.S. Appl. No. 10/648,125, Final Office Action dated Jan. 4, 2010", 39 pgs.

"U.S. Appl. No. 10/648,125, Final Office Action dated Jan. 9, 2006", 29 pgs.

"U.S. Appl. No. 10/648,125, Final Office Action dated Mar. 24, 2005", 19 pgs.

"U.S. Appl. No. 10/648,125, Final Office Action dated Jul. 24, 2007", 27 pgs.

"U.S. Appl. No. 10/648,125, Final Office Action dated Oct. 10, 2008", 56 pgs.

"U.S. Appl. No. 10/648,125, Final Office Action dated Dec. 4, 2008", 33 pgs.

"U.S. Appl. No. 10/648,125, Non Final Office Action dated Feb. 21, 2008", 53 pgs.

"U.S. Appl. No. 10/648,125, Non Final Office Action dated May 13, 2009", 36 pgs.

"U.S. Appl. No. 10/648,125, Non Final Office Action dated Aug. 25, 2005", 14 pgs.

"U.S. Appl. No. 10/648,125, Non Final Office Action dated Sep. 1, 2004", 22 pgs.

(56) References Cited

OTHER PUBLICATIONS

"U.S. Appl. No. 10/648,125, Non Final Office Action dated Dec. 7, 2006", 27 pgs.
"U.S. Appl. No. 10/648,125, Notice of Allowance dated Apr. 21, 2014", 14 pgs.
"U.S. Appl. No. 10/648,125, Pre-Appeal Brief Request dated Mar. 4, 2010", 5 pgs.
"U.S. Appl. No. 10/648,125, Reply Brief filed Mar. 26, 2014", 65 pgs.
"U.S. Appl. No. 10/648,125, Reply Brief filed Nov. 2, 2010", 10 pgs.
"U.S. Appl. No. 10/648,125, Response filed Jan. 3, 2005 to Non Final Office Action dated Sep. 1, 2004", 18 pgs.
"U.S. Appl. No. 10/648,125, Response filed Feb. 4, 2009 to Final Office Action dated Dec. 4, 2008", 13 pgs.
"U.S. Appl. No. 10/648,125, Response filed Mar. 4, 2009 to Final Office Action dated Dec. 4, 2008", 14 pgs.
"U.S. Appl. No. 10/648,125, Response filed May 7, 2007 to Non Final Office Action dated Dec. 7, 2006", 14 pgs.
"U.S. Appl. No. 10/648,125, Response filed May 24, 2005 to Final Office Action dated Mar. 24, 2005", 21 pgs.
"U.S. Appl. No. 10/648,125, Response filed Jun. 23, 2008 to Non Final Office Action dated Feb. 21, 2008", 19 pgs.
"U.S. Appl. No. 10/648,125, Response filed Jul. 10, 2006 to Final Office Action dated Jan. 9, 2006", 14 pgs.
"U.S. Appl. No. 10/648,125, Response filed Jul. 25, 2005 to Advisory Action dated Jun. 9, 2005", 9 pgs.
"U.S. Appl. No. 10/648,125, Response filed Sep. 14, 2009 to Non Final Office Action dated May 13, 2009", 14 pgs.
"U.S. Appl. No. 10/648,125, Response filed Oct. 30, 2007 to Final Office Action dated Jul. 24, 2007", 13 pgs.
"U.S. Appl. No. 10/648,125, Response filed Dec. 16, 2005 to Non Final Office Action dated Aug. 25, 2005", 9 pgs.
"U.S. Appl. No. 10/831,422, Advisory Action dated Sep. 13, 2007", 3 pgs.
"U.S. Appl. No. 10/831,422, Advisory Action dated Oct. 3, 2008", 3 pgs.
"U.S. Appl. No. 10/831,422, Advisory Action dated Nov. 12, 2009", 3 pgs.
"U.S. Appl. No. 10/831,422, Appeal Brief filed Nov. 19, 2010", 33 pgs.
"U.S. Appl. No. 10/831,422, Appeal Decision dated Oct. 30, 2013", 6 pgs.
"U.S. Appl. No. 10/831,422, Decision on Pre-Appeal Brief Request dated Nov. 20, 2008", 3 pgs.
"U.S. Appl. No. 10/831,422, Decision on Pre-Appeal Brief Request dated Oct. 20, 2010", 2 pgs.
"U.S. Appl. No. 10/831,422, Examiner's Answer to Appeal Brief dated Dec. 23, 2010", 14 pgs.
"U.S. Appl. No. 10/831,422, Final Office Action dated Jun. 25, 2010", 15 pgs.
"U.S. Appl. No. 10/831,422, Final Office Action dated Jun. 27, 2007", 12 pgs.
"U.S. Appl. No. 10/831,422, Final Office Action dated Jul. 14, 2008", 12 pgs.
"U.S. Appl. No. 10/831,422, Final Office Action dated Aug. 31, 2009", 14 pgs.
"U.S. Appl. No. 10/831,422, Final Office Action dated Nov. 13, 2014", 13 pgs.
"U.S. Appl. No. 10/831,422, Non Final Office Action dated Mar. 20, 2014", 13 pgs.
"U.S. Appl. No. 10/831,422, Non-Final Office Action dated Feb. 23, 2009", 13 pgs.
"U.S. Appl. No. 10/831,422, Non-Final Office Action dated Dec. 9, 2009", 12 pgs.
"U.S. Appl. No. 10/831,422, Non-Final Office Action dated Dec. 19, 2006", 11 pgs.
"U.S. Appl. No. 10/831,422, Non-Final Office Action dated Dec. 27, 2007", 13 pgs.
"U.S. Appl. No. 10/831,422, Pre-Appeal Brief Request filed Oct. 13, 2008", 5 pgs.
"U.S. Appl. No. 10/831,422, Pre-Appeal Brief Request dated Jul. 6, 2010", 5 pgs.
"U.S. Appl. No. 10/831,422, Response filed Jan. 5, 2009 to Advisory Action dated Oct. 3, 2008", 14 pgs.
"U.S. Appl. No. 10/831,422, Response filed Mar. 4, 2010 to Non Final Office Action dated Dec. 9, 2009", 16 pgs.
"U.S. Appl. No. 10/831,422, Response filed Mar. 13, 2015 to Final Office Action dated Nov. 13, 2014", 18 pgs.
"U.S. Appl. No. 10/831,422, Response filed Mar. 19, 2007 to Non-Final Office Action dated Dec. 19, 2006", 15 pgs.
"U.S. Appl. No. 10/831,422, Response filed Mar. 27, 2008 to Non-Final Office Action dated Dec. 27, 2007", 18 pgs.
"U.S. Appl. No. 10/831,422, Response filed May 21, 2009 to Non Final Office Action dated Feb. 23, 2009", 14 pgs.
"U.S. Appl. No. 10/831,422, Response filed Jul. 21, 2014 to Non Final Office Action dated Mar. 20, 2014", 17 pgs.
"U.S. Appl. No. 10/831,422, Response filed Aug. 27, 2007 to Final Office Action dated Jun. 27, 2007", 17 pgs.
"U.S. Appl. No. 10/831,422, Response filed Sep. 15, 2008 to Final Office Action dated Jul. 14, 2008", 17 pgs.
"U.S. Appl. No. 10/831,422, Response filed Sep. 27, 2007 to Advisory Action dated Sep. 13, 2007", 16 pgs.
"U.S. Appl. No. 10/831,422, Response filed Oct. 27, 2009 to Final Office Action dated Aug. 31, 2009", 15 pgs.
"U.S. Appl. No. 11/241,766, 312 Amendment dated Nov. 30, 2010", 6 pgs.
"U.S. Appl. No. 11/241,766, Advisory Action dated Feb. 19, 2010", 3 pgs.
"U.S. Appl. No. 11/241,766, Advisory Action dated Nov. 6, 2008", 3 pgs.
"U.S. Appl. No. 11/241,766, Decision on Pre-Appeal Brief dated May 4, 2010", 2 pgs.
"U.S. Appl. No. 11/241,766, Decision on Pre-Appeal Brief Request dated Dec. 5, 2008", 2 pgs.
"U.S. Appl. No. 11/241,766, Final Office Action dated Aug. 12, 2008", 10 pgs.
"U.S. Appl. No. 11/241,766, Final Office Action dated Dec. 4, 2009", 10 pgs.
"U.S. Appl. No. 11/241,766, Non-Final Office Action dated Jan. 14, 2008", 7 pgs.
"U.S. Appl. No. 11/241,766, Non-Final Office Action dated Apr. 2, 2009", 9 pgs.
"U.S. Appl. No. 11/241,766, Notice of Allowance dated Aug. 31, 2010", 12 pgs.
"U.S. Appl. No. 11/241,766, Pre-Appeal Brief Request filed Nov. 12, 2008", 5 pgs.
"U.S. Appl. No. 11/241,766, Pre-Appeal Brief Request dated Mar. 4, 2010", 5 pgs.
"U.S. Appl. No. 11/241,766, PTO Response to 312 Amendment dated Jan. 5, 2011", 2 pgs.
"U.S. Appl. No. 11/241,766, Response filed Jan. 26, 2009 to Final Office Action dated Aug. 12, 2008", 12 pgs.
"U.S. Appl. No. 11/241,766, Response filed Feb. 4, 2010 to Final Office Action dated Dec. 4, 2010", 16 pgs.
"U.S. Appl. No. 11/241,766, Response filed Apr. 14, 2008 to Non-Final Office Action dated Jan. 14, 2008", 13 pgs.
"U.S. Appl. No. 11/241,766, Response filed Aug. 3, 2009 to Non Final Office Action dated Apr. 2, 2009", 13 pgs.
"U.S. Appl. No. 11/241,766, Response filed Oct. 16, 2008 to Final Office Action dated Aug. 12, 2008", 14 pgs.
"U.S. Appl. No. 11/241,801, Advisory Action dated Aug. 2, 2012", 3 pgs.
"U.S. Appl. No. 11/241,801, Examiner Interview Summary dated Oct. 28, 2014", 3 pgs.
"U.S. Appl. No. 11/241,801, Final Office Action dated Jan. 6, 2011", 10 pgs.
"U.S. Appl. No. 11/241,801, Final Office Action dated Mar. 12, 2015", 12 pgs.
"U.S. Appl. No. 11/241,801, Final Office Action dated Apr. 20, 2012", 12 pgs.

(56) References Cited

OTHER PUBLICATIONS

"U.S. Appl. No. 11/241,801, Final Office Action dated Jul. 20, 2015", 8 pgs.
"U.S. Appl. No. 11/241,801, Final Office Action dated Aug. 2, 2013", 14 pgs.
"U.S. Appl. No. 11/241,801, Final Office Action dated Dec. 13, 2012", 11 pgs.
"U.S. Appl. No. 11/241,801, Final Office Action dated Dec. 29, 2009", 12 pgs.
"U.S. Appl. No. 11/241,801, Non Final Office Action dated Sep. 9, 2014", 12 pgs.
"U.S. Appl. No. 11/241,801, Non Final Office Action dated Nov. 4, 2011", 9 pgs.
"U.S. Appl. No. 11/241,801, Non Final Office Action dated Dec. 19, 2013", 11 pgs.
"U.S. Appl. No. 11/241,801, Non-Final Office Action dated Jun. 12, 2009", 17 pgs.
"U.S. Appl. No. 11/241,801, Non-Final Office Action dated Jul. 22, 2010", 9 pgs.
"U.S. Appl. No. 11/241,801, Notice of Allowance dated Oct. 1, 2015", 7 pgs.
"U.S. Appl. No. 11/241,801, Response filed Feb. 6, 2012 to Non Final Office Action dated Nov. 4, 2011", 13 pgs.
"U.S. Appl. No. 11/241,801, Response filed Mar. 7, 2011 to Final Office Action dated Jan. 6, 2011", 14 pgs.
"U.S. Appl. No. 11/241,801, Response filed Apr. 13, 2009 to Restriction Requirement dated Mar. 13, 2009", 8 pgs.
"U.S. Appl. No. 11/241,801, Response filed Apr. 15, 2013 to Final Office Action dated Dec. 13, 2012", 15 pgs.
"U.S. Appl. No. 11/241,801, Response filed Apr. 21, 2014 to Non Final Office Action dated Dec. 19, 2013", 15 pgs.
"U.S. Appl. No. 11/241,801, Response filed Apr. 29, 2010 to Final Office Action dated Dec. 29, 2009", 15 pgs.
"U.S. Appl. No. 11/241,801, Response filed Jun. 12, 2015 to Final Office Action dated Mar. 12, 2015", 10 pgs.
"U.S. Appl. No. 11/241,801, Response filed Jun. 20, 2012 to Non Final Office Action dated Apr. 20, 2012", 15 pgs.
"U.S. Appl. No. 11/241,801, Response filed Sep. 4, 2012 to Notice of Non-Compliant Amendment dated Aug. 2, 2012", 15 pgs.
"U.S. Appl. No. 11/241,801, Response filed Sep. 11, 2009 to Non Final Office Action dated Jun. 12, 2009", 10 pgs.
"U.S. Appl. No. 11/241,801, Response filed Sep. 21, 2015 to Final Office Action dated Mar. 12, 2015", 21 pgs.
"U.S. Appl. No. 11/241,801, Response filed Oct. 2, 2013 to Final Office Action dated Aug. 2, 2013", 14 pgs.
"U.S. Appl. No. 11/241,801, Response filed Oct. 21, 2010 to Non Final Office Action dated Jul. 22, 2010", 13 pgs.
"U.S. Appl. No. 11/241,801, Response Filed Nov. 10, 2014 to Non Final Office Action dated Sep. 9, 2014", 26 pgs.
"U.S. Appl. No. 11/241,801, Restriction Requirement dated Mar. 13, 2009", 6 pgs.
"U.S. Appl. No. 11/241,824, Advisory Action dated Feb. 26, 2013", 4 pgs.
"U.S. Appl. No. 11/241,824, Advisory Action dated Mar. 17, 2009", 3 pgs.
"U.S. Appl. No. 11/241,824, Corrected Notice of Allowance dated May 7, 2015", 6 pgs.
"U.S. Appl. No. 11/241,824, Decision on Pre-Appeal Brief Request dated May 31, 2013", 2 pgs.
"U.S. Appl. No. 11/241,824, Examiner Interview Summary dated Nov. 6, 2014", 3 pgs.
"U.S. Appl. No. 11/241,824, Final Office Action dated Apr. 15, 2008", 19 pgs.
"U.S. Appl. No. 11/241,824, Final Office Action dated Oct. 26, 2012", 12 pgs.
"U.S. Appl. No. 11/241,824, Final Office Action dated Dec. 26, 2008", 11 pgs.
"U.S. Appl. No. 11/241,824, Final Office Action dated Dec. 29, 2009", 13 pgs.
"U.S. Appl. No. 11/241,824, Non Final Office Action dated Mar. 29, 2012", 10 pgs.
"U.S. Appl. No. 11/241,824, Non Final Office Action dated Jun. 20, 2014", 13 pgs.
"U.S. Appl. No. 11/241,824, Non-Final Office Action dated Jun. 12, 2009", 14 pgs.
"U.S. Appl. No. 11/241,824, Non-Final Office Action dated Jul. 10, 2008", 9 pgs.
"U.S. Appl. No. 11/241,824, Non-Final Office Action dated Oct. 31, 2007", 17 pgs.
"U.S. Appl. No. 11/241,824, Notice of Allowance dated Mar. 30, 2015", 5 pgs.
"U.S. Appl. No. 11/241,824, Pre-Appeal Brief Request filed Mar. 26, 2013", 5 pgs.
"U.S. Appl. No. 11/241,824, Response filed Jan. 3, 2013 to Final Office Action dated Oct. 26, 2012", 16 pgs.
"U.S. Appl. No. 11/241,824, Response filed Feb. 26, 2009 to Final Office Action dated Dec. 26, 2008", 13 pgs.
"U.S. Appl. No. 11/241,824, Response filed Feb. 29, 2008 to Non-Final Office Action dated Oct. 31, 2007", 23 pgs.
"U.S. Appl. No. 11/241,824, Response filed Mar. 1, 2010 to Final Office Action dated Dec. 29, 2009", 13 pgs.
"U.S. Appl. No. 11/241,824, Response filed Jun. 16, 2008 to Final Office Action dated Apr. 15, 2008", 15 pgs.
"U.S. Appl. No. 11/241,824, Response filed Jul. 30, 2012 to Non Final Office Action dated Mar. 29, 2012", 14 pgs.
"U.S. Appl. No. 11/241,824, Response filed Jul. 31, 2013 to Final Office Action dated Oct. 26, 2012", 21 pgs.
"U.S. Appl. No. 11/241,824, Response filed Sep. 11, 2009 to Non Final Office Action dated Jun. 12, 2009", 16 pgs.
"U.S. Appl. No. 11/241,824, Response filed Oct. 10, 2008 to Non-Final Office Action dated Jul. 10, 2008", 13 pgs.
"U.S. Appl. No. 11/241,824, Response filed Nov. 20, 2014 to Non Final Office Action dated Jun. 20, 2014", 18 pgs.
"U.S. Appl. No. 11/241,883, Advisory Action dated Mar. 12, 2014", 3 pgs.
"U.S. Appl. No. 11/241,883, Advisory Action dated Mar. 17, 2010", 3 pgs.
"U.S. Appl. No. 11/241,883, Amendment filed Aug. 15, 2012", 10 pgs.
"U.S. Appl. No. 11/241,883, Appeal Brief filed May 24, 2010", 24 pgs.
"U.S. Appl. No. 11/241,883, Decision on Appeal dated Jun. 15, 2012", 5 pgs.
"U.S. Appl. No. 11/241,883, Decision on Pre-Appeal Brief Request dated Apr. 6, 2010", 2 pgs.
"U.S. Appl. No. 11/241,883, Examiner Interview Summary dated Mar. 12, 2014", 3 pgs.
"U.S. Appl. No. 11/241,883, Examiner's Answer to Appeal Brief dated Aug. 4, 2010", 10 pgs.
"U.S. Appl. No. 11/241,883, Final Office Action dated May 15, 2015", 20 pgs.
"U.S. Appl. No. 11/241,883, Final Office Action dated Dec. 16, 2013", 12 pgs.
"U.S. Appl. No. 11/241,883, Final Office Action dated Dec. 22, 2009", 9 pgs.
"U.S. Appl. No. 11/241,883, Non Final Office Action dated Jun. 22, 2009", 13 pgs.
"U.S. Appl. No. 11/241,883, Non Final Office Action dated Sep. 24, 2014", 13 pgs.
"U.S. Appl. No. 11/241,883, Pre-Appeal Brief Request dated Mar. 22, 2010", 5 pgs.
"U.S. Appl. No. 11/241,883, Reply Brief filed Sep. 30, 2010", 6 pgs.
"U.S. Appl. No. 11/241,883, Response filed Jan. 26, 2015 to Non Final Office Action dated Sep. 24, 2014", 21 pgs.
"U.S. Appl. No. 11/241,883, Response filed Feb. 18, 2014 to Final Office Action dated Dec. 16, 2013", 11 pgs.
"U.S. Appl. No. 11/241,883, Response filed Feb. 22, 2010 to Final Office Action dated Dec. 22, 2009", 11 pgs.
"U.S. Appl. No. 11/241,883, Response filed Mar. 18, 2014 to Final Office Action dated Dec. 16, 2013", 11 pgs.
"U.S. Appl. No. 11/241,883, Response filed Sep. 22, 2009 to Non Final Office Action dated Jun. 22, 2009", 11 pgs.

(56) References Cited

OTHER PUBLICATIONS

"U.S. Appl. No. 11/426,993, Advisory Action dated Feb. 12, 2014", 3 pgs.
"U.S. Appl. No. 11/426,993, Final Office Action dated Jul. 22, 2010", 17 pgs.
"U.S. Appl. No. 11/426,993, Final Office Action dated Sep. 4, 2013", 14 pgs.
"U.S. Appl. No. 11/426,993, Final Office Action dated Sep. 16, 2011", 16 pgs.
"U.S. Appl. No. 11/426,993, Final Office Action dated Nov. 7, 2012", 14 pgs.
"U.S. Appl. No. 11/426,993, Non Final Office Action dated Feb. 24, 2010", 22 pgs.
"U.S. Appl. No. 11/426,993, Non Final Office Action dated Mar. 29, 2013", 15 pgs.
"U.S. Appl. No. 11/426,993, Non Final Office Action dated Jun. 21, 2012", 17 pgs.
"U.S. Appl. No. 11/426,993, Non Final Office Action dated Dec. 23, 2010", 18 pgs.
"U.S. Appl. No. 11/426,993, Response filed Jan. 7, 2010 to Restriction Requirement dated Dec. 7, 2009", 5 pgs.
"U.S. Appl. No. 11/426,993, Response filed Feb. 6, 2013 to Final Office Action dated Nov. 7, 2012", 9 pgs.
"U.S. Appl. No. 11/426,993, Response filed Apr. 28, 2010 to Non Final Office Action dated Feb. 24, 2010", 10 pgs.
"U.S. Appl. No. 11/426,993, Response filed Jun. 23, 2011 to Non Final Office Action dated Dec. 23, 2010", 8 pgs.
"U.S. Appl. No. 11/426,993, Response filed Jun. 27, 2013 to Non Final Office Action dated Mar. 29, 2013", 8 pgs.
"U.S. Appl. No. 11/426,993, Response filed Sep. 18, 2012 to Non Final Office Action dated Jun. 21, 2012", 10 pgs.
"U.S. Appl. No. 11/426,993, Response filed Oct. 15, 2010 to Final Office Action dated Jul. 22, 2010", 43 pgs.
"U.S. Appl. No. 11/426,993, Response filed Nov. 4, 2013 to Final Office Action dated Sep. 4, 2013", 10 pgs.
"U.S. Appl. No. 11/426,993, Response filed Dec. 15, 2011 to Final Office Action dated Sep. 16, 2011", 9 pgs.
"U.S. Appl. No. 11/426,993, Restriction Requirement dated Dec. 7, 2009", 8 pgs.
"U.S. Appl. No. 12/605,212, Non Final Office Action dated Feb. 16, 2012", 11 pgs.
"U.S. Appl. No. 12/605,212, Notice of Allowance dated Jun. 28, 2012", 12 pgs.
"U.S. Appl. No. 12/605,212, Response filed May 16, 2012 to Non Final Office Action dated Feb. 16, 2012", 8 pgs.
"U.S. Appl. No. 12/897,587, Non Final Office Action dated May 30, 2013", 10 pgs.
"U.S. Appl. No. 12/897,587, Notice of Allowance dated May 16, 2014", 14 pgs.
"U.S. Appl. No. 12/897,587, Preliminary Amendment filed Oct. 4, 2010", 3 pgs.
"U.S. Appl. No. 12/897,587, Response filed Aug. 30, 2013 to Non Final Office Action dated May 30, 2013", 11 pgs.
"U.S. Appl. No. 13/794,055, Final Office Action dated Sep. 5, 2013", 6 pgs.
"U.S. Appl. No. 13/794,055, Non Final Office Action dated Jun. 25, 2013", 6 pgs.
"U.S. Appl. No. 13/794,055, Notice of Allowance dated Feb. 20, 2014", 6 pgs.
"U.S. Appl. No. 13/794,055, Response filed Feb. 5, 2014 to Final Office Action dated Sep. 5, 2013", 6 pgs.
"U.S. Appl. No. 13/794,055, Response filed Aug. 27, 2013 to Non Final Office Action dated Jun. 25, 2013", 7 pgs.
"U.S. Appl. No. 14/306,185, Non Final Office Action dated Jan. 30, 2015", 5 pgs.
"U.S. Appl. No. 14/306,185, Notice of Allowance dated May 28, 2015", 6 pgs.
"U.S. Appl. No. 14/306,185, Preliminary Amendment filed Jul. 8, 2014", 6 pgs.
"U.S. Appl. No. 14/306,185, Response filed Apr. 30, 2015 to Non Final Office Action dated Jan. 30, 2015", 6 pgs.
"U.S. Appl. No. 14/318,525, Final Office Action dated May 28, 2015", 20 pgs.
"U.S. Appl. No. 14/318,525, Non Final Office Action dated Feb. 12, 2015", 19 pgs.
"U.S. Appl. No. 14/318,525, Preliminary Amendment filed Jun. 30, 2014", 8 pgs.
"U.S. Appl. No. 14/318,525, Response filed May 12, 2015 to Non Final Office Action dated Feb. 12, 2015", 14 pgs.
"U.S. Appl. No. 14/318,525, Supplemental Preliminary Amendment filed Aug. 14, 2014", 3 pgs.
"U.S. Appl. No. 14/500,884, Preliminary Amendment filed Oct. 20, 2014", 6 pgs.
"Australian Application Serial No. 2005330296, Response filed Nov. 30, 2009 to Office Action dated Apr. 2, 2009", 12 pgs.
"Australian Application Serial No. 2005330296, Search Report dated Apr. 2, 2009", 2 pgs.
"Australian Application Serial No. 2010201697, Notice of Acceptance dated May 7, 2012", 4 pgs.
"Australian Application Serial No. 2010201697, Office Action dated Feb. 27, 2012", 2 pgs.
"Australian Application Serial No. 2010201697, Response filed Jan. 31, 2012 to Examiner Report dated Mar. 21, 2011", 24 pgs.
"Australian Application Serial No. 2010201697, Response filed Apr. 19, 2012 to Office Action dated Feb. 27, 2012", 13 pgs.
"Australian Application Serial No. 2012216254, Examination Report on Voluntary Amendments dated Feb. 17, 2015", 2 pgs.
"Australian Application Serial No. 2012216254, First Examination Report dated Jan. 25, 2013", 3 pgs.
"Australian Application Serial No. 2012216254, Office Action dated Oct. 3, 2014", 3 pgs.
"Australian Application Serial No. 2012216254, Response filed Jan. 6, 2014 to Subsequent Examiners Report dated Sep. 27, 2013", 13 pgs.
"Australian Application Serial No. 2012216254, Response filed Sep. 24, 2014", 17 pgs.
"Australian Application Serial No. 2012216254, Response filed Oct. 13, 2014", 13 pgs.
"Australian Application Serial No. 2012216254, Response filed Aug. 26, 2015 to Examination Report dated Feb. 17, 2015", 6 pgs.
"Australian Application Serial No. 2012216254, Response to Examination Report filed Aug. 28, 2013", 3 pgs.
"Australian Application Serial No. 2012216254, Subsequent Examiners Report dated Feb. 3, 2014", 3 pgs.
"Australian Application Serial No. 2012216254, Subsequent Examiners Report dated May 21, 2014", 3 pgs.
"Australian Application Serial No. 2012216254, Subsequent Examiners Report dated Sep. 27, 2013", 3 pgs.
"Australian Application Serial No. 2013203508, First Examiner Report dated Dec. 8, 2014", 4 pgs.
"Australian Application Serial No. 2010201697, First Examiner Report dated Mar. 21, 2011", 2 Pgs.
"Chinese Application Serial No. 200580049965.9, Response filed Nov. 15, 2013", with English translation of claims, 13 pgs.
"Chinese Application Serial No. 200580049965.9, Office Action dated Mar. 11, 2015", with machine translation, 12 pgs.
"Chinese Application Serial No. 200580049965.9, Office Action dated Apr. 25, 2013", with English translation of claims, 18 pgs.
"Chinese Application Serial No. 200580049965.9, Office Action dated Jul. 14, 2015", with English translation of claims, 7 pgs.
"Chinese Application Serial No. 200580049965.9, Office Action dated Aug. 2, 2013", with English translation of claims, 18 pgs.
"Chinese Application Serial No. 200580049965.9, Office Action dated Aug. 7, 2012", with English translation of claims, 9 pgs.
"Chinese Application Serial No. 200580049965.9, Office Action dated Sep. 18, 2009", with English translation of claims, 26 pgs.
"Chinese Application Serial No. 200580049965.9, Office Action dated Dec. 5, 2011", w/ English Translation, 19 pgs.
"Chinese Application Serial No. 200580049965.9, Reexamination Decision dated Jan. 15, 2013", with English translation, 2 pgs.

(56) References Cited

OTHER PUBLICATIONS

"Chinese Application Serial No. 200580049965.9, Reexamination Decision dated Dec. 3, 2014", English translation of the frontpage of notice.
"Chinese Application Serial No. 200580049965.9, Response filed Jan. 28, 2010", with English translation of claims, 31 pgs.
"Chinese Application Serial No. 200580049965.9, Response filed Jul. 5, 2013 to Office Action dated Apr. 25, 2013", with machine translation, 6 pgs.
"Chinese Application Serial No. 200580049965.9, Response filed Sep. 24, 2015 to Office Action dated Jul. 14, 2015", w/ English Claims, 13 pgs.
"Chinese Application Serial No. 200580049965.9, Response filed Oct. 10, 2012 to Office Action dated Aug. 7, 2012", with English translation of claims, 47 pgs.
"Chinese Application Serial No. 2005800499659, Response filed Feb. 16, 2012 to Office Action dated Dec. 5, 2011", with English translation of claims, 17 pgs.
"Craigslist", Wayback Machine, [Online]. Retrieved from the Internet: <https://web.archive.org/web/20041230183317/http://sydney.craigslist.org/>, (Dec. 30, 2004), 1 pg.
"eBay Australia : Help : New to eBay : Selling", Wayback Machine, [Online]. Retrieved from the Internet: <https://web.archive.org/web/19991128111541/http://pages.ebay.com.au/help/basics/n-selling.html>, (Nov. 28, 2004), 1 pg.
"European Application Serial No. 05802369.8 Office Action dated Dec. 22, 2009", 4 pgs.
"European Application Serial No. 05802369.8, Response to Summons filed Dec. 12, 2013", 11 pgs.
"European Application Serial No. 05802369.8, Appeal filed Apr. 22, 2014", 2 pgs.
"European Application Serial No. 05802369.8, Grounds of Appeal filed Jun. 30, 2014", 17 pgs.
"European Application Serial No. 05802369.8, Office Action dated Jan. 13, 2014", 2 pgs.
"European Application Serial No. 05802369.8, Office Action dated Feb. 14, 2014", 15 pgs.
"European Application Serial No. 05802369.8, Office Action dated Feb. 20, 2014", 10 pgs.
"European Application Serial No. 05802369.8, Office Action dated Oct. 23, 2012", 5 pgs.
"European Application Serial No. 05802369.8, Office Action dated Dec. 6, 2011", 7 pgs.
"European Application Serial No. 05802369.8, Response filed Feb. 22, 2013 to Examination Notification Art 94(3) dated Oct. 23, 2012", 10 pgs.
"European Application Serial No. 05802369.8, Response filed Oct. 8, 2010", 4 pgs.
"European Application Serial No. 05802369.8, Search Report dated Dec. 22, 2009", 3 pgs.
"European Application Serial No. 05802369.8, Summons to Attend Oral Proceedings dated Sep. 20, 2013", 5 pgs.
"European Application Serial No. 11195425.1, Extended European Search Report dated Mar. 27, 2012", 6 pgs.
"European Application Serial No. 11195425.1, Office Action dated Feb. 10, 2014", 5 pgs.
"European Application Serial No. 11195425.1, Response filed Oct. 24, 2012 to Extended Search Report dated Mar. 27, 2012", 18 pgs.
"European Application Serial No. 11195437.6, Examination Notification Art. 94(3) dated Jun. 24, 2014", 5 pgs.
"European Application Serial No. 11195437.6, Extended Search Report dated Jun. 12, 2012", 5 pgs.
"European Application Serial No. 11195437.6, Response filed Jan. 5, 2015", 10 pgs.
"European Application Serial No. 11195437.6, Response filed Jan. 21, 2013 to Extended European Search Report dated Jun. 12, 2012", 10 pgs.
"Flamenco Search Interface Project", [Online]. Retrieved from the Internet: <URL: http://flamenco.berkeley.edy/pubs.html>, (Oct. 2008), 2 pgs.
"gumtree.com.au", Wayback Machine, [Online]. Retrieved from the Internet: <https://web.archive.org/web/20040413091413/http://www.gumtree.com.au/>, (Apr. 6, 2004), 2 pgs.
"Indian Application Serial No. 7927/DELNP/2007, First Examination Report dated Nov. 8, 2013", 2 pgs.
"Indian Application Serial No. 7927/DELNP/2007, Response filed Jun. 23, 2014", 32 pgs.
"Indian Application Serial No. 7927/DELNP/2007, Response filed Sep. 17, 2014", 13 pgs.
"International Application Serial No. PCT/US03/41543, International Preliminary Report dated Apr. 27, 2005", 6 pgs.
"International Application Serial No. PCT/US03/41543, International Search Report dated Apr. 14, 2004", 7 pgs.
"International Application Serial No. PCT/US03/41543, Written Opinion dated Aug. 26, 2004", 9 pgs.
"International Application Serial No. PCT/US05/35308, International Search Report and Written Opinion dated Apr. 18, 2006", 8 Pages.
"International Application Serial No. PCT/US05/35543, International Search Report and Written Opinion dated Mar. 16, 2006", 10 pgs.
"International Application Serial No. PCT/US05/35543, International Search Report dated Mar. 16, 2006", 11 pgs.
"International Application Serial No. PCT/US2005/035308, International Preliminary Report on Patentability dated Oct. 11, 2007", 5 pgs.
"International Application Serial No. PCT/US2005/035543, International Preliminary Report on Patentability dated Oct. 11, 2007", 5 pgs.
"Internet Explorer Screen Dumps", Microsoft.com,version 6.0 SP2, (Dec. 2004), 1-6.
"Korean Application Serial No. 2007-7025209, Office Action dated Jun. 2, 2009", English translation, 6 pgs.
"Korean Application Serial No. 2007-7025209, Office Action dated Dec. 2, 2009", with English translation of claims, 6 pgs.
"Korean Application Serial No. 2007-7025209, Office Action dated Dec. 8, 2008", with English translation of claims, 8 pgs.
"Korean Application Serial No. 2007-7025209, Response filed Feb. 2, 2010", with English translation of claims, 22 pgs.
"Korean Application Serial No. 2007-7025209, Response filed Aug. 3, 2009", with English translation of claims, 48 pgs.
"Korean Application Serial No. 2009-7016255, Office Action dated Nov. 3, 2009", with English translation of claims, 6 pgs.
"Korean Application Serial No. 2009-7016255, Response filed Jan. 4, 2010", with English translation of claims, 20 pgs.
"MyComicShop.com", Search for Mad (Magazine #23 on) #158, [Online]. Retrieved from the Internet: <http://www.mycomicshop.com/search?tid=353271&pgi=151>, (Accessed Feb. 10, 2012), 22 pgs.
"New Text and Social Messaging Features Expand Frucall's Voice-Based", Primezone, (Aug. 31, 2006), 1 pg.
Cai, Yiping, et al., "Study on Classification of Product Data in Electronic Business Market", Journal of Hangzhou Electronic Industry College, vol. 23, No. 4, with English abstract., (Aug. 2003), 4 pgs.
Cohen, E. S, et al., "Automatic strategies in the Siemens RTL tiled window manager", Proceedings of the 2nd IEEE Conference on Computer Workstations, (1988), 111-119.
English, Jennifer, et al., "Examining the Usability of Web Site Search", [Online]. Retrieved from the Internet: <URL: http://citeseer.ist.psu.edu/viewdoc/download?doi=10.1.1.137.9092&rep=rep1&type=pdf>, (Retrieved Mar. 7, 2011), 10 pgs.
English, Jennifer, et al., "Hierarchical Faceted Metadata in Site Search Interfaces", CHI 2002, [Online]. Retrieved from the Internet: <http://flamenco.berkeley.edu/papers/chi02_short_paper.pdf>, (Feb. 9, 2012), 2 pgs.
Hearst, Marti, et al., "Finding the FL Site Sear", Communications of the ACM 45(9), (Sep. 2002), 42-49.
Kandogan, Eser, et al., "Elastic Windows: Improved Spatial Layout and Rapid Multiple Window Operations", Proceedings of the Workshop on Advanced Visual Interfaces AVI, XX, XX, (Jan. 1, 1996), 29-38.

(56) References Cited

OTHER PUBLICATIONS

Kotas, Paul, et al., "Use of Electronic Catalog to Facilitate User-to-User Sales", U.S. Appl. No. 60/336,409, filed Oct. 31, 2001, 48 pgs.
"U.S. Appl. No. 11/241,801, 312 Amendment filed Dec. 15, 2015", 9 pgs.
"U.S. Appl. No. 11/241,883, Appeal Brief filed Mar. 2, 2016", 33 pgs.
"U.S. Appl. No. 14/500,884, Non Final Office Action dated Apr. 20, 2016", 18 pgs.
"U.S. Appl. No. 14/878,378, Notice of Allowance dated Mar. 15, 2016", 9 pgs.
"Australian Application Serial No. 2013203508, Response filed May 26, 2015", 14 pgs.
"Chinese Application Serial No. 200580049965.9, Office Action dated Dec. 1, 2015", with English translation of claims, 14 pgs.
"Chinese Application Serial No. 200580049965.9, Respone filed May 25, 2015", with English translation of claims, 16 pgs.
"Chinese Application Serial No. 200580049965.9, Response filed Feb. 16, 2016 to Office Action dated Dec. 1, 2015", with English Translation of Claims, 14 pgs.
"U.S. Appl. No. 14/500,884, Non Final Office Action dated Jun. 30, 2017", 22 pgs.
"U.S. Appl. No. 14/500,884, Examiner Interview Summary dated Mar. 9, 2017", 3 pgs.
"U.S. Appl. No. 14/500,884, Response filed Feb. 28, 2017 to Final Office Action dated Nov. 28, 2016", 11 pgs,.
"Australian Application Serial No. 2015230730, Office Action Response dated Mar. 27, 2017", 17 pgs.
"European Application Serial No. 11195425.1, Summons to Attend OralProceedings dated Feb. 8, 2017", 6 pgs.
"European Application Serial No. 11195437.6, Summons to Attend Oral Proceedings dated Feb. 10, 2017", 6 pgs.
"Indian Application Serial No. 7927/DELNP/2007, Office Action dated Mar. 16, 2017", 2 pgs.
"U.S. Appl. No. 11/241,883 Reply Brief Filed Nov. 21, 2016", 6 pgs.
"U.S. Appl. No. 11/241,883, Examiners Answer dated Sep. 21, 2016", 9 pgs.
"U.S. Appl. No. 14/500,884, Final Office Action dated Nov. 28, 2016", 20 pgs.
"U.S. Appl. No. 14/500,884, Response filed Aug. 22, 2016 to Non Final Office Action dated Apr. 20, 2016", 14 pgs.
"Australian Application Serial No. 2015230730, Office Action dated Nov. 9, 2016", 3 pgs.
"Australian Application Serial No. 2015230730, Response filed Oct. 11, 2016 to Office Action dtaed Jun. 1, 2016", 6 pgs.
"Indian Application Serial No. 7927/DELNP/2007, Office Action dated Jan. 19, 2017", 15 pgs.
Non-Final Office Action received for U.S. Appl. No. 14/994,355, dated May 18, 2018, 11 pages.
Response to Final Office Action filed on Jun. 28, 2018 for U.S. Appl. No. 14/500,884, dated Mar. 28, 2018, 10 pages.
Notice of Allowance received for Korean Patent Application No. 10-2009-7016255, dated Apr. 16, 2010, 3 pages (1 page of English Translation and 2 pages of Official Copy).
Notice of Allowance received for Korean Patent Application No. 10-2007-7025209, dated Apr. 22, 2010, 3 pages (1 page of English Translation and 2 pages of Official Copy).
Notice of Acceptance received for Australian Patent Application No. 2005330296 dated Dec. 23, 2009, 3 pages.
Notice of Allowance received for Korean Patent Application No. 10 2010 7002438, dated Apr. 22, 2010, 3 pages (1 page of English Translation and 2 pages of Official Copy).
Final Office Action received for U.S. Appl. No. 14/500,884, dated Mar. 28, 2018, 23 pages.
Response to Non-Final Office Action filed on Nov. 29, 2017 for U.S. Appl. No. 14/500,884, dated Jun. 30, 2017, 18 pages.
Applicant Initiated Interview Summary received for U.S. Appl. No. 14/994,355, dated Jan. 18, 2018, 3 pages.
Response to Restriction Requirement filed on Jan. 29, 2018 for U.S. Appl. No. 14/994,355, dated Dec. 14, 2017, 11 pages.
Restriction Requirement received for U.S. Appl. No. 14/994,355, dated Dec. 14, 2017, 7 pages.
International Preliminary Report on Patentability, Application No. PCT/US2004/012678, dated Nov. 10, 2015, 4 pages.
International Search Report and Written Opinion, Application No. PCT/US2004/012678, dated Oct. 27, 2004, 5 pages.
International Preliminary Report on Patentability, Application No. PCT/US2006/044944, dated Jun. 5, 2008, 5 pages.
International Search Report and Written Opinion, Application No. PCT/US2006/044944, dated May 10, 2007, 5 pages.
Non-Final Office Action received for U.S. Appl. No. 10/831,422, dated Sep. 10, 2015, 14 pages.
Non-Final Office Action received for U.S. Appl. No. 10/831,422, dated May 20, 2016, 14 pages.
Response to Non-Final Office Action filed on Feb. 10, 2016, for U.S. Appl. No. 10/831,422, 19 pages.
Final Office Action received for U.S. Appl. No. 11/426,993, dated Jun. 30, 2015, 8 pages.
Non-Final Office Action received for U.S. Appl. No. 11/426,993, dated May 23, 2014, 19 pages.
Non-Final Office Action received for U.S. Appl. No. 11/426,993, dated Dec. 15, 2014, 6 pages.
Response to Final Office Action filed on Mar. 4, 2014, for U.S. Appl. No. 11/426,993, 11 pages.
Response to Non-Final Office Action filed on Sep. 23, 2014, for U.S. Appl. No. 11/426,993, 13 pages.
Response to Non-Final Office Action filed on Apr. 15, 2015, for U.S. Appl. No. 11/426,993, 21 pages.
Final Office Action received for U.S. Appl. No. 11/523,991, dated Mar. 28, 2012, 16 pages.
Final Office Action received for U.S. Appl. No. 11/523,991, dated Apr. 27, 2009, 30 pages.
Final Office Action received for U.S. Appl. No. 11/523,991, dated Sep. 2, 2010, 26 pages.
Final Office Action received for U.S. Appl. No. 11/523,991, dated Oct. 10, 2013, 13 pages.
Non-Final Office Action received for U.S. Appl. No. 11/523,991, dated Mar. 14, 2014, 12 pages.
Non-Final Office Action received for U.S. Appl. No. 11/523,991, dated Mar. 18, 2010, 25 pages.
Non-Final Office Action received for U.S. Appl. No. 11/523,991, dated Apr. 11, 2013, 12 pages.
Non-Final Office Action received for U.S. Appl. No. 11/523,991, dated Oct. 17, 2011, 14 pages.
Non-Final Office Action received for U.S. Appl. No. 11/523,991, dated Nov. 10, 2008, 30 pages.
Non-Final Office Action received for U.S. Appl. No. 11/523,991, dated Mar. 21, 2011, 6 pages.
Response to Final Office Action filed on Sep. 10, 2009, for U.S. Appl. No. 11/523,991, 19 pages.
Response to Final Office Action filed on Oct. 29, 2010, for U.S. Appl. No. 11/523,991, 21 pages.
Response to Final Office Action filed on May 15, 2012, for U.S. Appl. No. 11/523,991, 15 pages.
Response to Final Office Action filed on Jan. 7, 2014, for U.S. Appl. No. 11/523,991, 13 pages.
Response to Non-Final Office Action filed on Jun. 3, 2011, for U.S. Appl. No. 11/523,991, 9 pages.
Response to Non-Final Office Action filed on Jun. 16, 2014, for U.S. Appl. No. 11/523,991, 13 pages.
Response to Non-Final Office Action filed on Jun. 18, 2010, for U.S. Appl. No. 11/523,991, 15 pages.
Response to Non-Final Office Action filed on Jul. 11, 2013, for U.S. Appl. No. 11/523,991, 16 pages.
Response to Non-Final Office Action filed on Dec. 15, 2011, for U.S. Appl. No. 11/523,991, 14 pages.
Response to Non-Final Office Action filed on Feb. 10, 2009, for U.S. Appl. No. 11/523,991, 17 pages.
Response to Notice of Non-Compliant Amendment filed on Dec. 8, 2009, for U.S. Appl. No. 11/523,991, 3 pages.

(56) References Cited

OTHER PUBLICATIONS

Response to Notice of Non-Compliant Amendment filed on Jan. 8, 2010, for U.S. Appl. No. 11/523,991, 8 pages.
Applicant Initiated Interview Summary received for U.S. Appl. No. 13/663,178, dated Nov. 28, 2014, 3 pages.
Non-Final Office Action received for U.S. Appl. No. 13/663,178, dated Oct. 3, 2014, 18 pages.
Notice of Allowance received for U.S. Appl. No. 13/663,178, dated Mar. 3, 2015, 14 pages.
Response to Non-Final Office Action filed on Jan. 5, 2015, for U.S. Appl. No. 13/663,178, 14 pages.
Non-Final Office Action received for U.S. Appl. No. 14/318,525, dated Sep. 24, 2015, 31 pages.
Response to Non-Final Office Action filed on Aug. 28, 2015, for U.S. Appl. No. 14/318,525, 16 pages.
Non-Final Office Action received for U.S. Appl. No. 14/500,884, dated Feb. 19, 2019, 21 pages.
Summon to Attend Oral Proceedings received for European Patent Application No. 05802369.8, dated Sep. 27, 2018, 9 pages.
Appeal Decision received for U.S. Appl. No. 11/241,883, dated Dec. 10, 2018, 14 pages.
Supplemental Amendment for U.S. Appl. No. 14/500,884, filed Aug. 17, 2018, 6 pages.
Final Office Action received for U.S. Appl. No. 14/994,355, dated Jan. 2, 2019, 16 pages.
Response to Non-Final Office Action filed on Aug. 20, 2018, for U.S. Appl. No. 14/994,355, dated May 18, 2018, 23 pages.
Office Action received for Chinese Patent Application No. 201610321885.4, dated Dec. 12, 2018, 12 pages (6 pages of English Translation and 6 pages of Official Copy).
Pruitt, "A Large-Area Flat Panel Multi-Function Display for Military and Space Applications", Proceedings of the IEEE 1992 National Aerospace and Electronics Conference@m_NAECON 1992, May 18-22, 1992, 2 pages.
Applicant Initiated Interview Summary Received for U.S. Appl. No. 14/500,884, dated May 23, 2019, 3 pages.
Notice of Allowance received for U.S. Appl. No. 14/994,355, dated Jul. 11, 2019, 7 pages.
"U.S. Appl. No. 14/500,884 Examiner Interview Summary dated Jul. 12, 2016", 4 pages.
"Australian Application Serial No. 2015230730, Office Action dated Jun. 1, 2016", 4 pgs.
Notice of Allowance received for U.S. Appl. No. 14/994,355, dated Apr. 17, 2019, 7 pages.
Response to Final Office Action filed on Feb. 25, 2019, for U.S. Appl. No. 14/994,355, dated Jan. 2, 2019, 23 pages.
Response to Office Action filed on Apr. 28, 2019, for Chinese Patent Application No. 201610321885.4, dated Dec. 12, 2018, 9 pages (6 pages of Official copy and 3 pages of English Pending claims).
Response to Non-Final Office Action filed on May 17, 2019 for U.S. Appl. No. 14/500,884, dated Feb. 19, 2019, 12 pages.
Final Office Action Received for U.S. Appl. No. 14/500,884, dated Aug. 22, 2019, 23 pages.
Applicant Interview summary received for U.S. Appl. No. 14/500,884, dated Oct. 17, 2019, 3 pages.
Advisory Action Received for U.S. Appl. No. 14/500,884 dated Nov. 21, 2019, 6 pages.
Response to Final Office Action dated Oct. 22, 2019, for U.S. Appl. No. 14/500,884, dated Aug. 22, 2019, 11 pages.
Preliminary Amendment filed on Nov. 18, 2019 U.S. Appl. No. 16/664,578, 7 pages.

\* cited by examiner

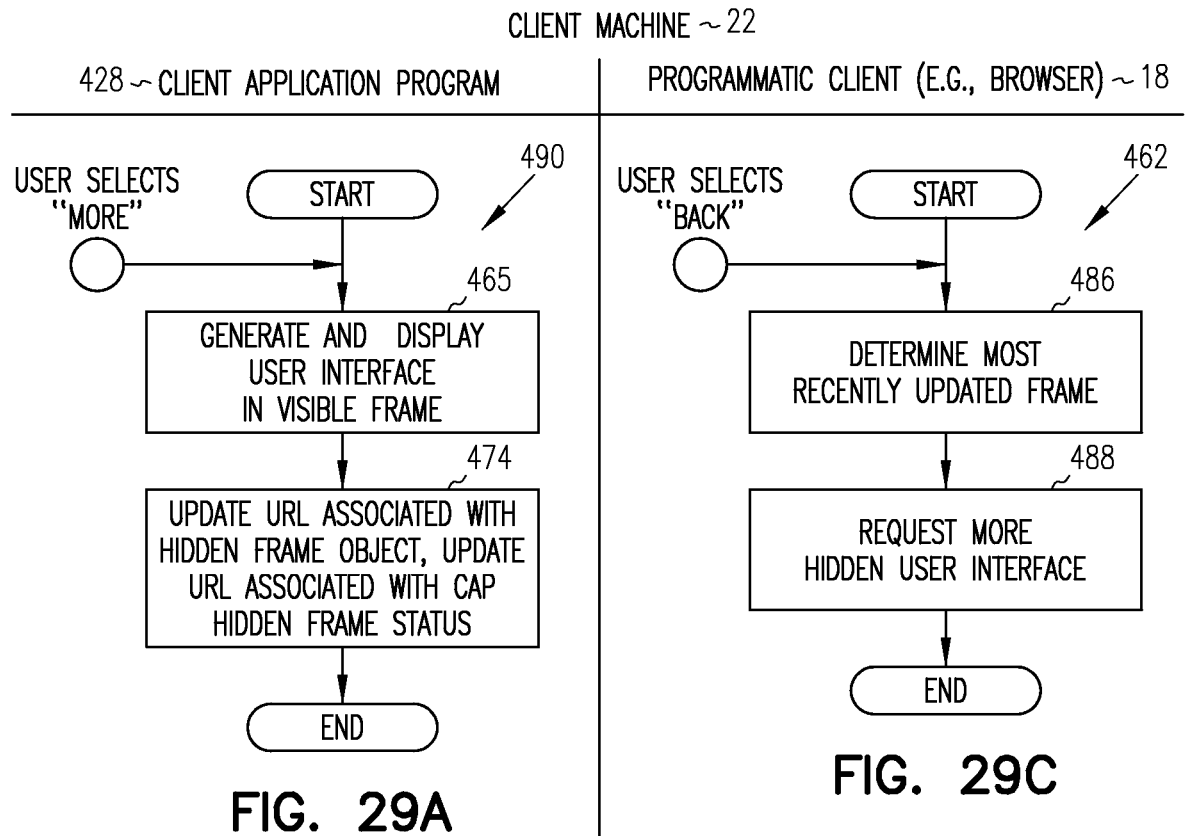
FIG. 29A
FIG. 29C
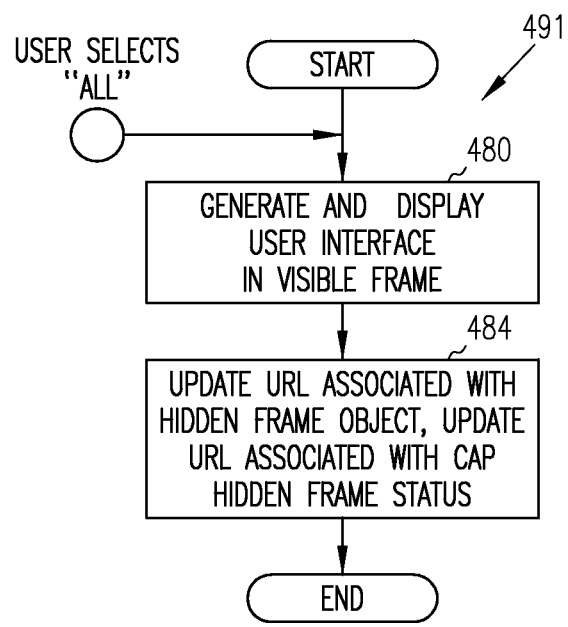
FIG. 29B

165

XYZ NETWORK-BASED MARKETPLACE

| BUY | SELL | MyXYZPLACE | HELP |

122 — TITLE: THE CAT IN THE HAT STRIKES BACK

126 — LISTING CATEGORY: CHILDREN'S BOOKS

128 — CONDITION: NEW

124 — DESCRIPTION: A DR. SEUSS CLASSIC.
YOUR KIDS WILL ENJOY THIS STORY OF A ZANY CAT THAT VISITS THE CHILDREN WHEN MOM IS GONE.
ISBN 123456

STARTTING BID: $2.00

TIME LEFT: 1 HR. 30 MIN.

XYZ NETWORK-BASED MARKETPLACE

| BUY | SELL | MyXYZPLACE | HELP |

228  228  228 — 226

109 — "NIKE  BLACK  SIZE 8"

ENTER KEYWORD QUERY

XYZ NETWORK-BASED MARKETPLACE

| BUY | SELL | MyXYZPLACE | HELP |

"BLACK NIKE SIZE 8" ~109
ENTER QUERY

111 — { 113, 113, 113 }

| COLOR  CANCEL | BRAND  CANCEL | SHOE SIZE  CANCEL | |
| BLACK | NIKE | 8 | |

117  115

284 ~ PRODUCT TYPE          SHOE STYLE            PRICE RANGE
365 ~ MEN'S SHOES (125)     ATHLETIC (101)        $5.00 – $10.00 (15)
117 { 365 ~ WOMEN'S SHOES (195)   BOOTS (25)            $10.00 – $20.00 (50)
365 ~ CHILDREN'S SHOES (40) DRESS SHOES (35)      $20.00 – $30.00 (25)

SELECT MORE . . .    SELECT MORE . . .    SELECT MORE . . .

MORE OPTIONS TO BROWSE:

CONDITION    SHOE WIDTH    SHOE SUB-STYLE    BUYING OPTIONS 58,420 ITEMS FOUND IN SHOES ~130

| | TITLE | PRICE | BIDS | TIME LEFT |
|---|---|---|---|---|
| 85 ~ | NIKE MEN'S RUNNING SHOES | $20.00 | 3 | 2HRS |
| | WOMEN'S CROSS-TRAINING SHOES | $30.00 | 2 | 3HRS |
| | CHEAP BUT GOOD SHOES | $5.00 | 0 | 4HRS |

XYZ NETWORK-BASED MARKETPLACE

| BUY | SELL | MyXYZPLACE | HELP |

"BLACK NIKE SIZE 8"
ENTER QUERY

| COLOR  CANCEL | BRAND  CANCEL | PRODUCT TYPE  CANCEL |
| BLACK | NIKE | MEN'S SHOES |

303

| SHOE SIZE ~284 | SHOE STYLE | PRICE RANGE |
| 7 (120) | ATHLETIC (100) | $5.00 – $10.00 (16) |
| 8 (110) | BOOTS (35) | $10.00 – $20.00 (65) } 365
| 9 (118) | DRESS SHOES (45) | $20.00 – $30.00 (35) |
| SELECT MORE ... | SELECT MORE ... | SELECT MORE ... |

MORE OPTIONS TO BROWSE:

CONDITION    SHOE SUB-STYLE    BUYING OPTIONS    SHOE WIDTH 58,420 ITEMS FOUND IN SHOES ~130

| | TITLE | PRICE | BIDS | TIME LEFT |
|---|---|---|---|---|
| 85 | NIKE MEN'S RUNNING SHOES | $20.00 | 3 | 2HRS |
| | EXCELLENT CROSS-TRAINING SHOES | $30.00 | 2 | 3HRS |
| | CHEAP MEN'S SHOES | $5.00 | 0 | 4HRS |

XYZ NETWORK-BASED MARKETPLACE

| BUY | SELL | MyXYZPLACE | HELP |

"BLACK NIKE SIZE 8"
ENTER QUERY

| COLOR  CANCEL | BRAND  CANCEL | PRODUCT TYPE  CANCEL |
| BLACK | NIKE | MEN'S SHOES |

307 — CONDITION    SHOE SIZE    SHOE STYLE    PRICE RANGE

472 — 20 ITEMS FOUND IN SHOES — 130

| TITLE | PRICE | BIDS | TIME LEFT |
|---|---|---|---|
| NIKE MEN'S RUNNING SHOES | $20.00 | 3 | 2HRS |
| EXCELLENT CROSS-TRAINING SHOES | $30.00 | 2 | 3HRS |
| CHEAP MEN'S SHOES | $5.00 | 0 | 4HRS |
| SHOES FOR SALE – EXCELLENT | $10.00 | 0 | 6HRS |
| MEN'S SHOES | $20.00 | 0 | 2HRS |
| SIZE 8, BLACK, NIKE | $15.00 | 0 | 2HRS |

85 (brace grouping the listing rows)

FIG. 37

403 — File Edit View favorite Tools Help
405 — ← BACK ○
HTTP://www.search/visibleframe?mode=DEFAULT

XYZ NETWORK-BASED MARKETPLACE

| BUY | SELL | MyXYZPLACE | HELP |

426

"BLACK NIKE SIZE 8"

111 —
| COLOR CANCEL | BRAND CANCEL | SHOE SIZE CANCEL |
| BLACK | NIKE | 8 |

303        303        303

| TOE TYPE | SHOE STYLE | PRICE RANGE |
|---|---|---|
| MOCK (123) | ATHLETIC (100) | $10.00 – $20.00 (200) |
| OPEN TOE (13) | BOOTS (4011) | $20.00 – $30.00 (332) |
| PLAIN TOE (18) | DRESS (111) | $30.00 – $40.00 (446) |
| MORE | MORE | MORE — 470 |

— 286

58,420 ITEMS FOUND IN SHOES — 472

| TITLE | PRICE | BIDS | TIME LEFT |
|---|---|---|---|
| NIKE MEN'S RUNNING SHOES | $25.00 | 4 | 2HRS |
| BLACK-SHOES-CROSS TRAINING | $45.00 | 0 | 6HRS |
| WOMEN'S SHOES | $15.00 | 4 | 1HR |
| CHEAP MEN'S RUNNING SHOES | $5.00 | 2 | 2HRS |

403 — File Edit View favorite Tools Help
405 — ← BACK ○
HTTP://www.search/visibleframe?mode=DEFAULT

XYZ NETWORK-BASED MARKETPLACE

| BUY | SELL | MyXYZPLACE | HELP |

"BLACK NIKE SIZE 8"

111 — 
| COLOR  CANCEL | BRAND  CANCEL | SHOE SIZE  CANCEL |
| BLACK | NIKE | 8 |

466

PRICE RANGE ~303

468 —
- ☐ $.00 – $5.00 (25)     ☐ $15.00 – $20.00 (111)    ☐ $30.00 – $35.00 (333)
- ☐ $5.00 – $10.00 (400)  ☐ $35.00 – $40.00 (123)    ☐ $40.00 – $45.00 (69)
- ☐ $10.00 – $15.00 (500) ☐ $25.00 – $30.00 (120)    ☐ $45.00 – $50.00 (321)

—286

ALL ~473

| 58,420 ITEMS FOUND IN SHOES ~472 | | | |
|---|---|---|---|
| TITLE | PRICE | BIDS | TIME LEFT |
| NIKE MEN'S RUNNING SHOES | $25.00 | 4 | 2HRS |
| BLACK-SHOES-CROSS TRAINING | $45.00 | 0 | 6HRS |
| WOMEN'S SHOES | $15.00 | 4 | 1HR |
| CHEAP MEN'S RUNNING SHOES | $5.00 | 2 | 2HRS |

(85 brackets the four item rows)

METHODS AND SYSTEMS TO PROCESS A SELECTION OF A BROWSER BACK BUTTON

RELATED APPLICATIONS

The present application is a continuation of U.S. patent application Ser. No. 11/241,824, filed Sep. 29, 2005, which claims the priority benefit of U.S. Provisional Application Ser. No. 60/666,549, filed Mar. 30, 2005, the benefit of priority of each of which is claimed hereby, and each are incorporated herein by reference in their entirety.

TECHNICAL FIELD

This application relates generally to the technical field of data communication and, in one example embodiment, methods and systems to process a selection of a browser back button.

BACKGROUND

A user that selects a browser back button is sometimes surprised to see their computer display a user interface that he or she did not expect. This problem may arise when a program (e.g., an applet) is loaded onto the user's computer (e.g., via a web page) and executes at the user's computer to update the display without communicating the update to the browser. Consequently, the browser may unwittingly retrieve a user interface that is not expected by the user in response to the user selecting the back button associated with the browser.

SUMMARY OF INVENTION

There is provided a system to process a selection of a browser back button at a client machine, the system including: at the client machine, a programmatic client to receive a browser back button selection, associate the browser back button selection to a first user interface identifier and retrieve the first user interface based on the first user interface identifier; and at the client machine, a client application program to associate the first user interface identifier to a second user interface and display the second user interface responsive to selection of the browser back button There is further provided a system to process a selection of a browser back button, the system including: at a server machine, a receiving module to receive a request for a user interface message that includes a client application program; and at the server machine, a communicating module to communicate the user interface message that includes the client application program to the client machine, the client application to associate a first user interface identifier to a second user interface and to display the second user interface at the client machine responsive to a browser that receives a browser back button selection, associates the browser back button selection to a first user interface identifier and retrieves the first user interface based on the first user interface identifier.

BRIEF DESCRIPTION OF THE DRAWINGS

Embodiments of the present invention are illustrated by way of example and not limitation in the figures of the accompanying drawings, in which like references indicate similar elements and in which:

FIG. 29A illustrate a method, according to an embodiment, to process a user selection of the "more" user interface element;

FIG. 29B illustrate a method, according to an embodiment, to process a user selection of the "ALL" user interface element;

FIG. 29C illustrate a method, according to an embodiment, to process a user selection of the back button;

FIGS. 30-40 illustrate user interface screens, according to an example embodiment of the present invention.

DETAILED DESCRIPTION

Figure 1:
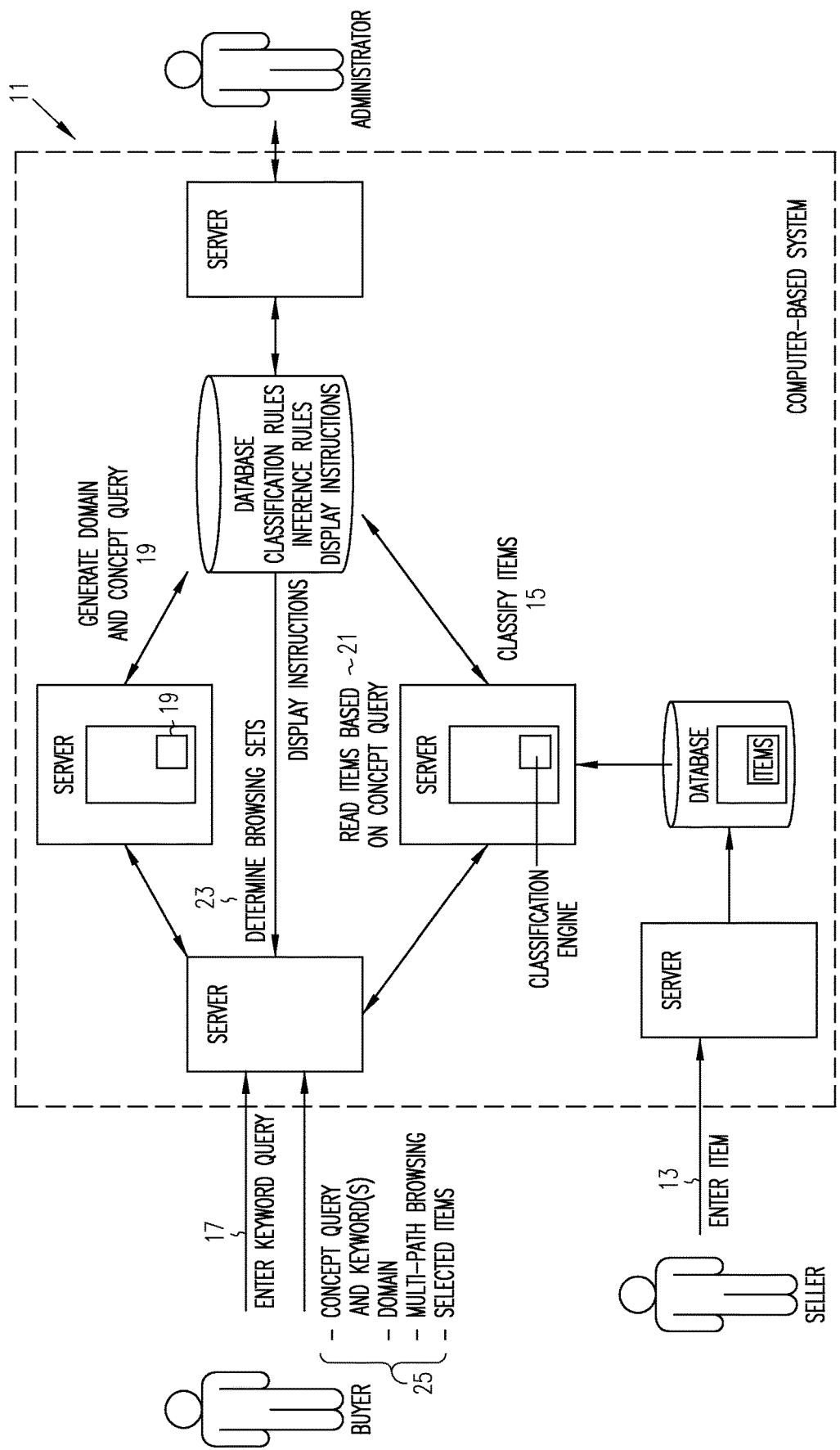
FIG. 1 is a block diagram illustrating a system, according to an embodiment, to search a data resource.

Methods and systems to process a selection of a browser back button are described. In the following description, for purposes of explanation, numerous specific details are set forth in order to provide a thorough understanding of the present invention. It will be evident, however, to one skilled in the art that the present invention may be practiced without these specific details.

According to a first aspect there is provided a method and system to facilitate searching of a data resource. The system receives information from a seller, that is associated with an item and evaluates the received information in real time with a rule that includes an expression (e.g., Boolean) and supplemental information. If the expression evaluates true, the system associates and stores, in real time, the supplemental information with the received information in a data resource. The supplemental information may include classification information and inferential information. The classification information may be utilized to structure the information according to concepts that may be later utilized to search the information. The inferential information be inferred from the received information (e.g., the color red may be inferred from the color ruby because ruby is a type of red) and may also be later utilized to search the information.

According to a second aspect there is provided a method and system to generate a query to search a data resource utilized by a seller and a buyer that transact an item in a network-based marketplace. The system receives a keyword query, from a buyer, and evaluates the keywords in the keyword query with a rule that includes an expression (e.g., Boolean) and classification information. If the expression evaluates true, then the system generates a concept query that corresponds to the keyword query and includes the classification information. The concept query may subsequently be used to search information in a data resource (e.g., query) that includes the classification information (e.g., according to the first aspect described above) that is generated from information that is entered by the seller.

According to a third aspect there is provided a method and system to enable a buyer to browse listings that are listed by sellers on a network-based marketplace. The system generates a user interface that displays a concept and multiple values that are associated with the concept. The system may receive two or more selections from the buyer that correspond to values that may be utilized to identify the listings on the network-based marketplace. For example, a user interface for shoes may include brands (e.g., concept) and brand names including Nike, Reebok, Keds, etc. (e.g., values). The buyer may then select two or more brand names that are received by the system and utilized by the system to identify and display shoes that exhibit the selected values (e.g., Nike and Reebok) based on information entered by the seller.

According to a fourth aspect there is provided a method and system to cancel characteristics used to identify data listings that are listed by sellers on a network-based marketplace. The system communicates a set of characteristics, utilized to identify listings that may have been selected by a user to identify data items. The user may then cancel a characteristic other than a most recently selected characteristic. In response, the system may utilize the remaining characteristics to identify data items that are determined to exhibit the remaining characteristics based on an evaluation of information that is entered by the seller.

According to a fifth aspect there is provided a method and system to determine the size of an area associated with a user interface that is utilized to display data items to a user. The system receives a request for a user interface that includes two areas that are complementary in size. The system uses the first area to display data items and the second area to display browsing options that may be selected by the user to identify data items in a data source. The system automatically determines a size associated with the area to display data items by computing a number of data items that are to be displayed in the first area. If the number of data items to be displayed in the first area exceeds a predetermined threshold then the system decreases the area to display data items and increases the area associated with the browsing options. Accordingly, a high count of data items may trigger the generation of user interface that emphasizes browsing options that may be selected by the user to identify data items in a data source.

According to a sixth aspect there is provided a method and system to process a selection of a browser back button at a client computer. The system, at the client computer, receives a browser back button selection that is processed by a browser that retrieves a user interface that does not include displayable user interface elements. The identity of the retrieved user interface is monitored by a client application program (e.g., script, applet, etc.) that utilizes the identity of the requested user interface to identify a user interface that the user expects to be displayed responsive to selection of the back button.

Overview

FIG. 1 is a block diagram illustrating a computer-based system 11, according to an embodiment, to search a data resource. The system 11 is described to provide an example context for what follows. At operation 13, an author or publisher (e.g., a seller) enters information including information items (e.g., an item description) into a client computer. The client computer communicates the information to the system 11 (e.g., a computer-based system), where it is stored in a database. The item description (or listing) may include a title, a description, one or more listing categories, etc.

At operation 15, a classification engine determines a domain for the received information (e.g., whether the item description relates to a shoe, toy, book, etc.), adds classification and inference tags to the received information and stores the classification tags and the inference tags with the received information in a data resource (e.g., memory, database, storage device, etc.). The classification engine determines a domain for the item by applying domain specific queries to the item. The classification engine may add classification tags to the received information responsive to the application of classification rules to the received information. For example, the classification engine may read "ruby" (e.g., item information) and respond by generating "color=ruby" (e.g., classification tag). Accordingly, the item information "ruby" is structured under the concept "color." In addition, the classification engine may add inference tags responsive to the application of inference rules to the item information and the classification tags. For example, the classification engine may read "color=ruby" (e.g., classification tag) and respond by generating "color=red" (e.g., inference tag). Accordingly, the inference tag "color=red" adds information to the item information by inferring that "ruby" is a type of "red."

At operation 17, a user enters a keyword query that is received by a client computer that communicates the keyword query to the computer-based system 11.

At operation 19, the keyword query is received and utilized by search applications to generate a domain and a conceptual query. For example the keyword query "Nike Black Size 8" may be utilized to generate the domain "shoes" and the conceptual query "Brand=Nike", "Color=black", Size=Size 8."

At operation 21, the domain and the conceptual query are received by the classification engine and utilized to find information (e.g., item listings) for presentation to the buyer. Continuing with the present example, the classification engine may search for item listings in the domain "shoes" that includes classification tags or inference tags that match the conceptual query "Brand=Nike" or "Color=black" or Size=Size 8."

At operation 23, the search applications may determine browsing sets to enable the user to further refine their search. A browsing set may include a browsing concept (e.g., Price Range) and multiple browsing values (e.g., $1.00 to $5.00, $5.00 to $10.00, $10.00 to $15.00). The user may select a browsing value which effectively specifies a browsing characteristic, a browsing concept—browsing value pair (e.g., Price Range—$1.00-$5.00). Accordingly, the search applications may determine multiple browsing characteristics that may be selected by the user.

At operation 25, the computer-based system 11 presents the concept query, the domain, the multiple browsing characteristics, and the list of items to the user.

Definitions

The word "value" in this document means numerical information or textual information or numerical information signifying textual information (e.g., 1=Red, 2=Blue, etc.) or textual information signifying numerical information or any combination thereof.

The phrase "real time" in this document means with little or no delay.

Platform Architecture

Figure 2:
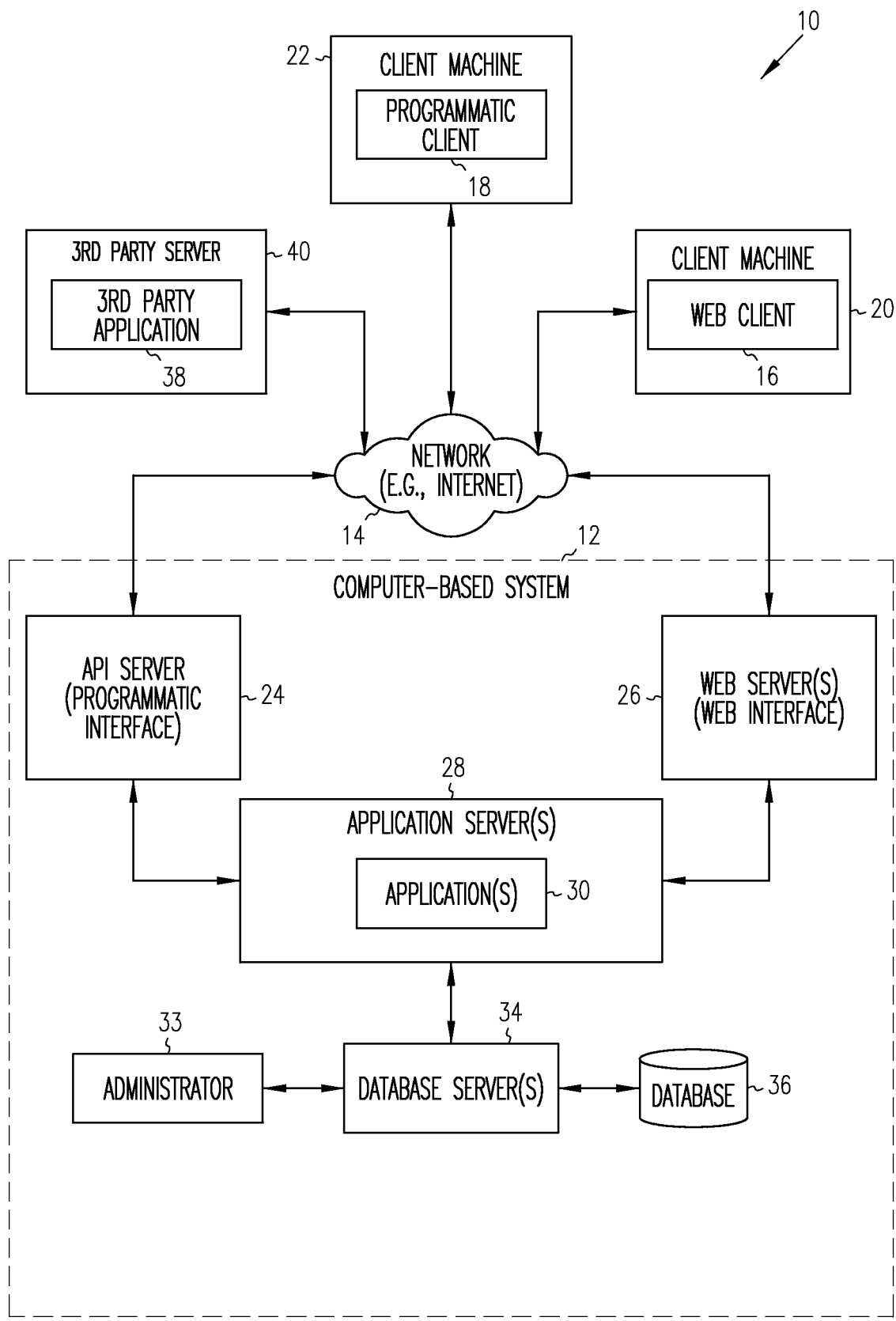
FIG. 2 is a network diagram depicting a system, according to one embodiment, to search a data resource.

FIG. 2 is a network diagram depicting a system 10, according to one embodiment, having a client-server architecture. A computer-based system platform 12 (e.g., a computer-based system) provides server-side functionality, via a network 14 (e.g., the Internet) to one or more clients. FIG. 2 illustrates, for example, a web client 16 (e.g., a browser, such as the Internet Explorer browser developed by Microsoft Corporation of Redmond, Wash. State), and a programmatic client 18 executing on respective client machines 20 and 22.

Turning specifically to the computer-based system 12, an Application Program Interface (API) server 24 and a web server 26 are coupled to, and provide programmatic and web interfaces respectively to, one or more application servers 28. The application servers 28 host one or more applications 30. The application servers 28 are, in turn, shown to be coupled to one or more databases servers 34 that facilitate access to one or more databases 36. The computer-based system 12 is further shown to include an administrator 33 may enter metadata (e.g., search metadata) that may be stored via the database servers 34 in the database 36.

The applications 30 provide a number of commerce functions and services to users that access the computer-based system 12.

Further, while the system 10 shown in FIG. 2 employs a client-server architecture, the aspects described in this application of course are not limited to such an architecture, and could equally well find application in a distributed, or peer-to-peer, architecture system. The various applications 30 could also be implemented as standalone software programs, which do not necessarily have networking capabilities.

The web client 16, it will be appreciated, accesses the various applications 30 via the web interface supported by the web server 26. Similarly, the programmatic client 18 accesses the various services and functions provided by the applications 30 via the programmatic interface provided by the API server 24. The programmatic client 18 may, for example, be a seller application (e.g., the TurboLister application developed by eBay Inc., of San Jose, Calif.) to enable sellers to author and manage listings on the computer-based system 12 in an off-line manner, and to perform batch-mode communications between the programmatic client 18 and the computer-based system 12.

FIG. 2 also illustrates a third party application 38, executing on a third party server machine 40, as having programmatic access to the computer-based system 12 via the programmatic interface provided by the API server 24. For example, the third party application 38 may, utilizing information retrieved from the computer-based system 12, support one or more features or functions on a website hosted by the third party. The third party website may, for example, provide one or more promotional, commerce or payment functions that are supported by the relevant applications of the computer-based system 12.

Applications

Figure 3:
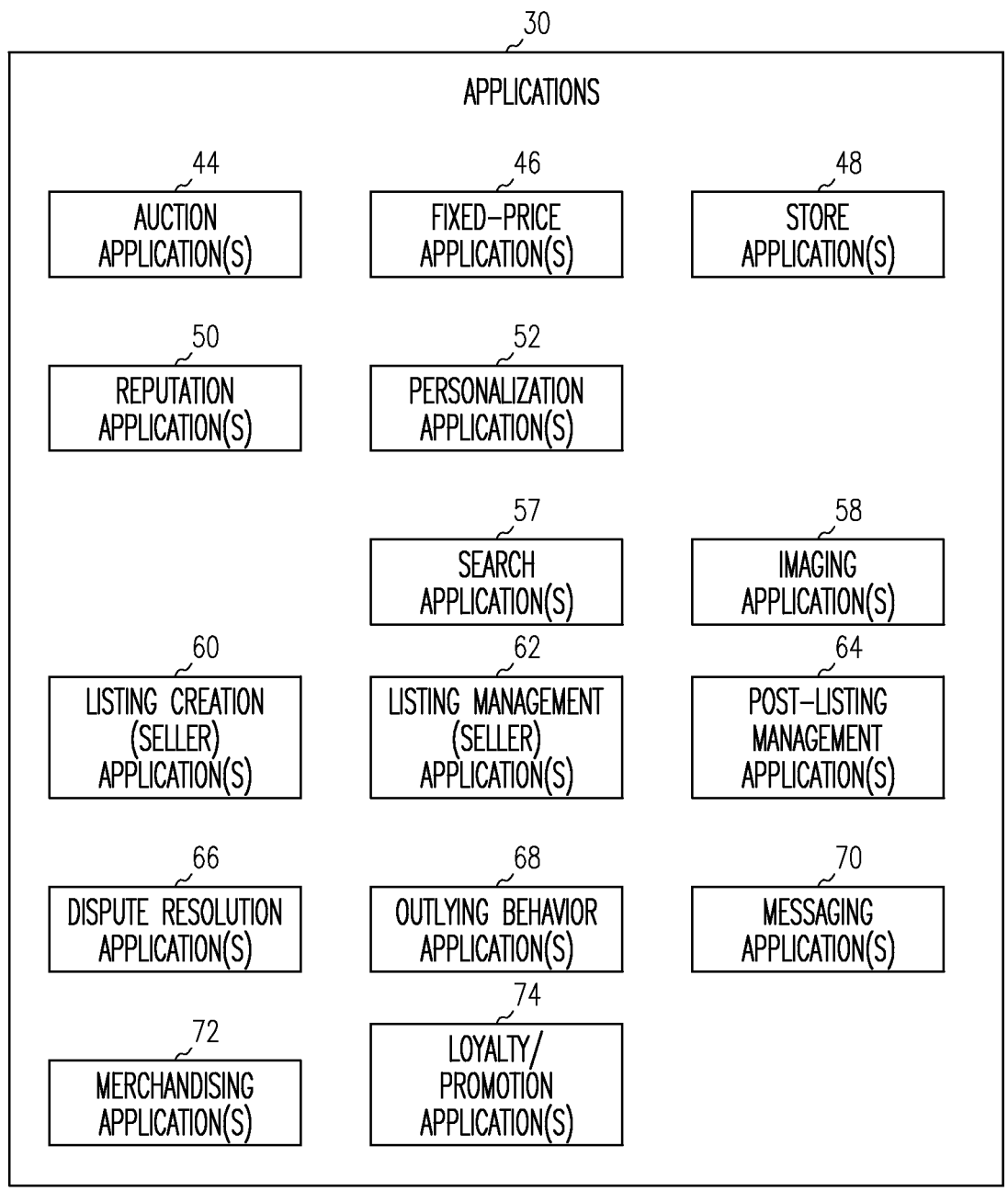
FIG. 3 is a block diagram illustrating multiple applications that, in one example embodiment of the present invention, are provided as part of the computer-based system.

FIG. 3 is a block diagram illustrating multiple applications 30 that, in one example embodiment, are provided as part of the computer-based system 12. In an exemplary embodiment in which the computer-based system may support a network-based marketplace, the computer-based system 12 may provide a number of listing and price-setting mechanisms whereby a seller may list goods or services for sale, a buyer can express interest in or indicate a desire to purchase such goods or services, and a price can be set for a transaction pertaining to the goods or services. To this end, the applications 30 are shown to include one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the computer-based system 12 to establish, build and maintain reputations, which may be made available and published to potential trading partners. Consider that where, for example, the computer-based system 12 supports person-to-person trading, users may have no history or other reference information whereby the trustworthiness and credibility of potential trading partners may be assessed. The reputation applications 50 allow a user, for example through feedback provided by other transaction partners, to establish a reputation within the computer-based system 12 over time. Other potential trading partners may then reference such a reputation for the purposes of assessing credibility and trustworthiness.

Personalization applications 52 allow users of the computer-based system 12 to personalize various aspects of their interactions with the computer-based system 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the computer-based system 12 and other parties.

In one embodiment, the computer-based system 12 may support a number of commerce systems that are customized, for example, for specific geographic regions. A version of the computer-based system 12 may be customized for the United Kingdom, whereas another version of the computer-based system 12 may be customized for the United States. Each of these versions may operate as an independent commerce system, or may be customized (or internationalized) presentations of a common underlying commerce system.

Navigation and such of a service (e.g., the network-based marketplace) supported by the computer-based system 12 may be facilitated by one or more search applications 57. For example, the search applications 57 may enable the classification of information (e.g., item listings) published via the computer-based system 12, and may also enable the subsequent searching of the items with keyword queries, concept queries, and multi-path browsing.

In order to make information, available via the computer-based system 12, as visually informing and attractive as possible, the applications 30 may include one or more imaging applications 58 utilizing which users may upload images for inclusion within listings. An imaging application 58 also operates to incorporate images within viewed information. The imaging applications 58 may also support one or more promotional features, such as image galleries that are presented to potential buyers. For example, sellers may pay an additional fee to have an image included within a gallery of images for promoted item information.

Authoring/publishing applications, in the example form of the listing creation applications 60, allow authors/publishers sellers conveniently to author information (e.g., listings pertaining to goods or services that they wish to transact via the computer-based system 12), and application management applications (e.g., listing management applications 62) allow authors/publishers to manage such published information. For example, where a particular seller has authored and/or published a large number of listings, the management of such listings may present a challenge. The listing management applications 62 provide a number of features (e.g., auto-relisting, inventory level monitors, etc.) to assist the seller in managing such listings. One or more post-listing management applications 64 also assist sellers with a number of activities that typically occur post-listing. For example, upon completion of an auction facilitated by one or more auction applications 44, a buyer may wish to leave feedback regarding a particular seller. To this end, a post-listing management application 64 may provide an interface to one or more reputation applications 50, so as to allow the buyer conveniently to provide feedback regarding a seller to the reputation applications 50. Feedback may take the form of a review that is registered as a positive comment, a neutral comment or a negative comment. Further, points may be associated with each form of comment (e.g., +1 point for each positive comment, 0 for each neutral comment, and −1 for each negative comment) and summed to generate a rating for the seller.

Dispute resolution applications 66 provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third party mediator or arbitrator.

A number of outlying behavior applications 68 implement various fraud detection and prevention mechanisms to reduce the occurrence of fraud within the computer-based system 12, and customer segmentation mechanisms to identify and classify high value users.

Messaging applications 70 are responsible for the generation and delivery of messages to users of the computer-based system 12, such messages for example advising users regarding the status of listings at the computer-based system 12 (e.g., providing "outbid" notices to bidders during an auction process or to provide promotional and merchandising information to users).

Merchandising applications 72 support various merchandising functions that are made available to sellers to enable sellers to increase sales via the computer-based system 12. The merchandising applications 72 also operate the various merchandising features that may be invoked by sellers, and may monitor and track the success of merchandising strategies employed by sellers.

The computer-based system 12 itself, or one or more parties that transact via the computer-based system 12, may operate loyalty programs that are supported by one or more loyalty/promotions applications 74. For example, a buyer may earn loyalty or promotions points for each transaction established and/or concluded with a particular seller, and be offered a reward for which accumulated loyalty points can be redeemed.

Data Structures

Figure 4:
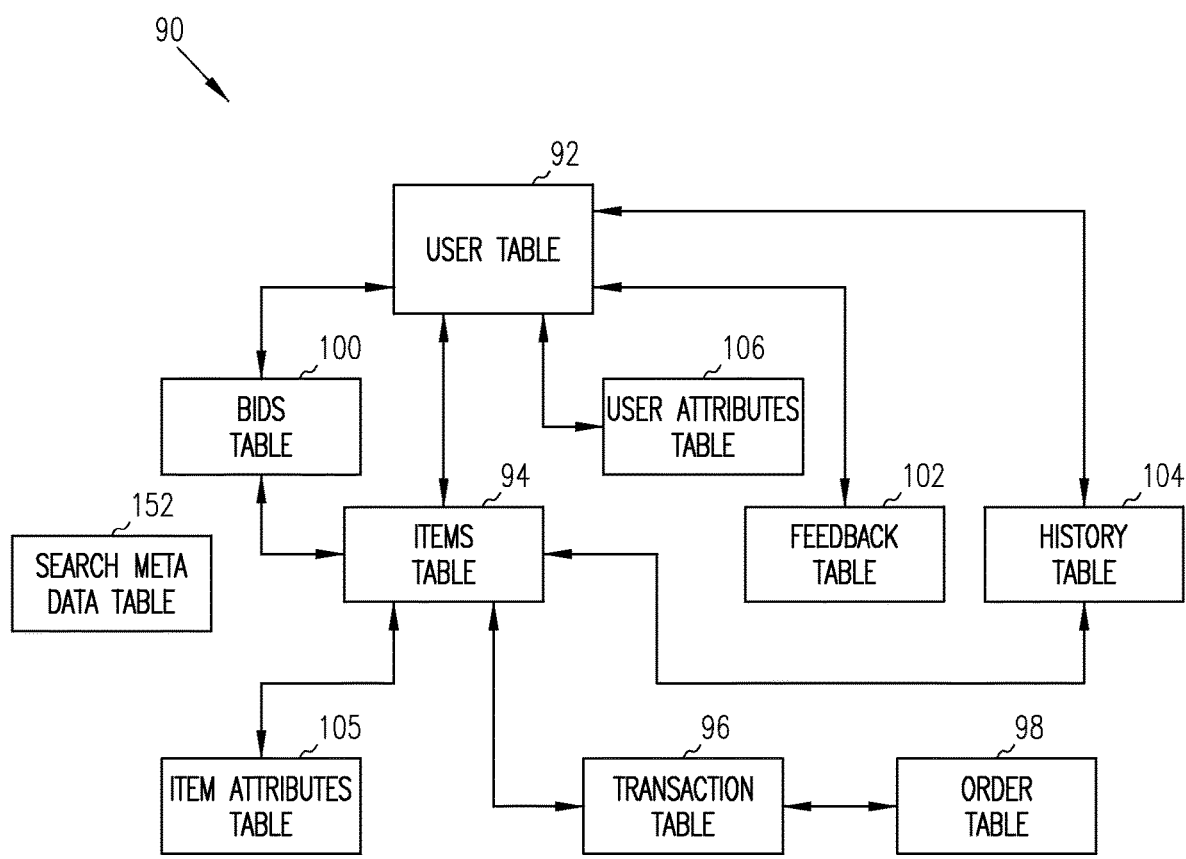
FIG. 4 is a high-level entity-relationship diagram, illustrating various tables that are utilized by and support the network-based applications, according to an example embodiment of the present invention.

FIG. 4 is a high-level entity-relationship diagram, illustrating various tables 90 that may be maintained within the databases 36, and that are utilized by and support the applications 30. While the example embodiment of the present invention is described as being at least partially implemented utilizing a relational database, other embodiments may utilize other database-architectures (e.g., an object-oriented database schema) or data organization structures.

A user table 92 contains a record for each registered user of the computer-based system 12, and may include identifier, address and financial instrument information pertaining to each such registered user. In one embodiment, a user may operate as an author/publisher (e.g., seller) and information consumer (e.g., a buyer), or both, within the computer-based system 12. In one example embodiment of the present invention, a buyer may be a user that has accumulated value (e.g., commercial or proprietary currency), and is then able to exchange the accumulated value for items that are offered for sale by the computer-based system 12.

The tables 90 also include an items table 94 in which are maintained item records for goods and services (e.g., items) that are available to be, or have been, transacted via the computer-based system 12. Each item record within the items table 94 may furthermore be linked to one or more user records within the user table 92, so as to associate a seller and one or more actual or potential buyers with each item record.

A search metadata table 152 includes search metadata to classify item information and search information (e.g., classification rules and inference rules) and to display browsing characteristics (e.g., display instructions).

A transaction table 96 contains a record for each transaction (e.g., a purchase transaction) pertaining to items for which records exist within the items table 94.

An order table 98 is populated with order records, each order record being associated with an order. Each order, in turn, may be with respect to one or more transactions for which records exist within the transactions table 96.

Bid records within a bids table 100 each relate to a bid received at the computer-based system 12 in connection with an auction-format listing supported by an auction application 44. A feedback table 102 is utilized by one or more reputation applications 50, in one example embodiment, to construct and maintain reputation information concerning users. A history table 104 maintains a history of transactions to which a user has been a party. One or more attributes tables including an item attributes table 105 that records attribute information pertaining to items for which records exist within the items table 94 and a user attributes table 106 that records attribute information pertaining to users for which records exist within the user table 92.

Searching a Data Resource

Figure 5:
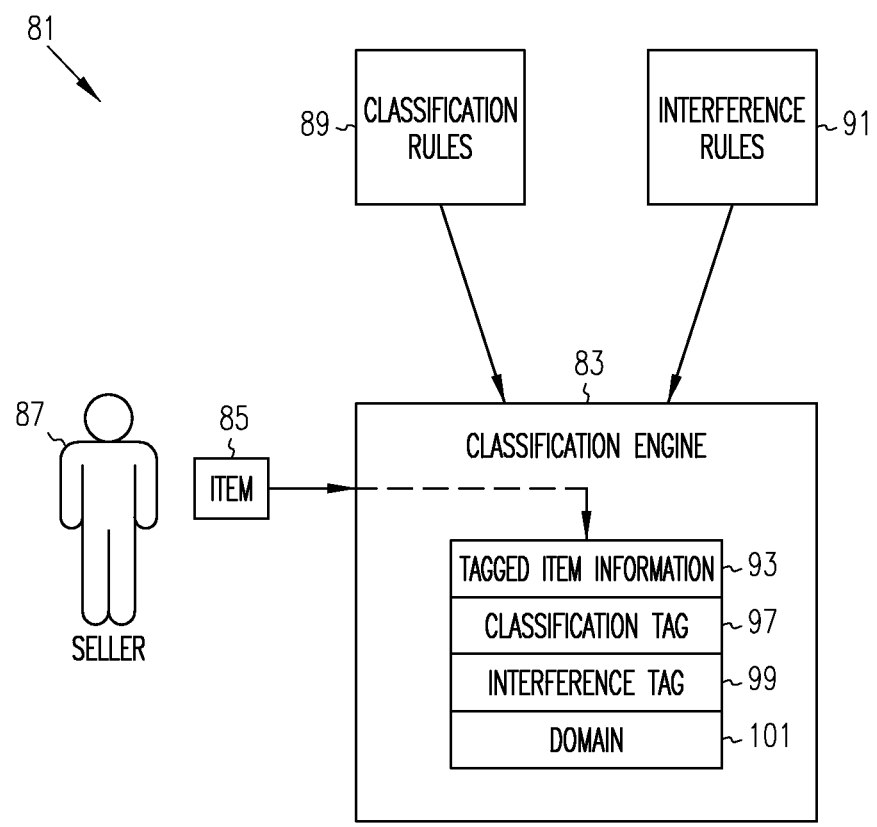
FIG. 5 is a block diagram illustrating a system, according to an embodiment, facilitate a search of a data resource.

FIG. 5 is a block diagram illustrating a system 81, according to an embodiment, to facilitate a search of a data resource. The system 81 is described to provide an example overview for what follows. The system 81 includes a classification engine 83, classification rules 89, and inference rules 91. The classification engine 83 is shown to receive an information (e.g., an item listing 85) from an author/publisher (e.g., a seller 87), generate a tagged item information 93 (e.g., a tagged item listing 93) that includes classification tags 97, inference tags 99 and store the tagged item information 93 in the classification engine 83. The classification engine 83 utilizes the classification rules 89 and the inference rules 91 to generate and apply the classification tags 97 and the inference tags 99 to the information.

Figure 6:
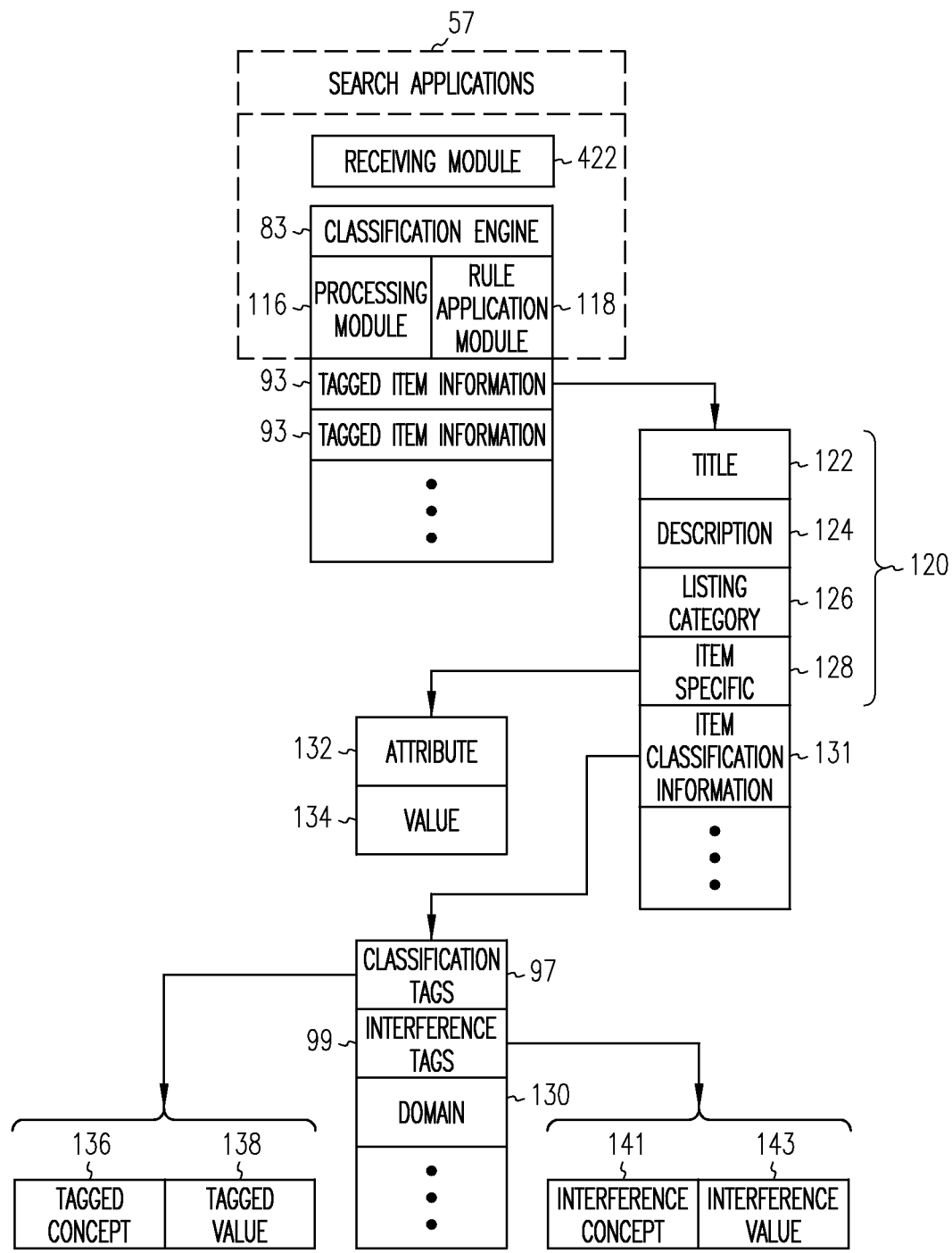
FIG. 6 is a block diagram illustrating search applications and search related data structures, according to an embodiment, to classify an information item.

FIG. 6 is a block diagram illustrating search applications 57 and search related data structures, according to an embodiment, to classify information (e.g., item information). The search applications 57 include a receiving module 422 and a classification engine 83. The receiving module 422 may receive information or information items (e.g., item information 120) that may have been entered by a user (e.g., a seller) from a client machine. The receiving module 422 may add catalog information to the item information 120, store the item information 120 in a database and communicates the item information 120 to the classification engine 83. The classification engine 83 includes a processing module 116, a rule application module 118 and tagged information (e.g., tagged item information 93). The tagged item information 93 includes item information 120 and item classification information 131.

The processing module 116 associates one or more domains 130 with the item information 120 and generates a set of item classification information 131 for each domain 130. Finally, the processing module 116 stores the item information 120, item classification information 131, and domains 130 in the classification engine 83.

The rule application module 118 applies classification rules and inference rules to generate classification tags 97 and/or inference tags 99 tags that are stored in the item classification information 131.

The item information 120 includes a title 122, a description 124, one or more listing categories 126, one or more optional item specifics 128, price information 101, selling format 103, payment method 121, shipping information 123, item location 125, buyer requirements 127, and miscellaneous information 145. The title 122 may include information in the form of alphanumeric strings that are entered by the user to provide a title for the item information 120. The description 124 may include information in the form of alphanumeric strings, pictures (e.g., JPEG, MPEG, etc.), illustrations, etc. The listing category 126 may include one or more listing categories selected by the user within which to list the item information 120 on the computer-based system 12. The item specific 128 is shown to include an attribute 132 and a value 134. The value 134 may be entered by a user from a pull down menu. For instance, item information 120 relating to a "shoe" may be associated with an item specific 128 "brand" that includes a pull down menu that lists different values 134 that correspond to brands of shoe manufacturers (e.g., Reebok, Nike, etc.). The price information 101 may include a starting price for an auction, an optional reserve price for an auction (e.g., a price below which the seller refuses to sell their item), a price for which the seller will immediately sell the item (e.g., a buyout-type listing), or other pricing related information. The selling format 103 may include information that specifies how the item is to be sold (e.g., a fixed-price selling format, an auction-format, auction types including English, Dutch, Vickery, Chinese, Double, Reverse auctions, etc.), the duration of time the item may be available for sale or for auction, and other selling format information. The payment method 121 may include information that specifies payment method (s) the seller will accept (e.g., payment service(s), credit card(s), checks, money orders, etc.). The shipping information 123 may include information that specifies the sellers shipping terms (e.g., who pays, locations the seller may or may not ship the item, etc.). The item location 125 may include information that specifies the physical location from which the item may be shipped or picked up. The buyer requirements 127 may include information that specifies which buyers are blocked from bidding on or purchasing the listed item based on criteria such as whether the buyer utilizes a specific payment service, whether the buyer utilizes a specific credit card, whether the buyer is registered in a specific country, the buyers reputation (e.g., the buyer has a feedback score of 1, 2, 3, or lower, the buyer has been identified as purchasing or winning an item in an auction and not paying for the item) and other related information.

The received information (e.g., item information 120) is supplemented with supplemental information (e.g., item classification information 131). Instances of item classification information 131 may include a domain 130, classification tags 97, and inference tags 99. Example domains 130 may include, "shoes", "toys", "books", etc. Each classification tag 97 may include a tagged concept 136 and a tagged value 138. For example, an example tagged concept 136 for the domain 130 "shoes" may include "brand" and corresponding example tagged values 138 may include "Nike", "Reebok" and "Adidas." Adding classification tags 97 (e.g., classification information) to the tagged item information 93 structures the item information 120 and, in one embodiment, enables a conceptual search of the item information 120 (e.g., from the point of view of the buyer, in the language of a buyer, etc.).

Each inference tag 99 may include an inference concept 141 and an inference value 143 (e.g., inferential information). The inference tag 99 may be added to the item classification information 131 based on the item information 120 or the classification tags 97. For example, the classification engine 83 may infer from item information 120 that a glass item made by Corning has a "region of origin" in the United States because Corning makes glass in the United States, (e.g., inference concept 141="region of origin", inference value 143="North America"). It should also be appreciated that an inference tag 99 may be utilized to broaden a tagged concept 136 or tagged value 138 and thereby bring users (e.g., a buyer or seller) together that may not otherwise be speaking the same language even though they share a common interest in information (e.g., an item listing described by the item information 120). For example, a seller may describe an item within the item information 120 as being "ruby slippers". However, the buyer may be searching for "red slippers." In this instance the classification engine 83 may add an inference tag 99 with the inference concept 141 "color" and the inference value 143 "red" based on a classification tag 97 with a tagged concept 136 "color" and a tagged value 138 "ruby."

Figure 7:
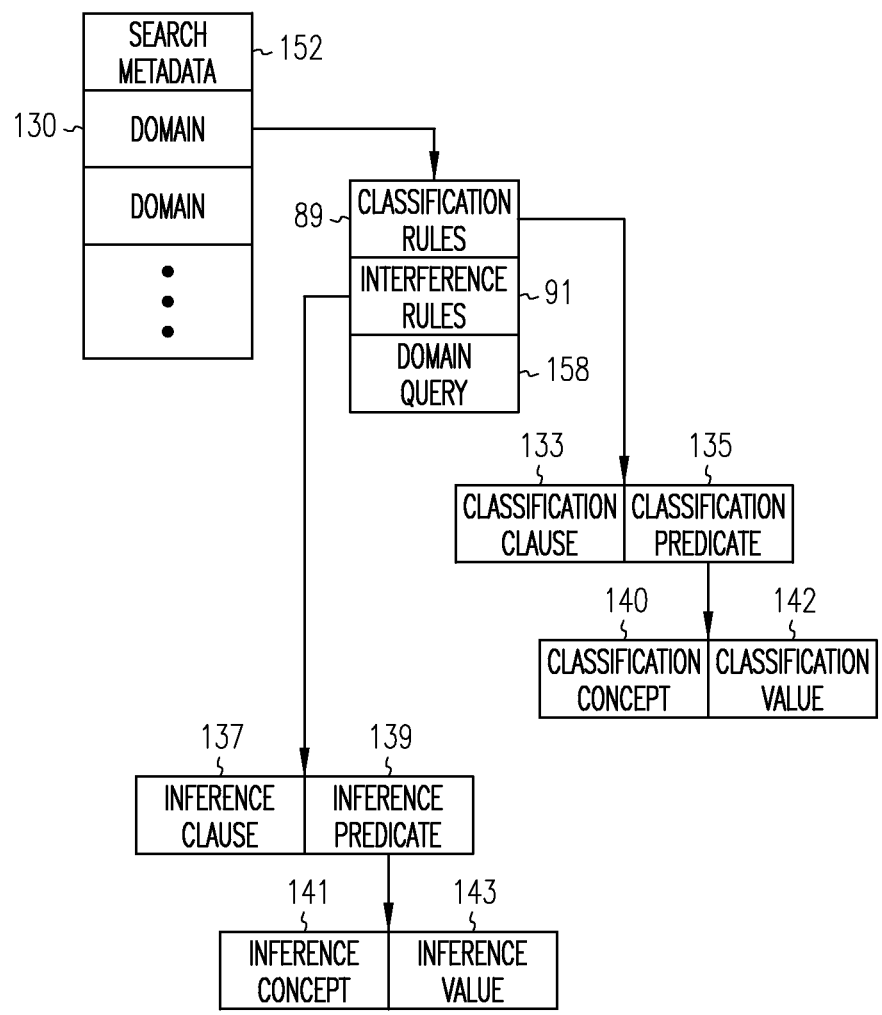
FIG. 7 is a block diagram illustrating search metadata, according to an embodiment.

FIG. 7 is a block diagram illustrating search metadata 152, according to an embodiment. The search metadata 152 is shown to include an entry for each domain 130 that may be defined in the computer-based system 12. Each domain 130 is associated with a set of classification rules 89, a set of inference rules 91 and a domain query 158. Each classification rule 89 includes a classification clause 133 that may include an expression (e.g., Boolean) and a classification predicate 135 that may be executed if the classification clause 133 evaluates TRUE. The classification predicate 135 is shown to include a classification concept 140 and a classification value 142 (e.g., classification information), as previously described. The classification rule 89 may be utilized by the classification engine 83 to apply a classification tag 97 (e.g., classification concept 140 and a classification value 142). For example, the classification engine 83 may search the item information 120 based on the classification clause 133 and, if the classification clause 133 evaluates TRUE (e.g., if title contains "ruby"), the classification engine 83 may then execute the classification predicate 135. In present example, the classification predicate 135 tags the corresponding item information 120 with the classification concept 140 and a classification value 142 (e.g., color=ruby). Henceforth the classification concept 140 and the classification value 142 may respectively be referred to as the tagged concept 136 and the tagged value 138 (e.g., color=ruby) with regard to the tagged item information 93.

Each inference rule 91 includes an inference clause 137 that may include an expression (e.g., Boolean) and an inference predicate 139 that may be executed if the inference clause 137 evaluates TRUE. The inference predicate 139 is shown to include an inference concept 141 and an inference value 143 (e.g., inferential information), as previously described. The inference rule 91 may be utilized by the classification engine 83 to apply an inference tag 99 (e.g., inference concept 141 and an inference value 143). For example, the classification engine 83 may evaluate the item information 120 and classification tags 97 by utilizing inference clause 137. If the inference clause 137 evaluates TRUE (e.g., if description 120 contains 'red' OR a tagged concept 140—tagged value 138 contains 'color=red'), the inference predicate 139 may be executed, which in the present example tags the corresponding item information 120 with additional information (e.g., the inference concept 141 and the inference value 143) (e.g., color=ruby). Henceforth the added inference concept 141 and inference value 143 may collectively be referred to as an inference tag 99 with regard to the tagged item information 93.

The domain query 158 may be utilized to identify item information 120 as included in the corresponding domain 130. The domain query 153 may include an expression (e.g., Boolean) and a domain 130 that may be associated with corresponding tagged item information 93, if the expression (e.g., Boolean) evaluates TRUE. The domain query 153 may be designed by a computer program or an administrator. For example, the expression (e.g., Boolean) associated with the domain "shoes" may require a description 124 that contains 'Nike' and a title 122 that contains 'shoes.' Another embodiment may include an expression (e.g., Boolean) that also requires an item specific 128 associated with a value 134 that indicates "cross-training" or a listing category 126 that indicates "athletic shoes."

Figure 8:
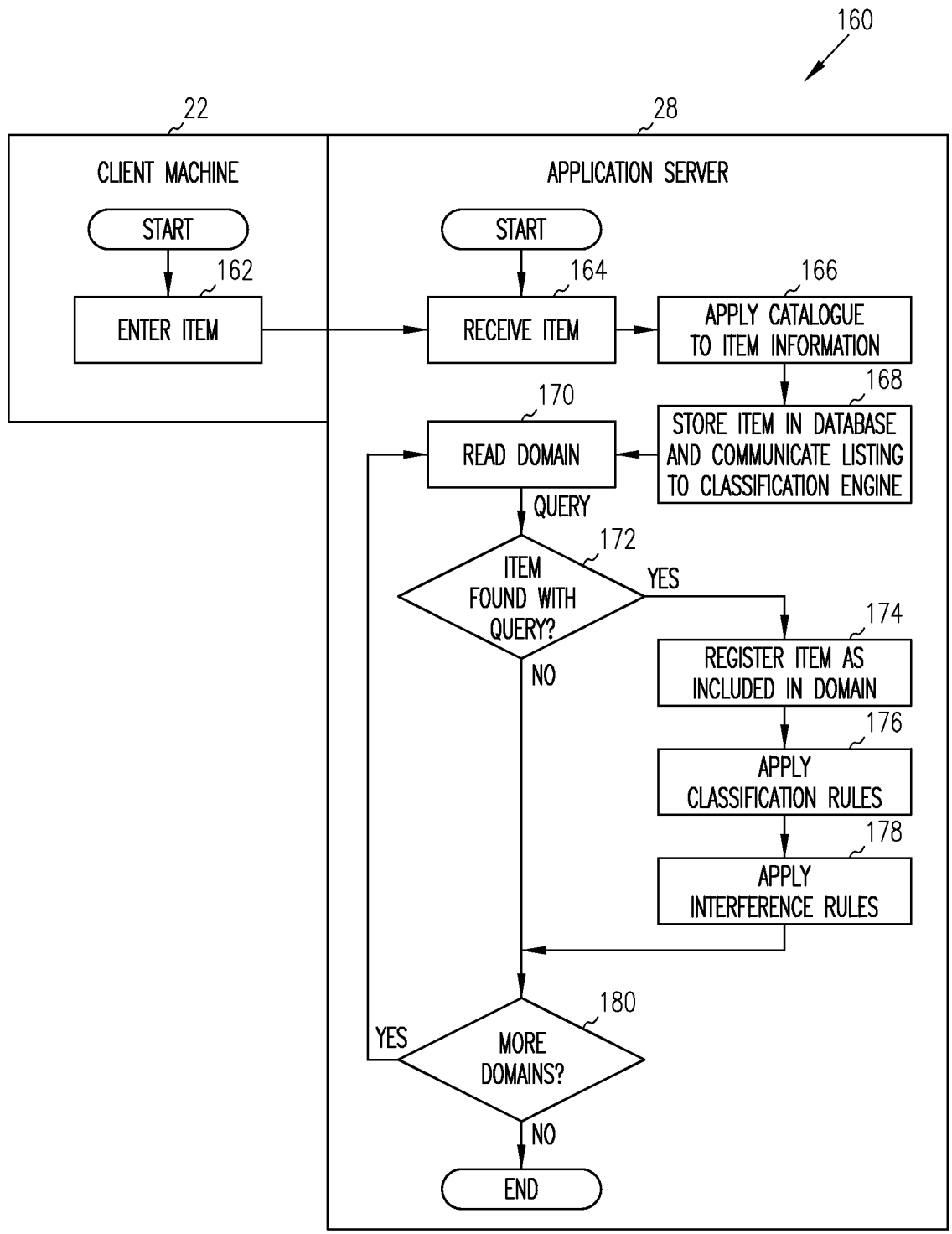
FIG. 8 is a block diagram illustrating a method, according to an embodiment, to facilitate searching a data resource.

FIG. 8 is a flowchart illustrating a method 160, according to an embodiment, to facilitate searching of a data resource. Operations performed by the client machine 22 are illustrated on the left and operations performed by the application server 28 are illustrated on the right.

Commencing at operation 162, the seller at the client machine 22 enters item information 120 (e.g., an item listing) that is communicated to the application server 28, which then receives the item information 120 (e.g., at operation 164). FIG. 30 illustrates a user interface screen 165, according to an embodiment, that displays example item information 120. The item information 120 includes a title 122, a listing category 126, an item specific 128, and a description 124 that includes an ISBN number (e.g., 123456). For example, the title 122 may be the user selected title, "The Cat in the Hat Strikes Back." The listing category 126 shows that the user selected the listing category "Children's Books". Other embodiments may show the user as having entered or selected multiple listing categories 126 (e.g., books, toys, children's classics, etc.). The item specific 128 further illustrates the condition of the book as "new." The value "new" may have been selected from a pull down menu that includes multiple values including "old", "used", "good", etc. The ISBN number (e.g., 123456) may be utilized as a trigger to add additional information.

Returning to FIG. 8, at operation 166, the receiving module 422 searches the item information 120 (e.g., title 122, the description 124, the listing category 126, item specific 128, etc.) to identify strings, values, or other information items that may trigger the addition of catalog information to the item information 120. For example, the ISBN number may trigger that addition of information (e.g., alphanumeric text, graphics, pictures, audio, multi-media, etc.) from an appropriate catalog. Indeed, the ISBN number may uniquely identify the book "The Cat in the Hat Strikes Back" and accordingly provide a trigger to include information from a catalog that may further describe the book (e.g., name of the author, number of pages, publisher, list price in new condition, picture of author, audio recording of the first chapter, etc.). Other embodiments may include other types of catalogs that may be utilized to identify information (e.g., Universal Product Numbers, Universal Product Codes, Proper Nouns, etc.) that may provide a trigger to add additional information. In another embodiment the addition of catalog information may be performed before the item has been submitted at the time the seller is entering information for the item.

At operation 168, the receiving module 422 stores the item information 120 in the database 36 and communicates the item information 120 to the classification engine 83. At operation 170, the processing module 116 generates a tagged item information 93 in the classification engine 83 and stores the item information 120 in the tagged item information 93. Next, the processing module 116 reads a domain query 158 from the search metadata 158.

At decision operation 172, the processing module 116 determines if the item described by the item information 120 entered by the user has been found with the domain query 158 by evaluating the expression (e.g., Boolean) associated with the domain query 158 against the item information 120. If the expression (e.g., Boolean) evaluates TRUE then a branch is made to operation 174. Otherwise a branch is made to decision operation 180.

At operation 174, the processing module 116 registers the item information 120 as included in the current domain 130. For example, the processing module 116 may register the item information 120 by storing the domain 130 in the item classification information 131 associated with the tagged item information 93.

At operation 176, the rule application module 118 applies classification rules 89 to the item information 120 associated with the tagged item information 93.

Figure 9:
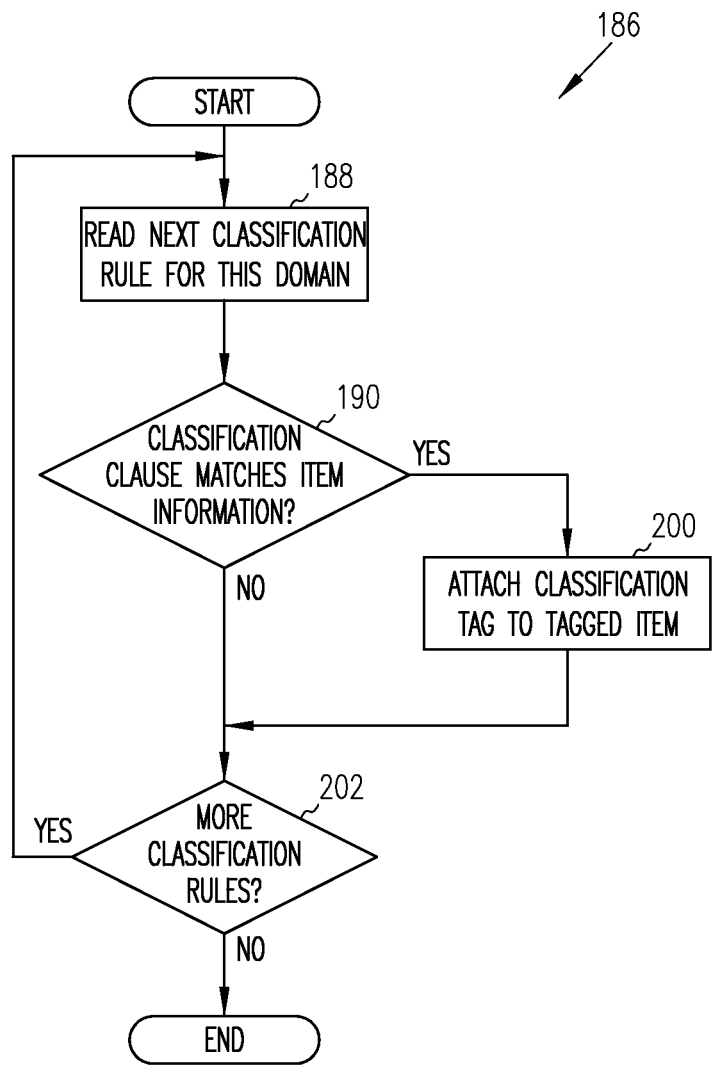
FIG. 9 is a block diagram illustrating a method, according to an embodiment, to evaluate information with a classification rule.

FIG. 9 illustrates a method 186, according to an embodiment, to evaluate information with classification rules. The method 186 commences at operation 188 with the rule application module 118 reading or selecting the next classification rule 89 from the search metadata 152 based on the current domain 130.

At decision operation 190, the rule application module 118 utilizes the classification clause 133 (e.g., 'if title contains "ruby"') associated with the classification rule 89 to evaluate the item information 120 (e.g., title 122, description 124, listing category 126, item specific 128, etc.). If the classification clause 133 evaluates to TRUE then a branch is made to operation 200. Otherwise a branch is made to decision operation 202.

At operation 200, the rule application module 118 executes the classification predicate 135 (e.g., color=ruby) associated with the classification rule 89 against the tagged item information 93. For example, rule application module 118 may attach or store the classification predicate 135 as tagged item information 93. The classification predicate 135 may henceforth be referred to as a classification tag 97 (e.g., color=ruby) with regard to the tagged item information 93.

At decision operation 202, the rule application module 118 determines if there are more classification rules 89 in the current domain 130. If there are more classification rules 89, then a branch is made to operation 188. Otherwise the method 186 ends.

Returning to FIG. 8, at operation 178, the rule application module 118 applies the inference rules 91 to the classification tags 97 associated with the tagged item information 93.

Figure 10:
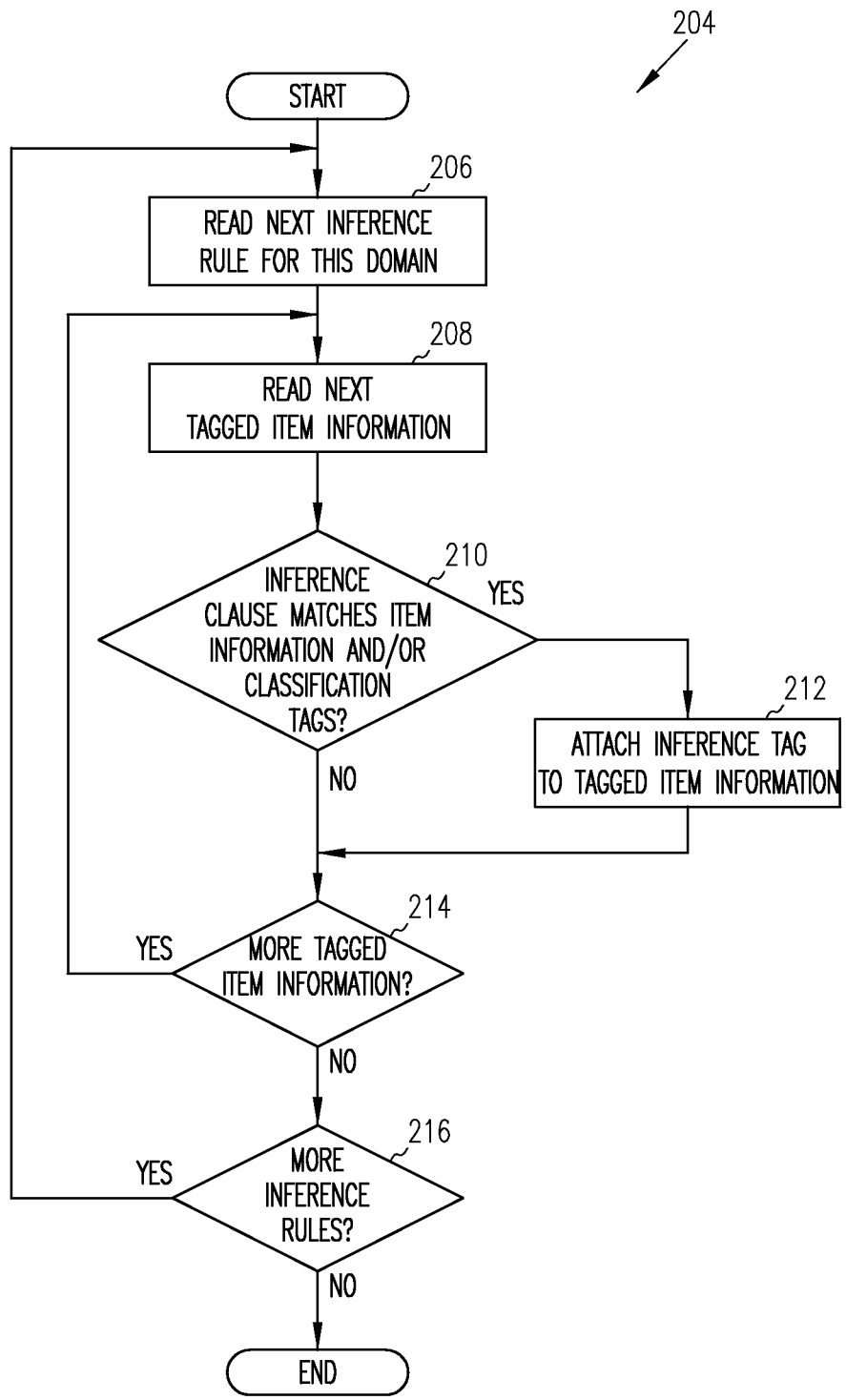
FIG. 10 is a block diagram illustrating a method, according to an embodiment, to evaluate information with an inference rule.

FIG. 10 illustrates a block diagram of a method 204, according to an embodiment, to evaluate information with inference rules 99. Commencing at operation 206, the rule application module 118 reads or selects the next inference rule 91 from the search metadata 152 based on the current domain 130.

At operation 208, the rule application module 118 reads the next tagged item information 93 (e.g., including classification tags 97) associated with the current domain 130. At decision operation 210, the rule application module 118 utilizes the inference clause 137 (e.g., "if description contains 'ruby' OR color=ruby") associated with the inference rule 91 to evaluate the item information 120 (e.g., title 122, description 124, listing category 126, item specific 128) and the classification tags 97 (e.g., color=red). If the inference clause 137 evaluates to TRUE, then a branch is made to operation 212. Otherwise a branch is made to decision operation 214.

At operation 212, the rule application module 118 executes the inference predicate 139 (e.g., color=red) associated with the inference rule 91 against the tagged item information 93. For example, the inference predicate 139 may be added or attached to the tagged item information 93. Henceforth the inference predicate 139 may be referred to as an inference tag 99 with regard to the tagged item information 93.

At decision operation 214, the rule application module 118 determines if more tagged item information 93 is associated with the current domain 130. If there is more tagged item information 93, then a branch is made to operation 208. Otherwise a branch is made to decision operation 216.

At decision operation 216, the rule application module 118 determines if more inference rules 91 may be associated with the current domain 130. If the rule application module 118 determines there are more inference rules 91, then a branch is made to operation 206. Otherwise processing ends.

Returning to FIG. 8, at operation 180, the processing module 116 determines if there are more domains 130. If the processing module 116 determines there are more domains 130, then a branch is made to operation 170. Otherwise the method 160 ends.

Another embodiment of the classification engine 83 may include a single Boolean evaluation graph. The Boolean evaluation graph may be utilized by the classification engine 83 to enhance the performance of Boolean evaluations. For example, a Boolean evaluation graph may evaluate a large set of classification rules 89 and inference rules 91 against a large set of information (e.g., item listings 85) while minimizing the total number of evaluation events computed by the classification engine 83.

Generating a Query

Figure 11:
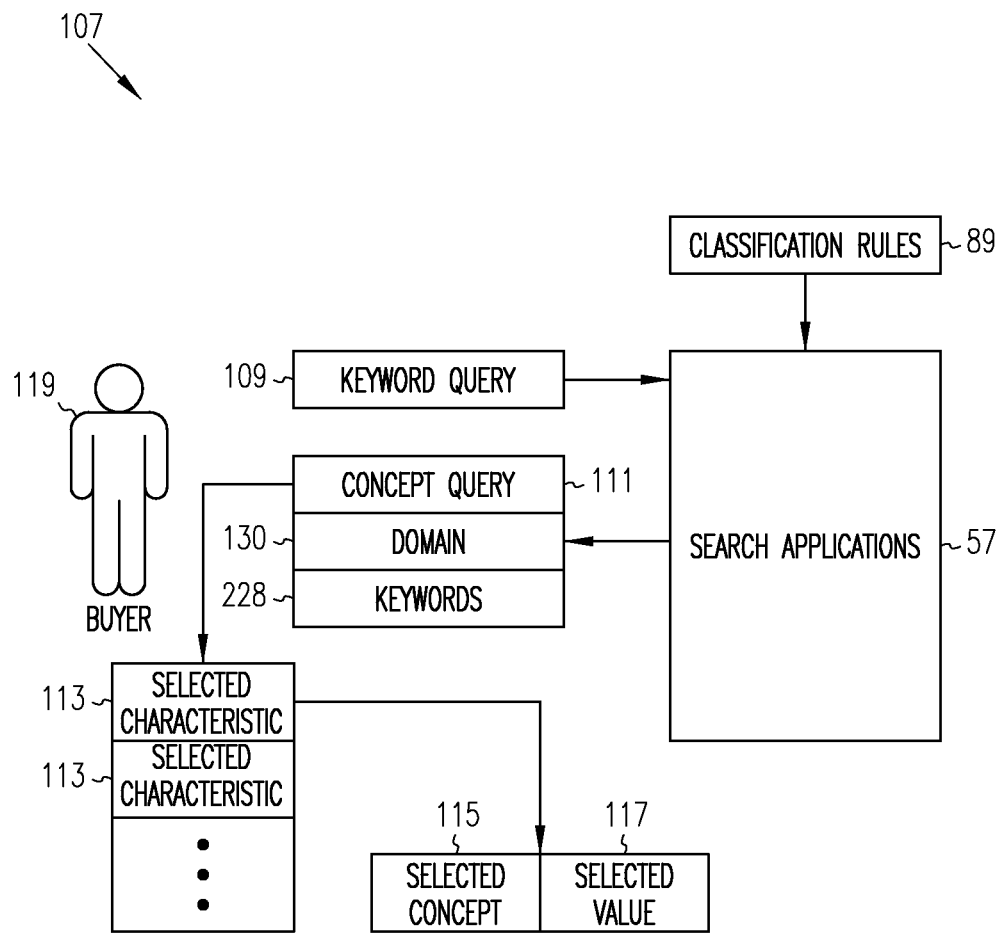
FIG. 11 is a block diagram illustrating a system, according to an embodiment, to generate a query.

FIG. 11 is a block diagram illustrating a system 107, according to an embodiment, to generate a query to search a data resource. The system 107 is described to provide an example overview for what follows. The system 107 includes search applications 57 and classification rules 89. The search applications 57 are shown to receive a keyword query 109 from a buyer 119 and respond by utilizing the classification rules 89 to determine a domain 130, generate a concept query 111 and possibly determine keywords each of which are communicated back to the buyer 119. The concept query 111 includes one or more selected characteristics 113 (e.g., classification information) that correspond to the keywords in the keyword query 109 as determined by the classification rules 89. In some instances keywords in the keyword query 109 may not correspond to a selected characteristic 113 and may be communicated back to the buyer as such. Each selected characteristic 113 includes a selected concept 115 and a selected value 117.

Figure 12:
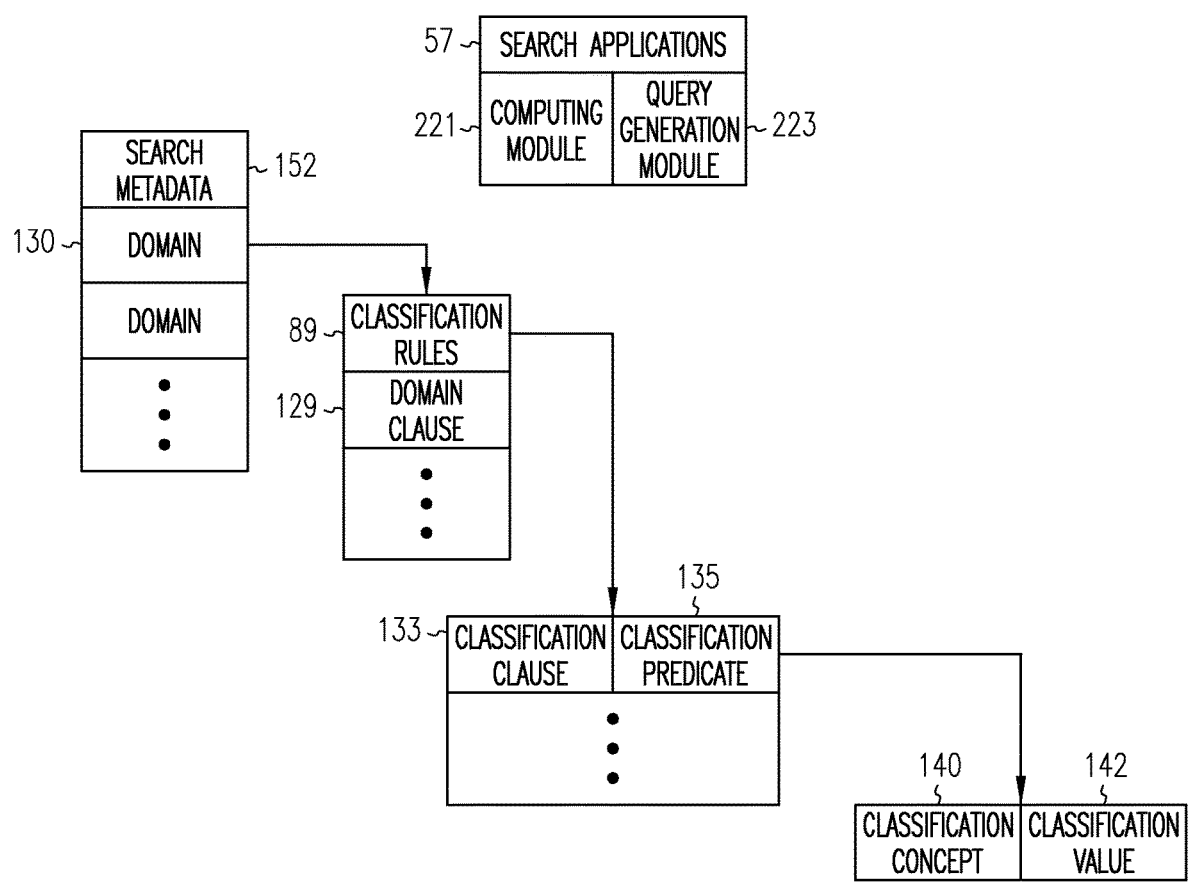
FIG. 12 is a block diagram illustrating search applications and search metadata, according to an embodiment.

FIG. 12 is a block diagram illustrating search applications 57 and search metadata 152, according to an example embodiment. The search applications 57 include a computing module 221 and a query generation module 223. The computing module 221 receives the keyword query 109 from the buyer 119, and communicates a user interface back to the buyer 119 that includes the concept query 111 and the domain 130. The query generation module 223 determines the domain 130 of the keyword query 109 and applies classification rule 89 to the keyword query 109 to generate a concept query 111 and possibly identify keywords.

The search metadata 152 may include all of the defined domains 130 for the computer-based system 12, as previously described. Each domain 130 may be associated with a domain clause 129 and classification rules 89. The domain clause 129 includes a expression (e.g., Boolean) that may be utilized to evaluate the keyword query 109. If the domain clause evaluates TRUE then the keyword query may be associated with the domain 130. Each classification rule 89 includes a classification clause 133 and a classification predicate 135, as previously described. The classification clause 133 includes an expression (e.g., Boolean) that may be utilized to evaluate keywords in the keyword query 109. If the classification clause 133 evaluates TRUE then the classification predicate 135 (e.g., classification concept 140 and the classification value 142) may be executed against the keyword query 109 thereby associating the classification concept 140 and the classification value 142 (e.g., classification information) with the keyword(s) in the keyword query 109.

Figure 13:
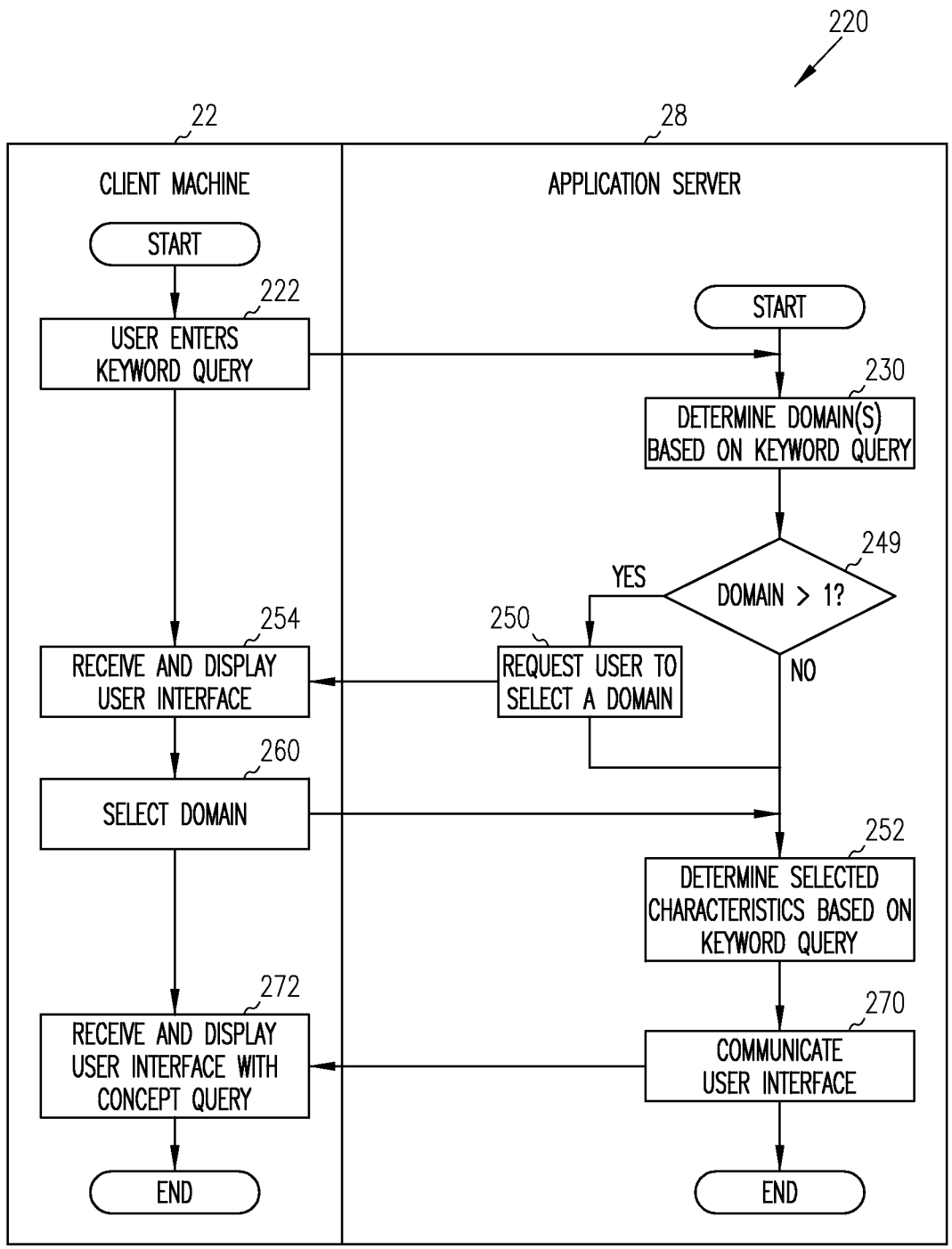
FIG. 13 is a block diagram illustrating a method, according to an embodiment, to generate a query to search a data resource.

FIG. 13 illustrates a method 220, according to an embodiment, to generate a query to search a data resource. Operations performed by a client machine 22 are illustrated on the left and operations performed an application server 28 are illustrated on the right. The method 220 commences at operation 222 where the user enters the keyword query 109.

FIG. 31 illustrates a user interface 224, according to an embodiment, to receive a keyword query. The user interface 224 includes a dialogue box 226 that may be utilized by the buyer 119 to enter a keyword query 109. The dialogue box 226 is shown to include the keyword query 109, "Nike black size 8." The keyword query 109 includes keywords 228, "Nike", "black" and "size 8." It will be appreciated that keywords 228 may include one or more words or alphanumeric expressions (e.g., size 8). The present example user interface does not require the user to manually identify a domain 130; however, it will be appreciated that other embodiments may include user interfaces that require the user to manually identify a domain 130 that may be associated with the keyword query 109 entered by the user. For example, in one embodiment a user may be required to navigate a tree structure to locate a dialogue box 226 to enter a keyword query 109 that may be associated with a specific domain 130.

Returning to FIG. 13, at operation 230, the computing module 221 receives the keyword query 109 and communicates the keyword query 109 to the query generation module 223 which determines whether the keyword query 109 may be associated with one or more domains 130.

Figure 14:
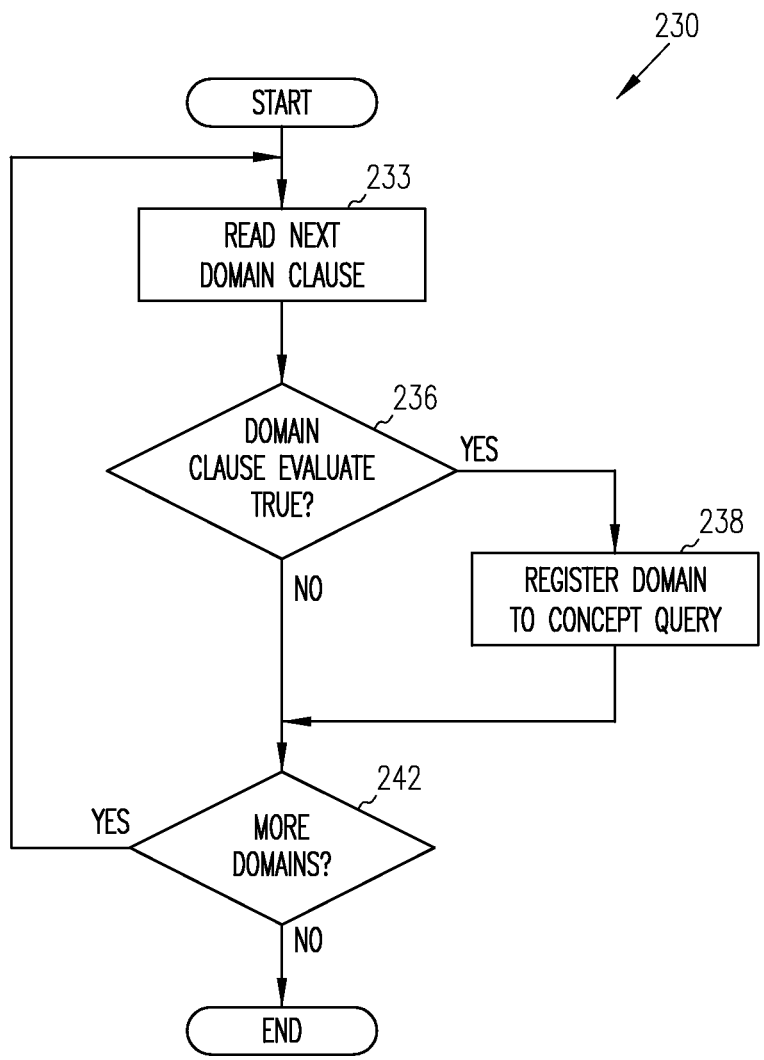
FIG. 14 is a block diagram illustrating a method, according to an embodiment, to determine domains based on a keyword query.

FIG. 14 illustrates a method 230, according to an embodiment, to determine domains 130 based on the keyword query 109. The method 230 commences at operation 233 with the query generation module 223 reading the next domain clause 129 from the search metadata 152. The domain clause 129 may contain an expression (e.g., Boolean).

At decision operation 236, the query generation module 223 evaluates the keyword query 109 with the domain clause 129 that may include an expression (e.g., Boolean). If the expression (e.g., Boolean) evaluates TRUE, then a branch is made to operation 238. Otherwise a branch is made to decision operation 242.

At operation 238, the query generation module 223 associates the domain 130 with the concept query 239 by registering the domain 130 to the concept query 239.

At decision operation 242, the query generation module 223 determines if there are more domain clauses 129 to process. If there are more domains domain clauses 129 to process then a branch is made to operation 233. Otherwise the processing ends.

Returning to FIG. 13, at decision operation 249, the computing module 221 determines if the keyword query 109 may be associated with more than one domain 130. If the keyword query 109 may be associated with more than one domain then a branch is made to operation 250. Otherwise a branch is made to operation 252.

At operation 250, the computing module 221 communicates a request to the user to select one domain 130 from the domains 130 that were associated with the keyword query 109.

Figure 32:
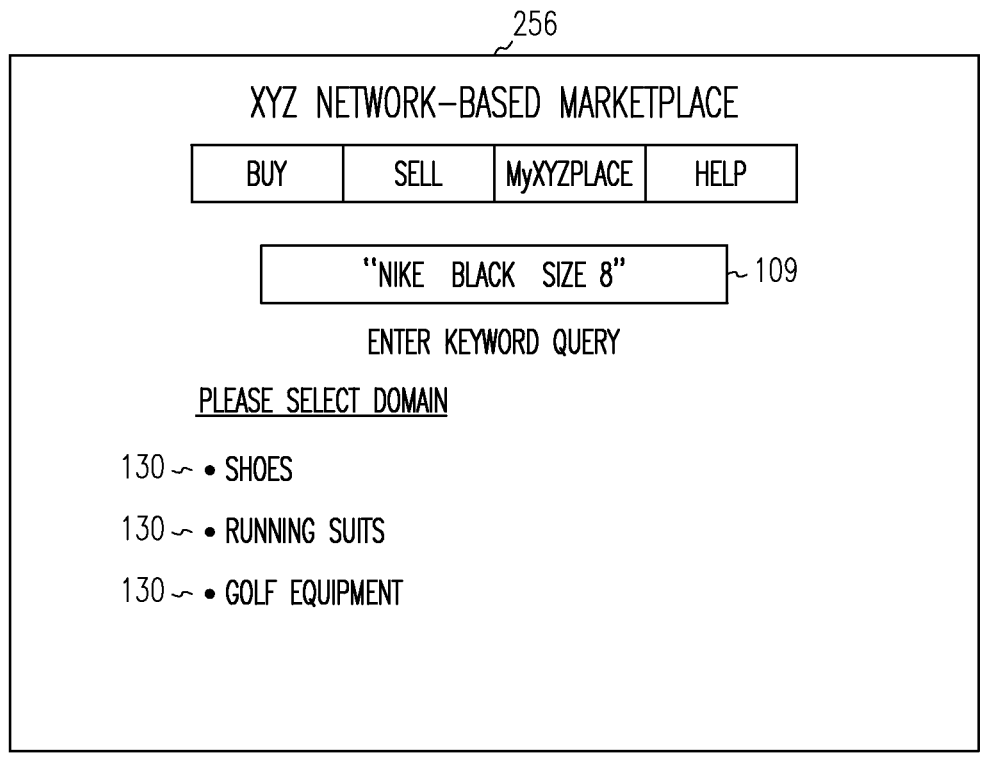

At operation 254, at the client machine 22, a user interface may be displayed to enable user-selection of a domain 130. FIG. 32 illustrates the user interface 256, according to an example embodiment, to select a domain 130. The user interface 256 includes the keyword query 109 and domains 130 (e.g., "shoes", "running suits" and "golf equipment") that may be selected by the user.

Returning to FIG. 13, at the client machine 22, at operation 260, the user selects the "shoes" domain 130, the selection being communicated to the application server 28.

At operation 252, at the application server 28, the query generating module 231 receives the "shoes" domain 130 and utilizes the "shoes" domain 130 and the keyword query 109 "Nike Black Size 8" to determine the selected characteristics 113.

Figure 15:
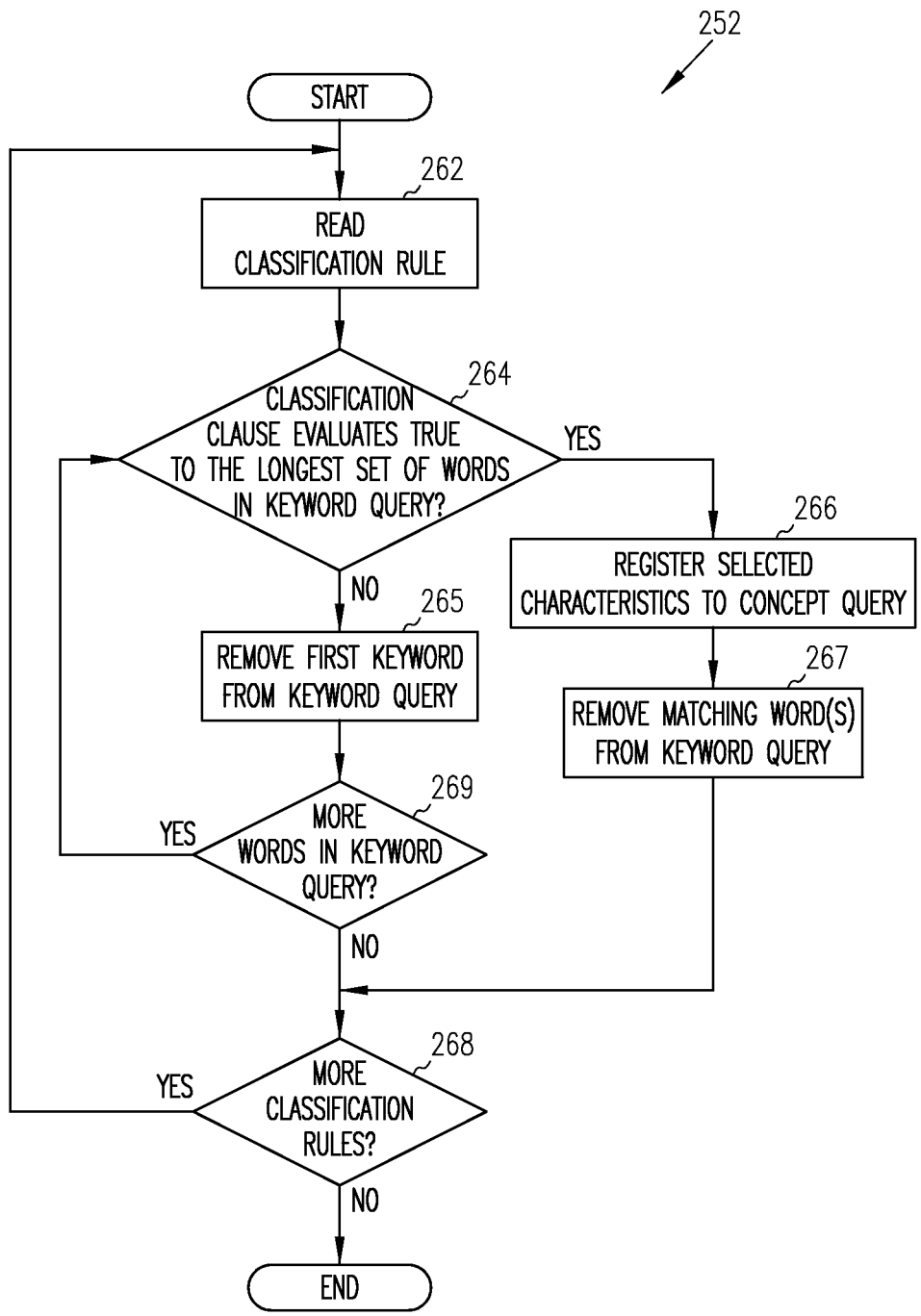
FIG. 15 is a block diagram illustrating a method, according to an embodiment, to determine selected characteristics based on a keyword query and a domain.

FIG. 15 illustrates a method 252, according to an embodiment, to determine selected characteristics 113 based on the keyword query 109 and the domain 130. The method 252 commences at operation 262 with the query generation module 223 utilizing the domain 130 that is associated with the keyword query 109 to read a classification rule 89 from the search metadata 152.

At decision operation 264, the query generation module 223 utilizes the classification clause 133 associated with classification rule 89 to evaluate the longest set of keywords (e.g., words) in the keyword query 109. If the classification clause 133 evaluates TRUE, then a branch is made to operation 266. Otherwise a branch is made to operation 265.

At operation 265, the query generation module 223 removes the first keyword from the keyword query 109.

At operation 266, the query generation module 223 registers the classification predicate 135 (e.g., color=ruby) associated with the classification rule 89 to the concept query 239. Henceforth the classification predicate 135 may be referred to as a selected characteristic 113.

At operation 267, the query generation module 223 removes the keyword(s) 228 that evaluated TRUE from the keyword query 109.

At decision operation 269, the query generation module 223 determines if there are more keywords in the keyword query 109. If there are more words, a branch is made to decision operation 264. Otherwise a branch is made to decision operation 268.

At decision operation 268, the query generation module 223 determines if there may be more classification rules 89. If there are more classification rules 89 then a branch is made to operation 262 to evaluate the entire keyword query 109. Otherwise the method 252 ends.

Returning to FIG. 13, at operation 270, at the application server 28, the computing module 221 communicates a user interface including the keyword query 109, the domain 130, and the concept query 239 to the buyer 119 at the client machine 22.

Figure 33:
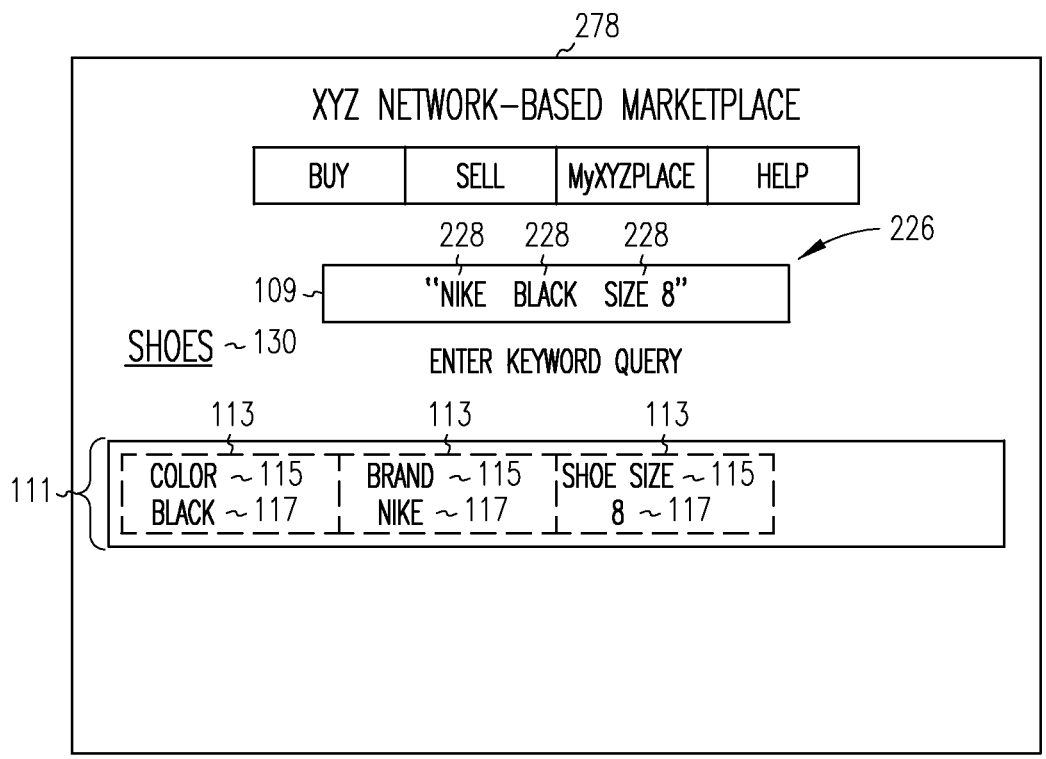

At operation 272, at the client machine 22, the user interface is displayed to the user. FIG. 33 illustrates a user interface 278, according to an example embodiment, to display the keyword query 109, the domain 130, and the concept query 239. The user interface 278 is shown to include the keyword query 109 "Nike Black Size 8" and the concept query 111 including three selected characteristics 113, "Color—Black", "Brand—Nike", and "Shoe Size—8." The selected characteristics 113 are respectively shown to include selected concepts 115 (e.g., "Color", "Brand", "Shoe Size" and selected values 117 (e.g., "Black", "Nike", and "8"). Another example may include keyword(s) 228 (e.g., keywords 228 included in the keyword query 109 that may not have evaluated TRUE with regard to classification clauses 133).

Another embodiment of a system that receives a keyword query and generates a concept query, a domain, and keywords may include a single Boolean evaluation graph. The Boolean evaluation graph may be utilized by the system to enhance the performance of Boolean evaluations. For example, the system may utilize the Boolean evaluation graph to evaluate a large set of classification rules 89 against a keyword query 109 while minimizing the total number of evaluation events computed by the system 107.

Identify Data Items & Canceling Characteristics

Figure 16:
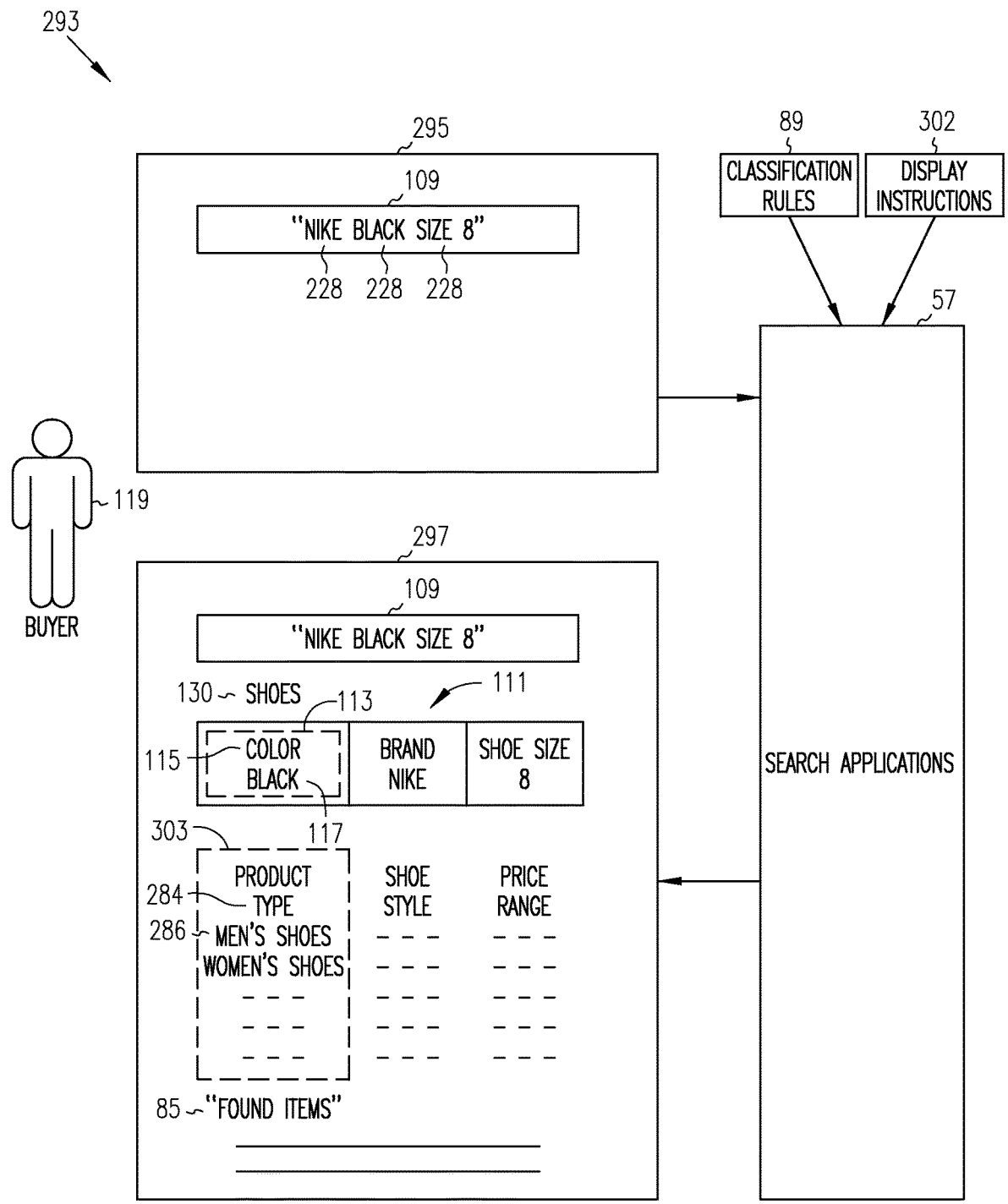
FIG. 16 is a block diagram illustrating a system, according to an embodiment, to identify data items for browsing.

FIG. 16 is a block diagram illustrating a system 293, according to an embodiment, that receives a keyword query and generates a user interface that includes the keyword query, a concept query, browsing characteristics and information (e.g., item listings 85). The system 293 is described to provide an overview for what follows.

The system 293 includes search applications 57, classification rules 89, and display instructions 302. The search applications 57 are shown to receive a keyword query 109 "Nike Black Size 8" that includes keywords 228 that may be entered by a buyer 119 with a user interface 295. The search applications 57 receive the keyword query 109 and utilize the classification rules 89 and the display instructions 302 to generate the user interface 297.

The user interface 297 includes the keyword query 109, the domain 130 "shoes", the concept query 111 "Color—Black, Brand—Nike, Shoe Size—8", multiple browsing sets 303 (e.g., "Product Type", "Shoe Style", "Price Range") and information (e.g., item listings 85) found based on the concept query 111. The keyword query 109, the domain 130 and the concept queries 111 have been previously described. The concept query 111 is shown to include multiple selected characteristics 113 (e.g., "Color—Black", "Brand—Nike, and "Shoe Size 8"). Each selected characteristic 113 includes a selected concept 115 (e.g., "Color") and a selected value 117 (e.g., "Black"). For example, the buyer 119 may add selected characteristics 113 to the concept query 111 and/or cancel selected characteristics 113 from the concept query 111. The buyer 119 may add a selected characteristic 113 to the concept query 111 by selecting a browsing characteristic as described below. The buyer may cancel selected characteristics 113 by selecting one or more "cancel" buttons (not shown) each of which may be associated with a particular selected characteristic 113. The browsing sets 303 are selected by the search applications 57 based on the cumulative selected characteristics 113 (e.g., generated from the keyword query 109, the selected browsing characteristics, and the cancellations) according to a specified order. In other words, the most interesting browsing sets 303 may be presented before the least interesting browsing sets 303, the level of interest determined from the point of view of the buyer 119 by an administrator. Other embodiments may determine the level of buyer interest for a particular browsing set 303 by monitoring user selections of browsing sets 303. Some embodiments may determine the level of buyer interest for a particular browsing set 303 by monitoring the previous selections of browsing sets 303 made by the buyer. Each browsing set 303 is shown to include a browsing concept 284 (e.g., "Product Type") and multiple browsing values 286 (e.g., "Men's Shoes", "Women's Shoes", etc.). The buyer 119 may select one or more browser values 286 (e.g., "Men's Shoes"), thereby effectively selecting one or more browsing characteristic 287 (e.g., "Product Type—Men's Shoes"). Henceforth the selected browsing characteristic 287 may be referred to as a selected characteristic 113 that may be included in the cumulative selected characteristics 113 that may be utilized to select the browsing sets 303, compute counts and find information (e.g., item listings 85).

Figure 17:
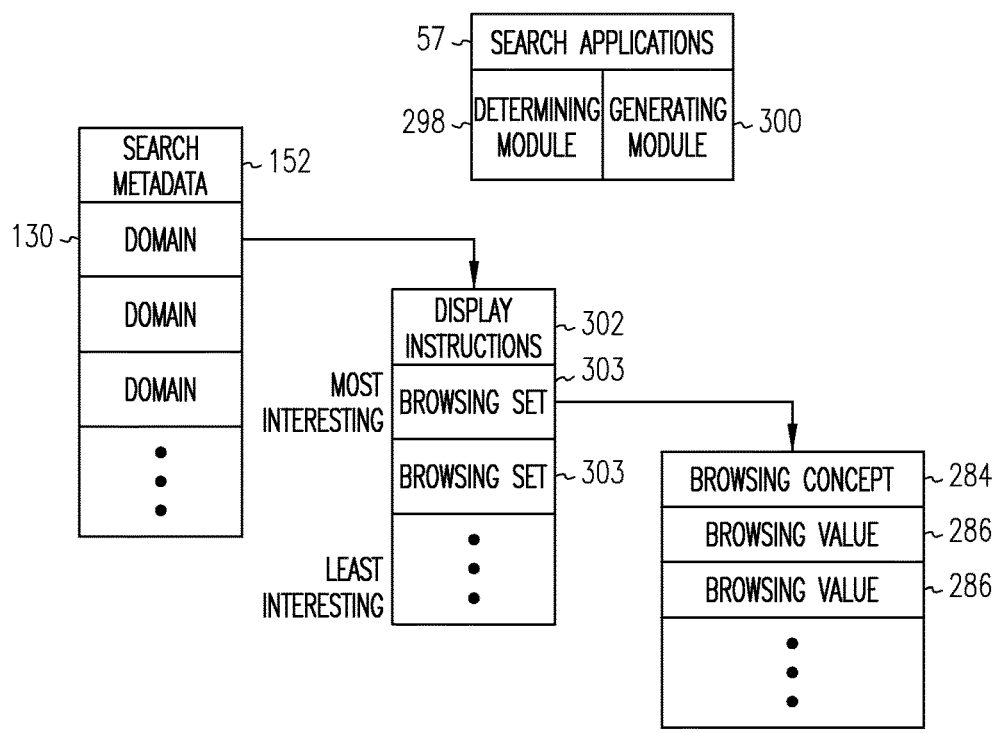
FIG. 17 is a block diagram illustrating search applications and search metadata, according to an embodiment.

FIG. 17 is a block diagram illustrating search applications 57 and search metadata 152, according to an embodiment. The search applications 57 include a determining module 298 and a generating module 300. The determining module 298 determines selected characteristics 113, determines the size of areas on a user interface to display information (e.g., item listings 85, browsing sets 303, etc.), determines information (e.g., item listings 85) to display, and determines browsing sets 301 to display. The determining module 298 determines the selected characteristics 113 based on the concept query 111 (e.g., generated from a keyword query 109), browsing characteristic(s) 287 that may have been selected, and/or selected characteristics 113 that may have been cancelled). In addition, the determining module 298 determines or finds information (e.g., item listings 85) and determines or finds browsing sets 303 based on the determined selected characteristics 113. Finally, the generating module 300 may generate counts values that may be associated with browsing values 286.

The search metadata 152 is shown to be organized by domain 130, as previously described. Each domain 130 includes a set of display instructions 302 that include multiple browsing sets 303. Each browsing set 303 includes a browsing concept 284 and multiple browsing values 286. The browsing set 303 may be presented to a buyer 119 who may select a single browsing value 286 thereby effectively selecting a browsing characteristic 287 (e.g., a browsing concept 284 and browsing value 286). The browsing sets 303 may be ordered according to the interest of most users. For example, a user may be most interested in the browsing sets 303 that appear at the top of the display instructions 302 and least interested in the browsing sets 303 that appear at the bottom of the display instructions. Accordingly, the display instructions 302 may be utilized by the determining module 298 to determine which browsing sets 303 to present to the user based on the selected characteristics 113 and the limited area on the display which precludes the ability to present all browsing sets 303 on a single display.

Figure 18:
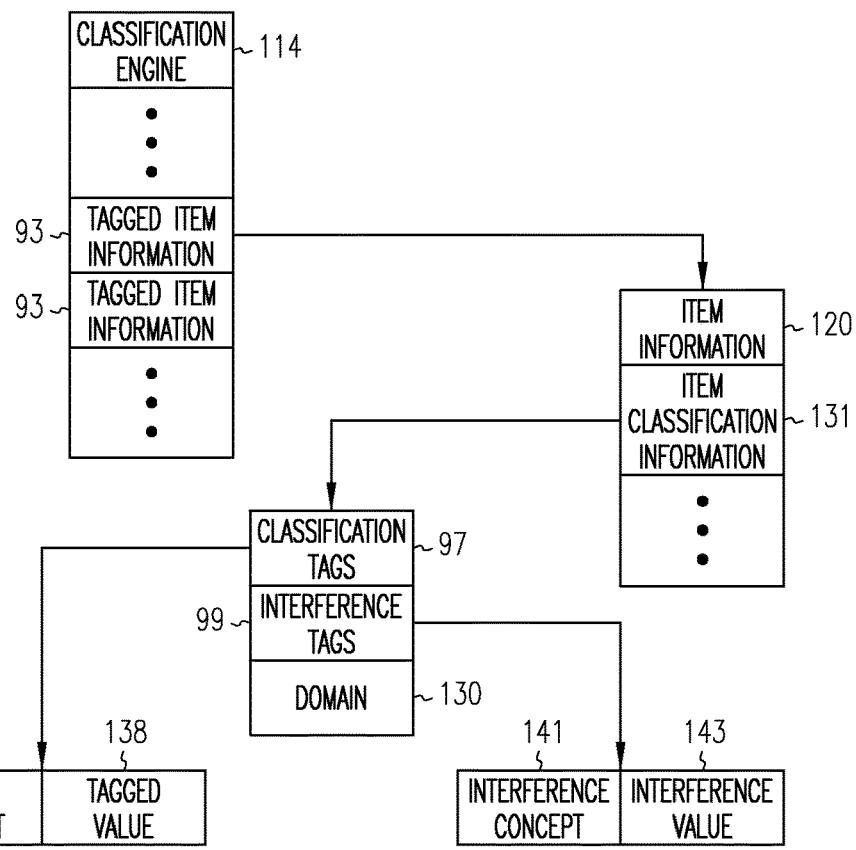
FIG. 18 is a block diagram illustrating a classification engine, according to an embodiment.

FIG. 18 illustrates a classification engine 114, according to an embodiment. The classification engine 114 includes tagged item information 93 entries that include item information 120 and item classification information 131 including classification tags 97 and inference tags 99, as previously described. The determining module 298 utilizes the selected characteristic(s) 113 associated with the concept query 111 and, in some instances, keywords 228 (e.g., keywords 228 contained in the keyword query 109 that may not have evaluated TRUE with any classification clause 133) to determine or find information (e.g., item listings 85)(e.g., "Items Found").

Figure 19:
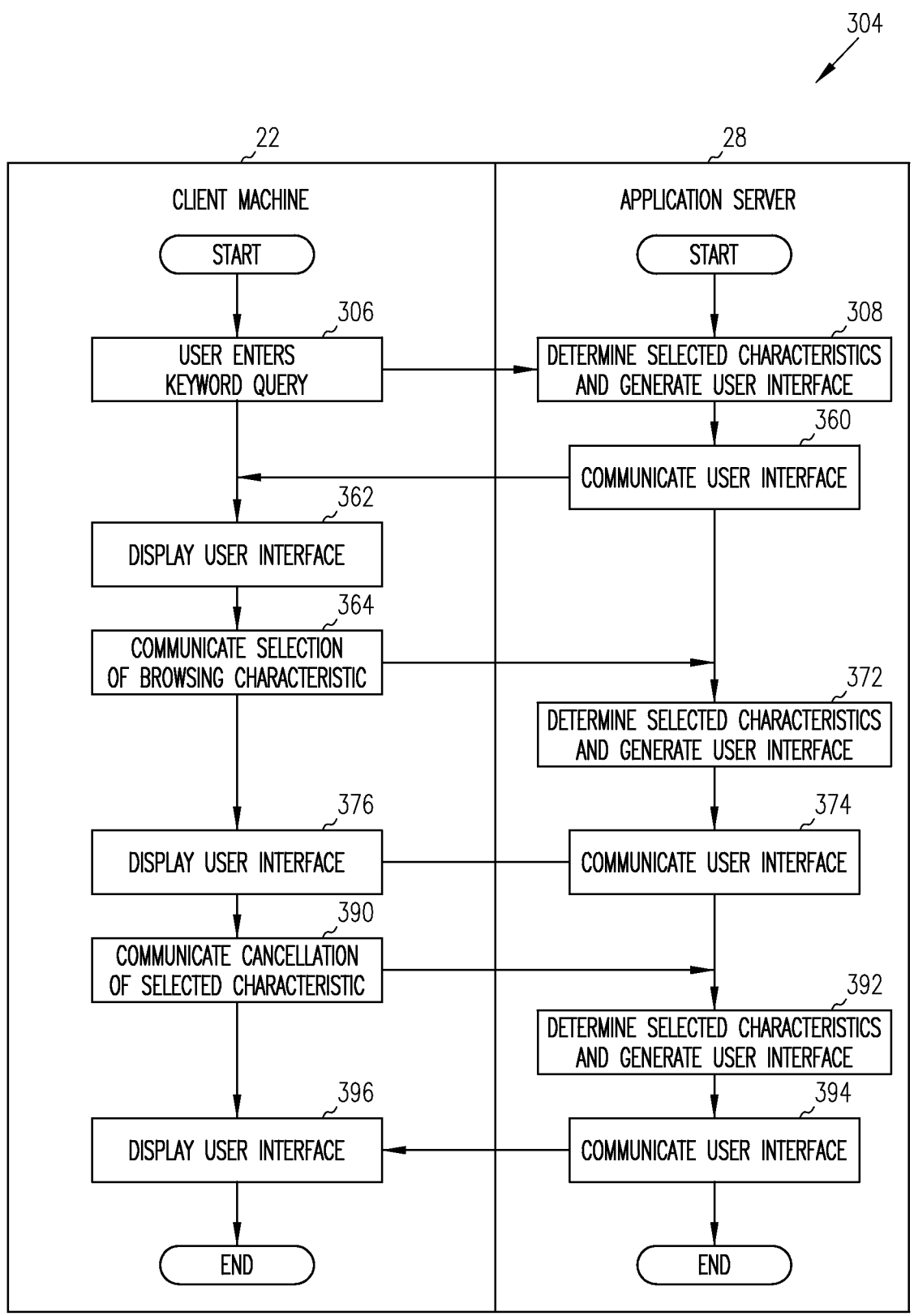
FIG. 19 is a block diagram illustrating a method, according to an embodiment, to identify data items for browsing.

FIG. 19 illustrates a method 304, according to an embodiment, to identify data items for browsing. Operations for the client machine 22 appear on the left and operations for the application server 28 appear on the right. At operation 306, the user enters a keyword query 109 that is communicated to the application server 28.

At operation 308, at the application server 28, the search applications 57 receive the keyword query 109 and generate a concept query 111 that includes one or more selected characteristics 113. For example, the search applications 57 may receive the keyword query "Black Nike Size 8" and generate a concept query 111 for the domain 130 "shoes" that includes three selected characteristics 113 (e.g., "Color—Black", "Brand—Nike", and "Shoe Size—8"). Next, the search applications 57 generate a user interface based on the selected characteristics 113 associated with the concept query 111.

Figure 20:
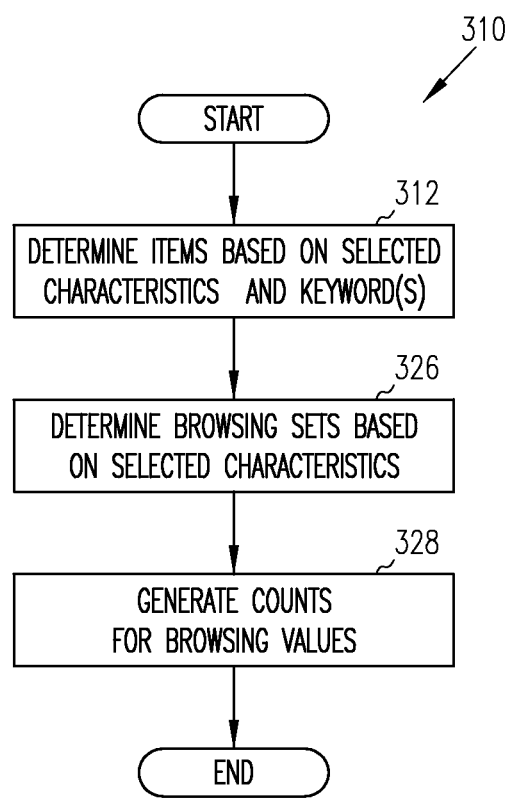
FIG. 20 is a block diagram illustrating a method to generate a user interface based on selected characteristics, according to an embodiment.

FIG. 20 illustrates a method 310 to generate a user interface based on selected characteristics 113 and keyword (s) 228, according to an embodiment. The method 310 commences at operation 312 where the determining module 298 determines a set of information (e.g., item listings 85).

Figure 21:
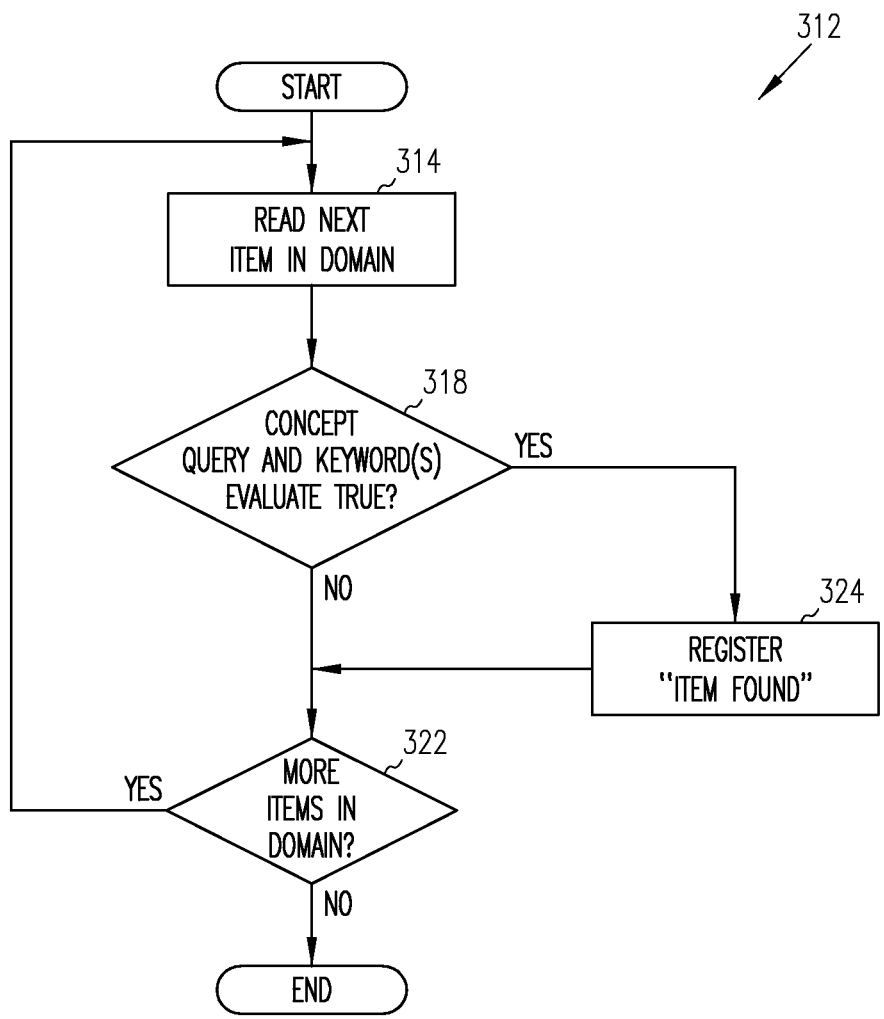
FIG. 21 is a block diagram illustrating a method, according to an example embodiment, to determine a set of items based on selected characteristics.

FIG. 21 illustrates a method 312, according to an example embodiment, to determine a set of item listings 85 based on the selected characteristics 113 and keyword(s) 228. The method 312 commences at operation 314 where the determining module 298 reads the item (e.g., tagged item information 93) from the classification engine 114 that may be associated with the domain 130 "shoes."

At decision operation 318, the determining module 298 utilizes the keyword(s) 228 and the selected characteristics 113 associated with the concept query 111 to form an expression and to determine if the expression evaluates TRUE. For example, the determining module 289 may utilize "'Color=Black' AND 'Brand=Nike' AND 'Shoe Size=8'" to evaluate the classification tags 97 and/or inference tags 93. In addition, the determining module may utilize the keywords 228 (e.g., keywords 228 contained in the keyword query 109 that may not have evaluated TRUE with any classification clause 133) to evaluate the item information 120. If the expression (e.g., Boolean) evaluates TRUE then a branch is made to operation 324. Otherwise a branch is made to decision operation 322.

At operation 324, the determining module 298 registers the item as found (e.g., "Item Found").

At decision operation 322, the determining module 298 determines if there are more items associated with the domain 130 "shoes" in the classification engine 114. If there are more items then a branch is made to operation 314. Otherwise the method ends.

Returning to FIG. 20, at operation 326, the determining module 298 determines the browsing sets 303 to display to the user based on the selected characteristics 113. For example, the determining module 298 may access the appropriate display instructions 302 to determine the most interesting browsing sets 303 sufficient to occupy the available room on the user interface.

Figure 22:
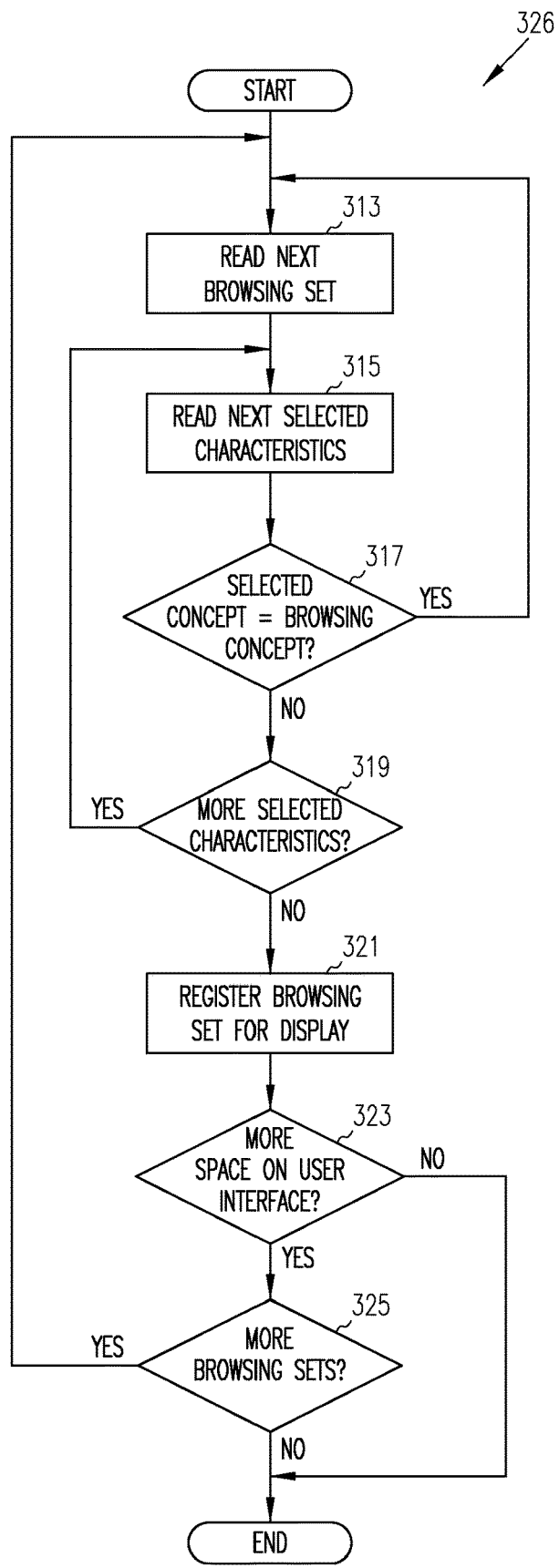
FIG. 22 is a block diagram illustrating a method, according to an embodiment, to determine browsing sets.

FIG. 22 illustrates a method 326, according to an embodiment, to determine browsing sets 303. The method 326 commences at operation 313 with the determining module 298 reading the next browsing set 301 from the search metadata 152 based on the appropriate domain 130. For example, the determining module 298 may read the browsing set 301 that may be associated with the display instructions 302 that may be associated with the domain 130 "shoes."

At operation 315, the determining module 298 reads the next selected characteristic 113. At decision operation 317, the determining module 298 compares the selected concept 115 associated with the selected characteristic 113 with the browsing concept 284 associated with the browsing set 301. If the selected concept 115 and the browsing concept 284 match, then the determining module 298 branches to operation 321 (e.g., do not display a browsing set that corresponds to a selected concept). Otherwise the determining module 298 branches to decision operation 319.

At decision operation 319, the determining module 298 determines if there are more selected characteristics 113. If there are more selected characteristics 113 then a branch is made to operation 315. Otherwise a branch is made to operation 321.

At operation 321, the determining module 298 registers the browsing set 301 to be displayed on the user interface.

At decision operation 323, the determining module 298 determines if another browsing set 303 may be displayed on the user interface. If another browsing set 303 may be displayed then a branch is made to decision operation 325. Otherwise processing ends.

At decision operation 325, the determining module 298 determines if there are more browsing sets 303. If there are more browsing sets 303 then a branch is made to operation 313. Otherwise processing ends.

The above described embodiment selects browsing sets 301 for presentation to the user based on the order of browsing sets 301 as they appear in the display instructions 302. Accordingly, the display instructions 302 determine a fixed order of interest for the display of browsing sets 301 to the user. In other embodiments the fixed order of interest may be temporarily overridden by the cancellation of a selected characteristic 113 with regard to the selected characteristic 113. In this instance the cancelled selected characteristic 113 may temporarily be considered to be of maximum interest to the user and therefore displayed as a browsing set 301 to the user subsequent to cancellation of the corresponding selected characteristic 113. Accordingly, the fixed order of interest may be temporarily overridden to accommodate a user that may want to cancel a browsing value 286 that may be associated with the cancelled selected characteristic 113.

Returning to FIG. 20, at operation 328 the generating module 300 generates a count for each of the browsing values 286 associated with the browsing sets 303 that may be displayed on the user interface.

Figure 23:
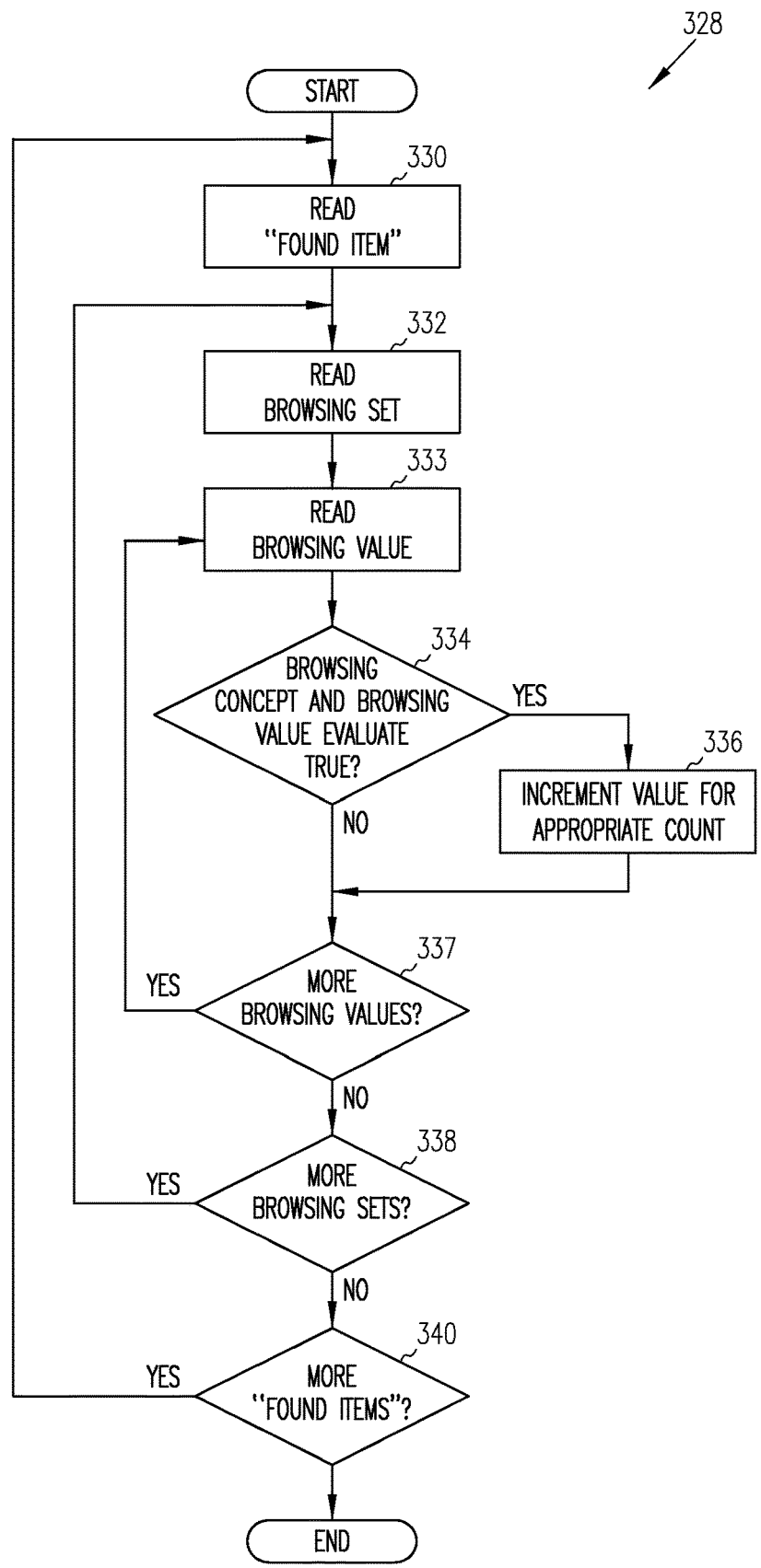
FIG. 23 is a block diagram illustrating a method, according to an embodiment, to generate counts for browsing values.

FIG. 23 illustrates the method 328, according to an embodiment, to generate counts for browsing values 286. At operation 330, the generating module 300 reads the next item that may have been found based on the selected characteristics 113 and keyword(s) 228 (e.g., based on operation 324).

At operation 332, the generating module 300 reads the next browsing set 303 from the appropriate display instructions 302. For example, the appropriate display instructions 302 may be associated with a domain 130 that matches the domain 130 associated with the concept query 111.

At operation 333, the generating module 300 reads the next browsing value 286 associated with the current browsing set 303.

At decision operation 334, the generating module 300 evaluates the current item with an expression (e.g., Boolean) including the current browsing concept 284 and the current browsing value 286 (e.g., color=black). If the expression (e.g., Boolean) evaluates TRUE, then a branch is made to operation 336. Otherwise a branch is made to decision operation 337.

At operation 336, the generating module 300 increments the appropriate counter (e.g., the counter corresponding to the current browsing concept 284 (e.g., color) and the current browsing value 286 (e.g., black).

At decision operation 337, the generating module 300 determines if there are more browsing values 286 associated with the current browsing set 301. If there are more browsing values 286, then a branch is made to operation 333. Otherwise a branch is made to decision operation 338.

At decision operation 338, the generating module 300 determines if there are more browsing sets 303. If there are more browsing sets 303 then a branch is made to operation 332. Otherwise a branch is made to decision operation 340.

At decision operation 340, the generating module 300 determines if there are more found items (e.g., found based on the selected characteristics 113, operation 324). If there are more found items then a branch is made to operation 330. Otherwise processing ends.

Returning to FIG. 19, at operation 360, at the application server 28, the search applications 57 communicate the generated user interface to the client machine 22.

At operation 362, the client machine 22 displays the generated user interface to the user. FIG. 34 illustrates a generated user interface 363, according to an embodiment. The user interface 363 includes a keyword query 109 (e.g., "Black Nike Size 8"), a domain 130 ("Shoes"), a concept query 111 (e.g., Color=Black, Brand=Nike, Shoe Size=8), browsing concepts 284 (e.g., "Product Type", "Shoe Style", "Price Range"), browsing values 286 (e.g., "Men's Shoes", "Women's Shoe's, etc.), counts 365 associated with each of the browsing values 286, and information (e.g., item listings 85) that may have been found based on the selected characteristics 113.

At the client machine 22, the user selects "Men's Shoes", thereby indicating the selection of a browsing characteristic 287 (e.g., "Product Type—Men's Shoes"). Returning to FIG. 19, at operation 364, the client machine 22 communicates the browsing characteristic 287 selection to the application server 28.

At operation 372, at the application server 28, the determining module 298 receives the selected characteristics 113 associated with the concept query 111 and the browsing characteristic 287 and determines the cumulative selected characteristics 113. For example, the determining module 298 may determine the cumulative selected characteristics 113 to include "Color—Black", "Brand—Nike", "Shoe Size—8", "Product Type—Men's Shoes." Next, the determining module 298 and the generating module 300 may utilize the cumulative selected characteristics 113 and keyword(s) 228 to generate a user interface, as previously described in method 310 on FIG. 20.

At operation 374, the generated user interface is communicated to the client machine 22.

Figure 35:
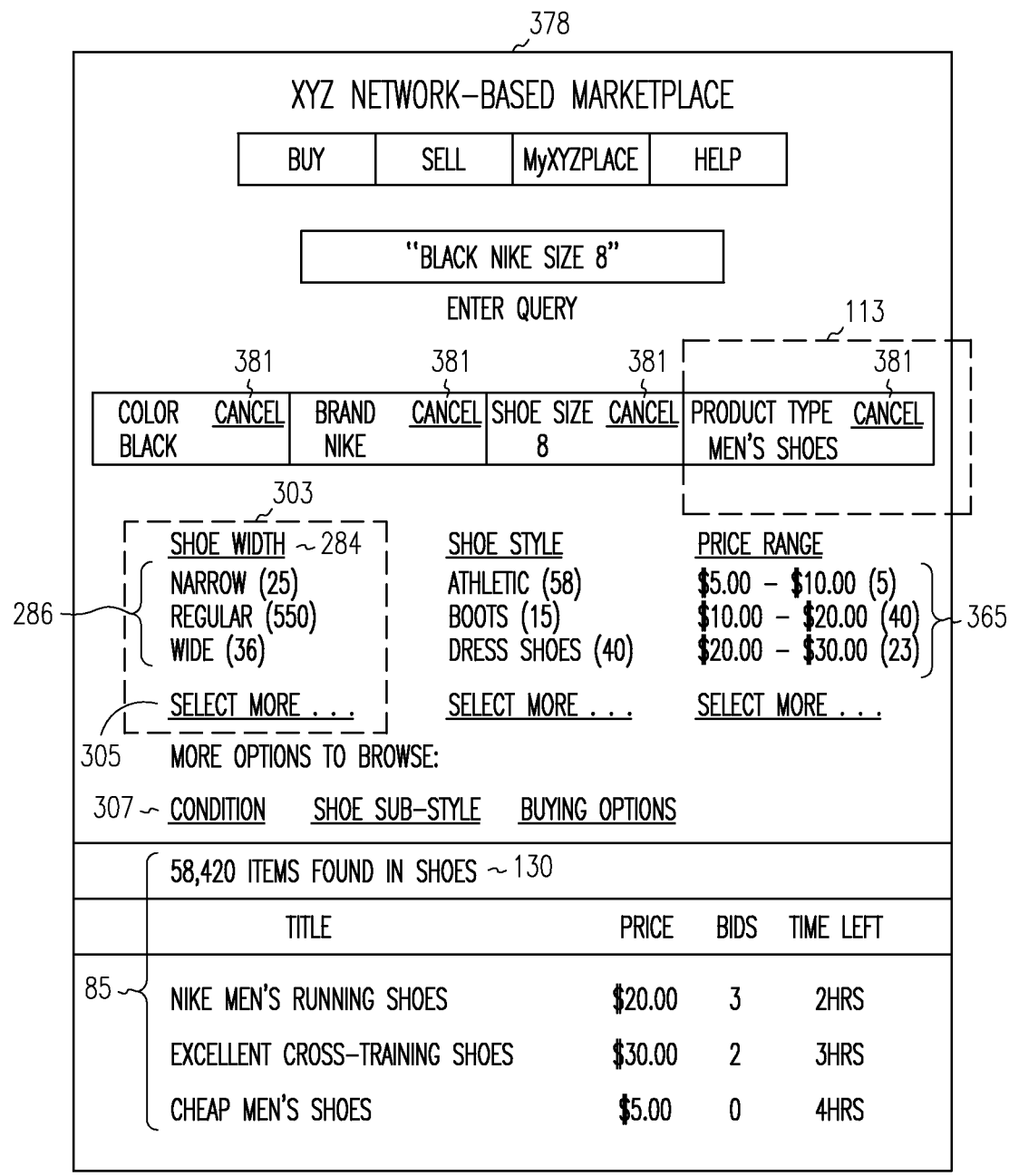

At operation 376, the client machine 22 receives and displays the generated user interface. FIG. 35 illustrates a generated user interface 378, according to an embodiment. The user interface 378 illustrates the additional selected characteristic 113, "Product Type—Men's Shoes." In addition, the browsing set 303 associated with the browsing concept 284 "Shoe Width" has been added to the user interface 378 thereby providing the user with the three most interesting browsing sets 303 (e.g., "Shoe Width", "Shoe Style", "Price Range") based on the cumulative selected characteristics 113. Each browsing set 303 is shown to be associated with a "select more" button 305 that may be selected to present additional browsing values 286 that may be associated with the browsing set 303. In addition, the user interface 378 is shown to include multiple browsing set buttons 307 (e.g., "Condition", "Shoe Sub-Style", "Buying Options") that may be selected by the user to select the corresponding named browsing sets 303. It will be appreciated that the browsing set buttons 307 reading from left to right provide the user with the next three most interesting browsing sets 303.

It should be noted that the counts 365 have been recomputed and the information (e.g., item listings 85)(e.g., "Items Found") updated based on the cumulative selected characteristics 113 and keyword(s) 228. The user interface 378 further includes "Cancel" buttons 381 associated with each of the selected characteristics 113 thereby enabling the user to cancel a particular selected characteristic 113 without removing the remaining selected characteristics 113. In the present example, the user selects the "Cancel" button 381 associated with the selected characteristic 113 "Shoe Size—8"; however, it should be noted that the user may have selected a "Cancel" button 381 associated with any of the selected characteristics 113 (e.g., "Color—Black", "Brand—Nike", "Shoe Size 8" or "Product Type—Men's Shoes") and the remaining selected characteristics 113 may have been utilized to find information (e.g., item listings), determine the most interesting browsing sets 301 for display, and generate counts for the associated browsing values 286. Returning to FIG. 19, at operation 390, the client machine 22 communicates the concept query 111, the selected browsing characteristic 287 (e.g., "Product Type—Men's Shoes") and the cancelled selected characteristic (e.g., "Shoe Size—8") to the application server 28.

At operation 392, at the application server 28, the determining module 298 receives the concept query 111, the selected browsing characteristic 287 (e.g., "Product Type—Men's Shoes") and the cancelled selected characteristic (e.g., "Shoe Size—8") and determines the cumulative selected characteristics 113. For example, the determining module 298 may determine the cumulative selected characteristics 113 to include "Color—Black", "Brand—Nike", "Product Type—Men's Shoes." Next, the determining module 298 and the generating module 300 may utilize the cumulative selected characteristics 113 to generate a user interface, as previously described in method 310 on FIG. 20.

At operation 394, the generated user interface is communicated to the client machine 22.

At operation 396, the client machine 22 receives and displays the generated user interface. FIG. 36 illustrates a generated user interface 398, according to an embodiment. The user interface 398 is shown to no longer include the cancelled selected characteristic 113 "Shoe Size—8." In addition, the browsing set 303 that was associated with the browsing concept 284 "Shoe Width" has been displaced by the browsing set 303 associated with the browsing concept "Shoe Size" (e.g., thereby providing the user with the most interesting browsing sets 303 in accordance with the cumulative selected characteristics 113). Finally, the counts 365 have been recomputed and the information (e.g., item listings 85)(e.g., "Items Found") have been updated based on the updated selected characteristics 113 ("Color—Black", "Brand—Nike", "Product Type—Men's Shoes"). In another embodiment the browsing options (e.g., browsing sets 301 and browsing set buttons 307) may be minimized to display additional information (e.g., item listings 85).

Dynamic Display

FIG. 37 illustrates a user interface 400, according to an embodiment, to minimize the display of browsing options. The user interface 400 minimizes the display of browsing options and maximizes the display of information (e.g., item listings 85) based on an item count dropping below a threshold level. For example, the user interface 400 may include a count of "20" items found 472, the count determined by the determining module 298 to be below a configurable threshold resulting in the minimization of browsing options on the user interface 400. To this end, the browsing sets 301 may not be displayed on the user interface 400 though the browsing set buttons 307 (e.g., "Condition", "Shoe Sub-Style", "Buying Options") may continue to be displayed on the user interface 400. In place of the browsing sets 301 additional information (e.g., item listings 85) may be displayed. Accordingly, a count of item listings 85 that falls below a threshold may trigger the generation of a user interface that emphasizes found information (e.g., item listings 85) rather than browsing options.

Another embodiment of a system that receives a keyword query and generates a user interface that includes the keyword query, a concept query, browsing characteristics and information (e.g., item listings 85) may include a single Boolean evaluation graph. The Boolean evaluation graph may be utilized by the system to enhance the performance of Boolean evaluations. For example, the system may utilize the Boolean evaluation graph to evaluate a large set of selected characteristics 113 and keywords 228 against information (e.g., item listings 85) while minimizing the total number of evaluation events computed by the system. In yet another embodiment, the system may utilize a Boolean evaluation graph to evaluate a large set of browsing characteristics 287 against information (e.g., item listings 85).

Processing Back Button Selection

Figure 24:
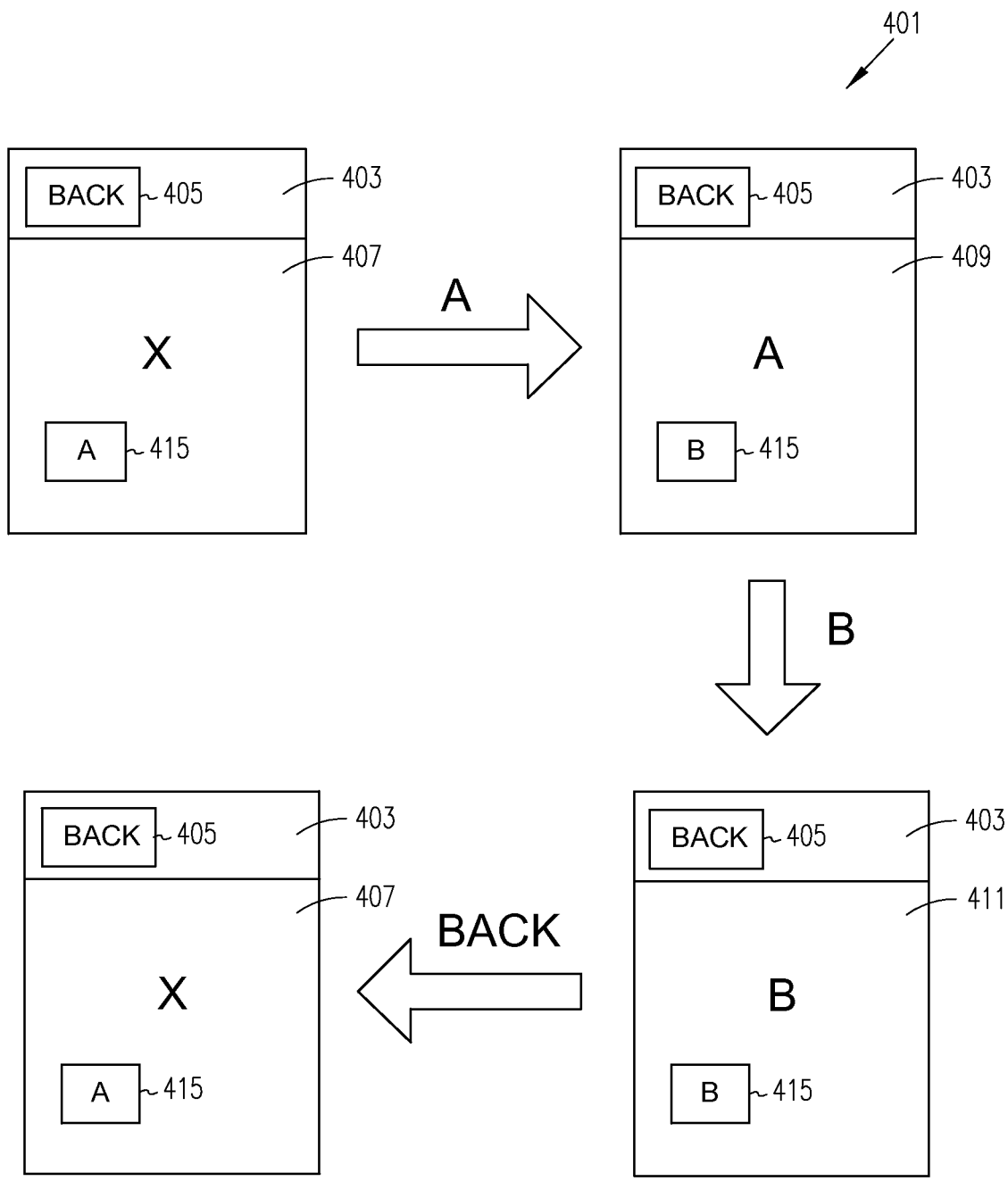
FIG. 24 is a block diagram illustrating user interfaces and browser controls, according to an embodiment.

FIG. 24 is a block diagram illustrating user interfaces 401 and browser controls 403, according to an embodiment. The user interfaces 401 may be displayed at a client machine and include a user interface 407, a user interface 409, and a user interface 411. The user interface 409 may include a client application program (e.g., applet, JavaScript, etc.) that may execute at the client machine to generate and display the user interfaces 409 and 411. The browser controls 403 include a back button 405 that may be selected by a user thereby triggering a browser to display the previous user interface to the user.

The user interfaces 401 illustrate a problem due to interference between the client application program and the browser. For example, a user at the client machine may select a button 415 (e.g., "A") from the user interface 407 thereby triggering the browser at the client machine to request the user interface 409 from a server. In response, the server communicates the user interface 409, including a client application program (e.g., JavaScript), to the client machine where the client application program executes to display the user interface 409 to the user. Next, the user, at the client machine, may select a button 415 (e.g., "B") from the user interface 409 that may be processed by the client application program at the client machine to generate and display the user interface 411. If the user now selects the back button 405 then the browser may respond by accessing the server to retrieve and display the user interface 407 instead of the user interface 409, as expected by the user. The browser responds in this manner because the browser operates without knowing that the JavaScript has executed to update the display with the user interface 411.

Figure 25:
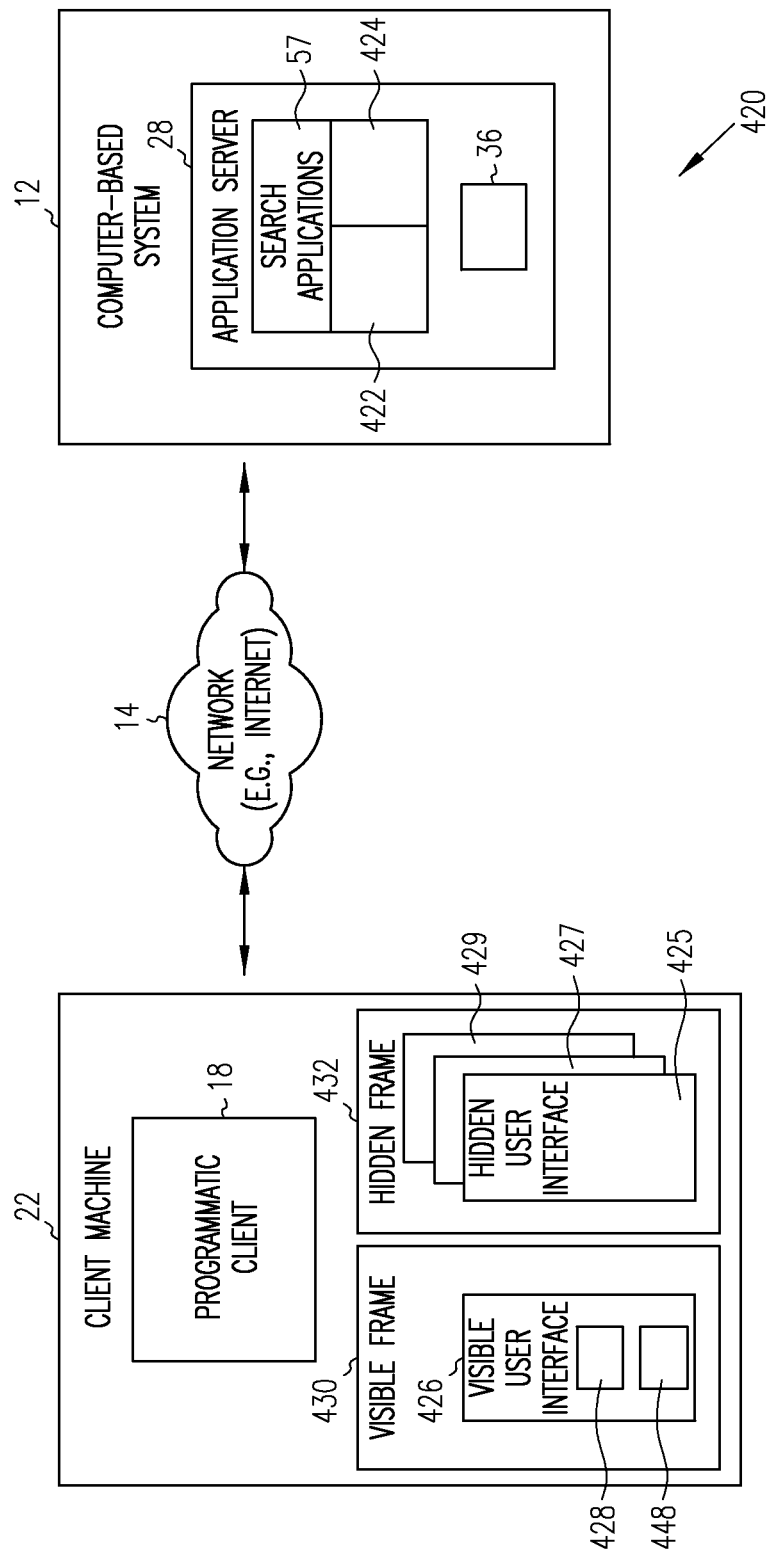
FIG. 25 is a block diagram illustrating a system, according to an embodiment, to process a browser back button.

FIG. 25 is a block diagram illustrating a system 420, according to an embodiment, to process a browser back button. The system 420 includes the network based computer-based system 12 that includes an application server 28 or server machine that communicates over a network 14 with a client machine 22, as previously described. The client machine 22 is shown to include a programmatic client 18 (e.g., browser), a hidden frame 432, hidden user interfaces 425, 427 429, a visible frame 430, and a visible user interface 426 that includes a client application program 428 (e.g., script, program, applet, etc.) and user interface elements 448. The programmatic client 18 (e.g., browser) may be utilized to request the visible user interface 426 and hidden user interfaces 425, 427 429 from the application server 28. In addition, the programmatic client 18 may be executed to generate additional user interfaces (not shown) for display in the visible frame 430 at the client machine 22. To this end, the visible and hidden frames 430, 432 may be respectively associated with data structures that are utilized by the programmatic client 18 and the client application program 428.

A frame is a browser construct that may be utilized to partition a particular area of the display. In the present example, the hidden frame 432 is not partitioned an area of the display. Accordingly, the programmatic client 18 may request the hidden user interfaces 425, 427, 429 from the application server 28; however, displaying the hidden user interfaces 425 427, 429 does not result in generating user interface elements that are visible to the user. In the present application, the hidden user interfaces 425, 427, 429, are utilized merely to enable proper processing of the back button 405. Further, the hidden user interfaces 425, 427, 429, are identified as static thereby triggering the programmatic client 18 to store the hidden user interfaces 425, 427, 429, in a cache (not shown) at the client machine 22.

The computer-based system 12 is shown to include an application server 28 that includes search applications 57 that include a receiving module 422 and a communication module 424. The receiving module 422 receives requests for the visible user interface 426 and the hidden user interfaces 425, 427, 429 and generates the requested user interfaces 426, 425, 427, 429 or reads the requested user interfaces 426, 425, 427, 429 from a database 36. The communication module 424 communicates the visible and hidden user interfaces 426, 425, 427, 429 to the client machine 22.

Figure 26:
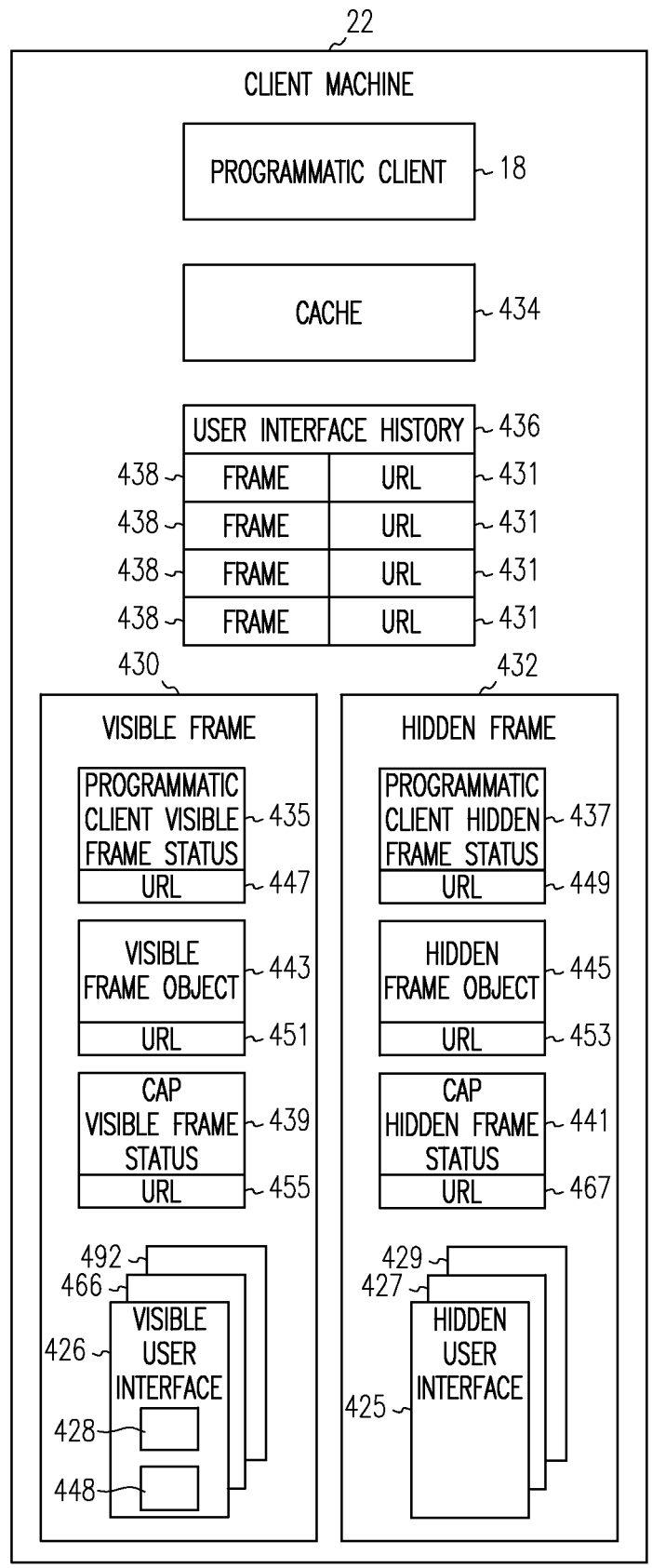
FIG. 26 is a block diagram further illustrating software components associated with the client machine, according to an embodiment.

FIG. 26 is a block diagram further illustrating software components associated with the client machine 22, according to an embodiment. The client machine 22 is shown to include the programmatic client 18 (e.g., browser), a cache 434, user interface history 436, a visible frame 430 and a hidden frame 432.

The cache 434 may be utilized by the programmatic client 18 to store and retrieve static user interfaces (e.g., hidden user interfaces 425, 427, 429) for the purpose of minimizing the delay between a request for a static user interface and an update of the display. Accordingly, the cache 434 may be utilized to retrieve the static user interface instead of the application server 28.

The user interface history 436 includes frame 438 and URL 431 pairs that may be stored by the programmatic client 18 to record user interfaces that have been displayed in the respective visible and hidden frames 430, 432. For example, in one embodiment, the user interface history 436 may operate like a stack whereby the programmatic client 18 may push a frame 438 and URL 431 pair onto the stack responsive to the user requesting a user interface (e.g., corresponding to the URL 431) to be displayed in the frame 438 (e.g., visible frame 430, hidden frame 432, etc.). Conversely, the programmatic client 18 may pop one or more frame 438 and URL 431 pairs off the stack responsive to the user selecting the back button, the programmatic client 18 redisplaying the previous user interface in the designated frame. Accordingly, the user interface history 436 may operate as a first-in last-out buffer thereby providing a mechanism that preserves the order of user interfaces selected by the user and enabling the user to review the user interfaces in backwards order responsive to user repeatedly selecting the back button 405.

The visible frame 430 and hidden frame 432 include programmatic client visible and hidden frame statuses 435, 437, visible and hidden frame objects 443, 445, client application program visible and hidden frame statuses 439, 441, the visible user interfaces 426, 466, 492 and the hidden user interfaces 425, 427, 429.

The programmatic client visible and hidden frame statuses 435, 437 respectively include URLs 447, 449. The programmatic client 18 may utilize the visible and hidden frame statuses 435, 437 to determine if the client application program 428 may have requested the programmatic client 18 to request a user interface from the application server 28 to be displayed in the respective frame 430, 432.

The visible and hidden frame objects 443, 445 each include URLs 451, 453 that may be monitored and updated by the programmatic client 18 and the client application program 428. The URLs 451, 453 indicate the requested or actual user interface displayed in the respective visible frames 430 and hidden frames 432.

The client application program visible and hidden frame statuses 439, 441 respectively include URLs 455, 467. The client application program 428 may utilize the visible and hidden frame statuses 439, 441 to determine if the programmatic client 18 may have updated the user interface associated with the respective visible frame 430 or hidden frame 432.

The visible user interfaces include the visible user interface 426, mode=Default, the visible user interface 466, mode=More, and the visible user interface 492, mode=All. The hidden user interfaces include the hidden user interface 425, mode=Default, the hidden user interface 427, mode=More, and the hidden user interface 429, mode=All.

The visible user interface 426 includes the client application program 428 and user interface elements 448 previously described. The user interface elements 448 may include graphics, text, or alphanumeric strings that may be displayed on the client machine 22 and when selected by the user may result in the communication of an event to the client application program 428. For example, client application program 428 may receive an event that triggers the generation and display of the visible user interface 466 or 492 responsive to the user selecting a "MORE" or "ALL" user interface element 448, respectively.

The programmatic client 18 monitors the back button 405 and the URLs 451, 453 associated with the respective visible and hidden frame objects 443, 445. The programmatic client 18 may respond to a selection of the back button 405 or a change in the URL 451, 453. The programmatic client 18 may respond to the selection of the back button 405 by utilizing the user interface history 436 to retrieve the requested user interface from the cache 434 or the application server 28. The programmatic client 18 may respond to a change in the URL 451 by retrieving the visible user interface identified by the URL 451 including the visible user interface 492, mode=Default. The programmatic client 18 may respond to a change in the URL 453 by retrieving the hidden user interface identified by the URL 453 including the hidden user interface 425, mode=Default or the hidden user interface 427, mode=More or the hidden user interface 429, mode=All.

The client application program 428 responds to the user selecting the user interface elements 448 and monitors the URLs 441, 453 associated with the respective visible and hidden frame objects 443, 445. The client application program 428 may respond to the selection of a user interface element 448 by generating and displaying the visible user interface 426, mode=Default, or the visible user interface 466, mode=More, or the visible user interface 492, mode=All, in the visible frame 430 and by updating the corresponding URL 453 in the hidden frame object 445 thereby triggering the programmatic client to retrieve the corresponding requested hidden user interface 425, 427, or 429.

Figure 27:
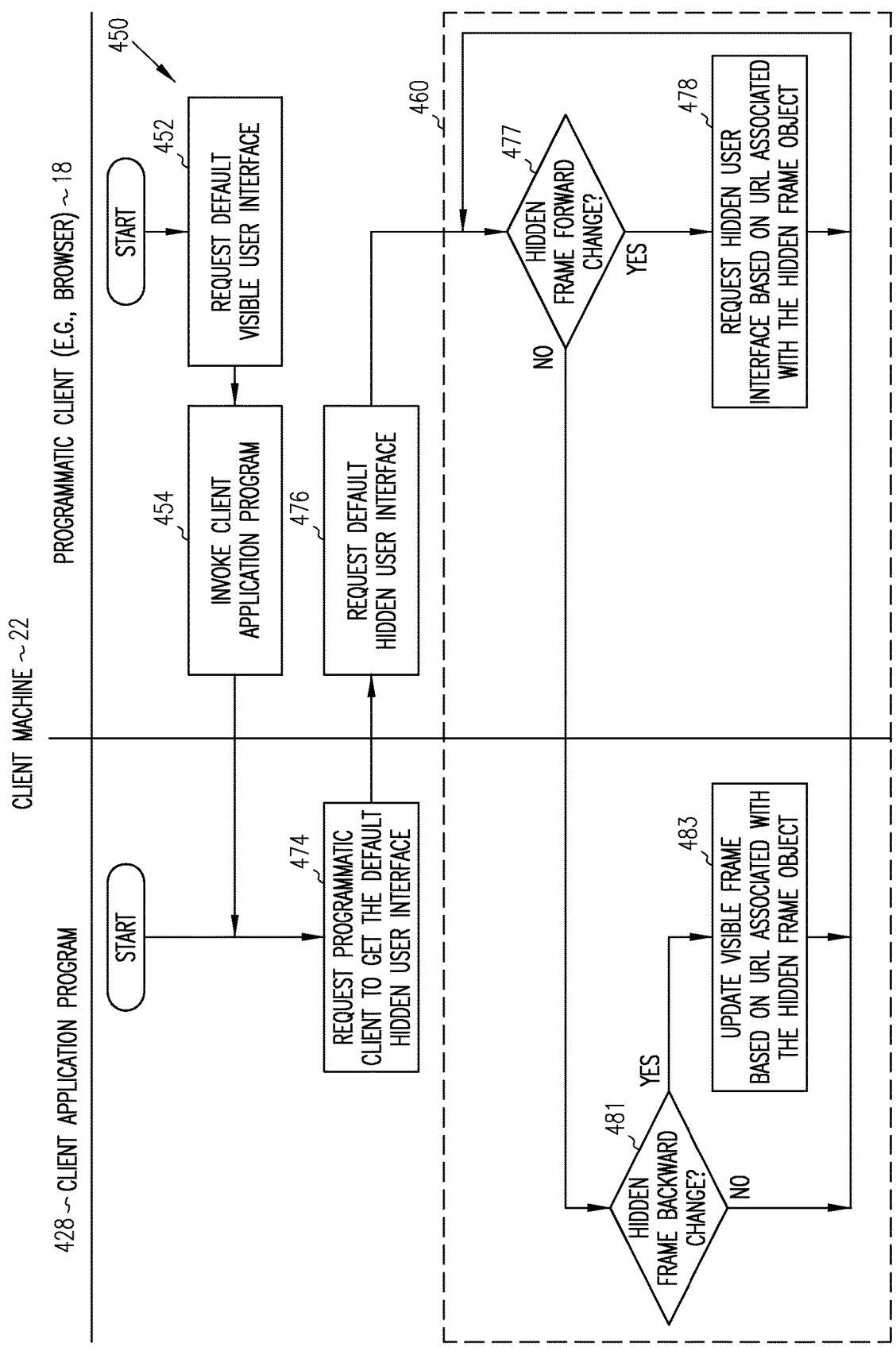
FIG. 27 is an interactive flow chart illustrating a method, according to an embodiment, to process a back button at a client machine.

FIG. 27 is an interactive flow chart illustrating a method 450, according to an embodiment, to process a back button at a client machine 22. Illustrated on the right are operations performed by the programmatic client 18 and illustrated on the left are operations performed by the client application program 428. The method 450 commences, at operation 452, at the client machine 22 with the programmatic client 18 (e.g., browser) responding to a user entering a keyword query by communicating a request to the application server 28 for the corresponding visible use interface 426. For example, the request, without keywords, may include a URL for a visible user interface (mode=Default).

Figure 28:
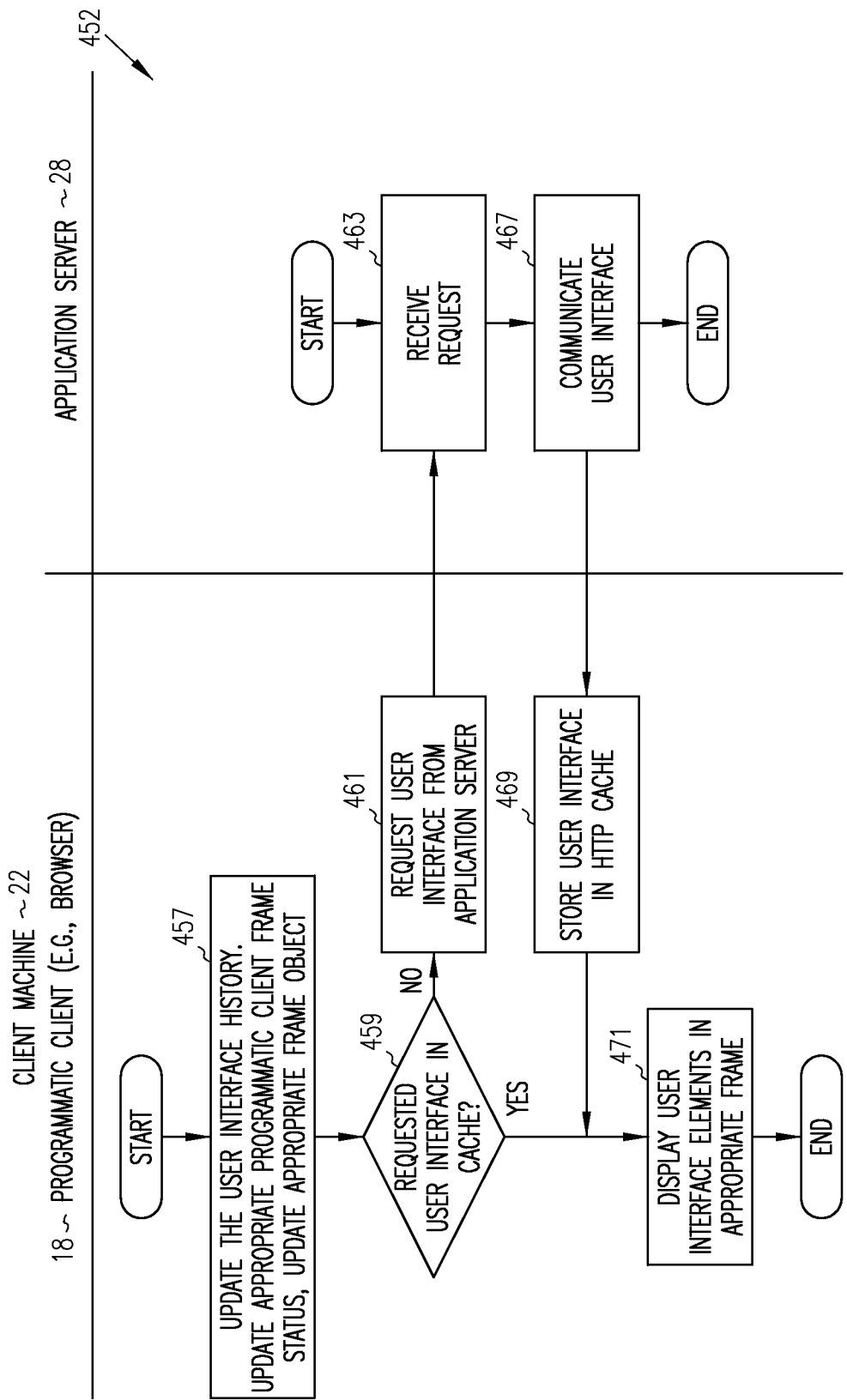
FIG. 28 is an interactive flow chart illustrating a method, according to an embodiment, to request a user interface.

FIG. 28 is an interactive flow chart illustrating a method 452, according to an embodiment, to request a user interface. Illustrated on the right are operations performed at the application server 28 and illustrated on the left are operations performed at the client machine 22. The method 452 commences, at operation 457, at the client machine 22 where the programmatic client 18 pushes an entry onto the top of the user interface history 436 by storing the requested URL 431 (e.g., URL for the visible user interface (MODE=Default)) and an associated frame 438 (e.g., visible). Further, the programmatic client 18 stores the URL for the visible user interface (MODE=Default) in the appropriate frame, which in this example is the visible frame 430 (e.g., URL 447, URL 451).

At decision operation 459, the programmatic client 18 determines if the requested user interface (e.g., corresponding to the URL) may be present in the cache 434. If the user interface is present in the cache 434, then a branch is made to operation 460. Otherwise a branch is made to operation 461.

At operation 461, the programmatic client 18 may communicate the request for the user interface to the application server 28.

At operation 463, at the application server 28, the receiving module 422 receives the request and generates the requested user interface or reads the requested user interface from a database 36.

At operation 467, the communication module 424 communicates the requested user interface to the client machine 22 where it may be stored in the cache 434 at operation 469.

At operation 471, the programmatic client 18 displays the user interface elements in the appropriate frame (e.g., hidden or visible) and the method 452 ends. In the present example, the programmatic client 18 displays the user interface elements 448 associated with the visible user interface 426 at the client machine 22. FIG. 38 illustrates the visible user interface 426 and browser controls 403, according to an embodiment. The browser controls 403 include a back button 405 that may be selected by the user to return to the previous user interface. The visible user interface 426 includes a concept query 111, browsing sets 303 and item found 472 including information (e.g., item listings 85), as previously described. In addition, each browsing set 303 includes browsing values 286 each of which may be associated with a count as previously described, and a more button 470 (e.g., "MORE"). The browsing values 286 may be selected to further narrow the search of items found 472. For example, selecting the price range $30.00-$40.00 may result in finding items that match the concept query (e.g., Color—Black, Brand—Nike, Size—8) in the selected price range (Price—$30.00-$40.00). The more button 470 may be selected by a user to display additional browsing values 286 with regard to a particular browsing set 303 (e.g., TOE TYPE, SHOE STYLE, PRICE RANGE).

Returning to FIG. 27, at the client machine 22, at operation 454, the programmatic client 18 invokes the client application program 428 (e.g., script).

At operation 474, the client application program 428 communicates a request to the programmatic client 18 to request the hidden user interface 425. For example, the request may include a URL for a hidden user interface (mode=Default).

Next, the client application program 428 stores the above described URL in the URL 455 of the client application program visible frame status 439.

At operation 476, the programmatic client 18 requests the hidden user interface 425 by communicating the above described URL to the application server 28. For example, the method 452 may be utilized as previously described. Accordingly, after retrieval of the hidden user interface 425 the visible and hidden frame statuses 435, 437, the visible and hidden frame objects 443, 445, and the visible and hidden frame statuses 439, 441 each include a URL designating the "DEFAULT" mode.

At the operations 460, the client applications program 428 and the programmatic client 18 monitor the URLs 451, 453 associated with the respective visible and hidden frame objects 443, 445; however, the monitoring may be preempted by user selections at the client machine 22.

FIG. 29A illustrate a method 490, according to an embodiment, to process a user selection of the "more" user interface element 448. The method 490 commences at the client machine 22, at operation 465, with the user selecting the "MORE" button 470 associated with the "Price Range" browsing set 303 on the user interface 426. In response, the client application program 428 generates and displays the visible user interface 466 (e.g., Mode=MORE). It should be noted that the client application program 428 generates and displays the visible user interface 466 without accessing the application server 28 or the cache 434.

FIG. 39 illustrates a visible user interface 466 and browser controls 403, according to an embodiment. The browser controls 403 include a back button 405. The visible user interface 466 includes a concept query 111, a single browsing set 303 associated with "Price Range" including additional (e.g., "MORE") browsing values 286 and items found 472 that includes information (e.g., item listings 85). Each browsing value 286 may be associated with a check box 468 and a count. The user may select one or more check boxes 468 thereby further narrowing the search for information (e.g., item listings 85). For example, the user may select the check box 468 associated with the price range $5.00-$10.00 and the check box 468 associated with the price range $35.00-$40.00. Accordingly, the search for information (e.g., item listings 85) may include the following search criteria "color=black" and "brand=Nike" and "size=8" and ((price range=$5.00-$10.00) or (price range=$35.00-$40.00)).

Returning to FIG. 29A, at operation 474, the client application program 428 updates the URL 453 associated with the hidden frame object 445 and the URL 467 associated with the client application program hidden frame status 441 and the process ends. For example, the client application program 428 may store a URL for a hidden user interface (mode=More) in the URLs 453, 467.

Returning to FIG. 27, at the client machine 22, at decision operation 477, the programmatic client 18 determines if there has been a hidden frame 432 forward change. For example, the programmatic client 18 may compare the URL 449 associated with the programmatic client hidden frame status 437 with the URL 453 associated with the hidden frame object 445 to determine if the client application program 428 may be requesting a forward change of the hidden frame 432. If the URL 449 is different from the URL 453, then the client application program 428 may be requesting a forward change of the user interface associated with the hidden frame 432 and a branch is made to operation 478. Otherwise a branch is made to decision operation 481.

At operation 478, the programmatic client 18 requests the user interface identified with the URL 453 associated with the hidden frame object 445. For example, the programmatic client may utilize the method 452, as previously described on FIG. 28. Accordingly, the user does not perceive any change to the display at the client machine 22 because the hidden frame 432 does not include displayable user interface elements.

FIG. 29B illustrate a method 491, according to an embodiment, to process a user selection of the "ALL" user interface element 448. The method 491 commences at the client machine 22, at operation 480, with the user selecting the "ALL" button 473 on the visible user interface 466. In response, the client application program 428 generates and displays the visible user interface 492 without accessing the application server 28 or the cache 434.

Figure 40:
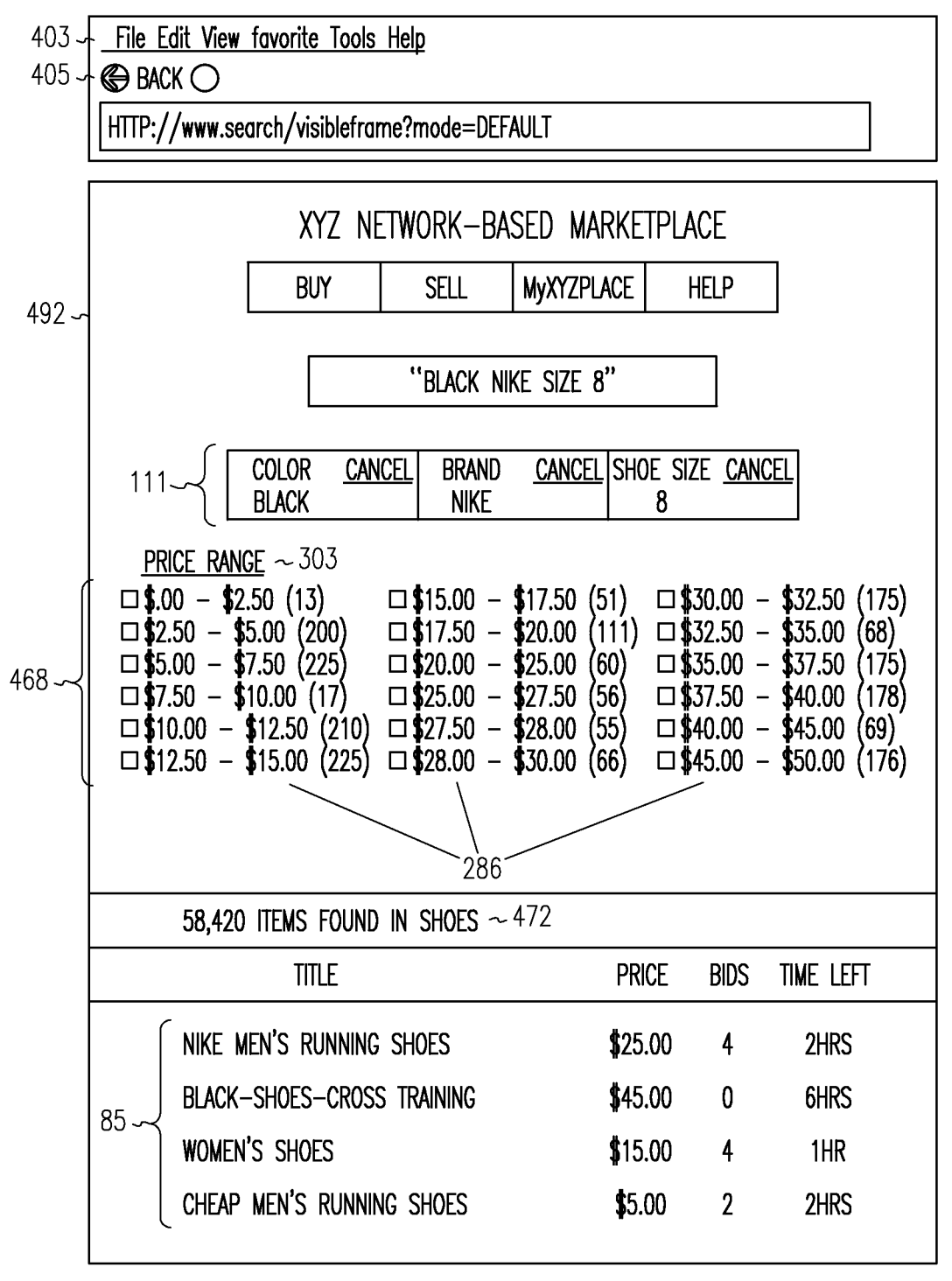

FIG. 40 illustrates a visible user interface 492 and browser controls 403, according to an embodiment. The browser controls 403 include a back button 405. The visible user interface 492 includes the concept query 111, the browsing set 303 associated with "Price Range", and the items found 472. The browsing set 303 includes "ALL" browsing values 286 associated with "Price Range." Each browsing value 286 may be associated with a check box 468 and a count. The user may select one or more check boxes 468 thereby further narrowing the search for the items found 472.

Returning to FIG. 29B, at operation 484, the client application program 428 updates the URL 453 associated with the hidden frame object 445 and the URL 467 associated with the client application program hidden frame status 441 and the process ends. For example, the client application program 428 may store a URL for a hidden user interface (mode=All) in the URLs 453, 467.

Returning to FIG. 27, at the client machine 22, at operation 477, the programmatic client 18 determines if there has been a forward change of the URL 453 associated with the hidden frame object 445, as previously described. If the programmatic client 18 determines there has been a forward change of the URL 453, then a branch is made to operation 478. Otherwise a branch is made to decision operation 481.

At operation 478, the programmatic client 18, requests the hidden user interface 229 based on the URL stored in the URL 453 associated with hidden frame object 445. For example, the programmatic client 18 may utilize the method 452, as previously described on FIG. 28.

FIG. 29C illustrate a method 462, according to an embodiment, to process a user selection of the back button 405. The method 462 commences at the client machine 22, at operation 486, with the user selecting the back button 470 from the browser control 403. In response, the programmatic client 18 may pop the top two entries off the user interface history 436, the second entry including the frame 438 and the URL 431 of the previous user interface displayed by the programmatic client 18. For example, the programmatic client 18 may determine that the previous user interface displayed in the hidden frame 432 may be identified with a URL for a hidden user interface (mode=More).

At operation 488, the programmatic client 18 requests the user interface 427 identified by the URL described above. For example, the method 452 may be utilized to request the user interface 427, as previously described.

Returning to FIG. 27, at the client machine 22, at decision operation 481, the client application program 428 determines if there has been a backward change of the URL 453 associated with the hidden frame object 445. For example, the client application program 428 may compare the URL 467 (e.g., associated with the client application program hidden frame status 441) with the URL 453 (e.g., associated with the hidden frame object 445) to determine if the programmatic client 18 processed a back button 405 request associated with the hidden frame 432. If the URL 467 is different from the URL 453 then a branch is made to operation 483. Otherwise a branch is made to decision operation 477.

At operation 483, the programmatic client 18, updates the visible frame 430 based on the user interface elements 448 identified by the URL 453. For example, a URL for a hidden user interface (Mode=More) in the URL 453 may signal the programmatic client 18 to update the visible frame 430 with the visible user interface 466 that corresponds to the "MORE" mode.

For example, the visible frame may be updated with the visible user interface 466 as illustrated on FIG. 39, as previously described.

Figure 41:
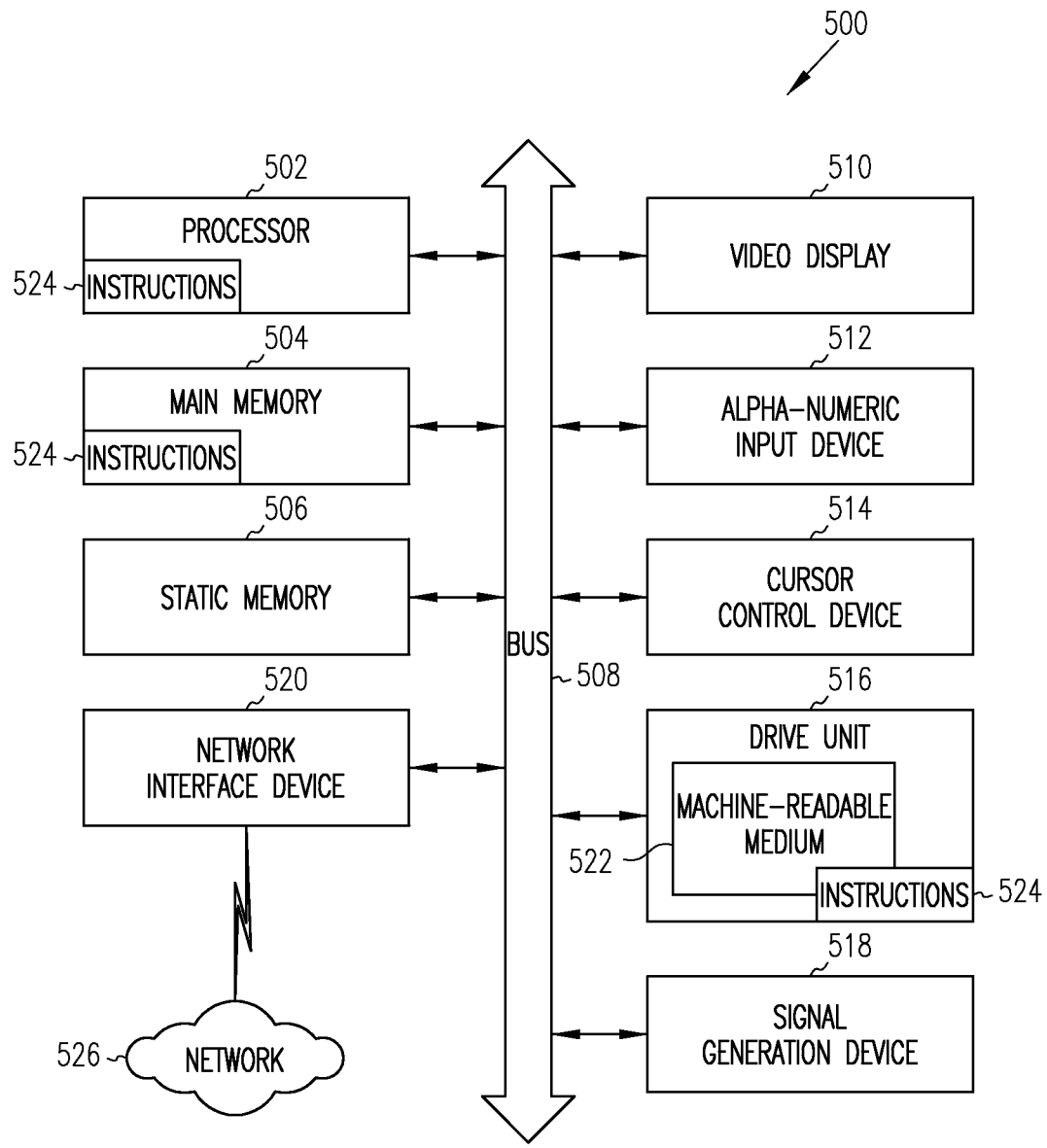
FIG. 41 illustrates a diagrammatic representation of a machine in the example form of a computer system within which a set of instructions, for causing the machine to perform any one or more of the methodologies discussed herein, may be executed.

FIG. 41 shows a diagrammatic representation of machine in the example form of a computer system 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU) a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions (e.g., software 524) embodying any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical media and magnetic media.

Thus, methods and systems to process a selection of a browser back button have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

I claim:
1. An apparatus comprising:
a processor and executable instructions accessible on a computer-readable medium that, when executed, cause the processor to perform operations comprising:
responsive to selection of a first element that is displayed in a browser as part of a first user interface, receiving, by the browser, a second user interface that includes a client application program and a first set of user interface elements which facilitate narrowing searches for listed items;

invoking, by the browser, the client application program to cause display of the second user interface in the browser;

responsive to selection of a second element of the first set of user interface elements, generating a third user interface by the client application program and causing display of the third user interface in the browser, the third user interface including a second set of user interface elements which facilitate narrowing the searches for the listed items;

identifying, by the client application program, an update of a hidden frame to include a user interface identifier that identifies the second user interface, the update being responsive to selection of a single back navigation element of the browser;

comparing, by the client application program, the user interface identifier and an additional user interface identifier that identifies the third user interface, the additional user interface identifier being included in the hidden frame; and responsive to a determination, by the client application program and based on the comparing, that the first user interface identifier indicates a backward change from the additional user interface identifier, displaying the second user interface in the browser by utilizing the user interface identifier from the hidden frame.

2. The apparatus of claim 1, wherein the first user interface is received from a cache of the apparatus.

3. The apparatus of claim 1, wherein the first user interface is received via a network from a remote server machine.

4. The apparatus of claim 1, wherein the client application program causes the browser to retrieve a hidden user interface that corresponds to the second user interface responsive to the determination that the first user interface indicates the backward change, the hidden user interface processed by the browser to enable the second user interface to be displayed in connection with the selection of the single back navigation element of the browser.

5. The apparatus of claim 4, wherein display of the hidden user interface does not include generation of visible user interface elements.

6. The apparatus of claim 1, wherein the first, second, and third user interfaces are allocated a visible area of display in the browser.

7. The apparatus of claim 1, wherein the first user interface identifier includes a universal resource locater.

8. The apparatus of claim 1, wherein the second set of user interface elements included in the third user interface includes at least one element of the first set of user interface elements and at least one additional element which facilitates narrowing searches for listed items.

9. The apparatus of claim 1, wherein elements of the first and second sets of user interface elements are individually selectable to specify a characteristic of the listed items to be returned in connection with a search.

10. A machine readable medium having no transitory signals and storing instructions that, when executed by at least one processor, cause the at least one processor to perform actions comprising:

responsive to selection of a first element that is displayed in a browser as part of a first user interface, receiving, by the browser, a second user interface that includes a client application program and a first set of user interface elements which facilitate narrowing searches for listed items;

invoking, by the browser, the client application program to cause display of the second user interface in the browser;

responsive to selection of a second element of the first set of user interface elements, generating a third user interface by the client application program and causing display of the third user interface in the browser, the third user interface including a second set of user interface elements which facilitate narrowing the searches for the listed items;

identifying, by the client application program, an update of a hidden frame to include a user interface identifier that identifies the second user interface, the update being responsive to selection of a single back navigation element of the browser;

comparing, by the client application program, the user interface identifier and an additional user interface identifier that identifies the third user interface, the additional user interface identifier being included in the hidden frame; and responsive to a determination, by the client application program and based on the comparing, that the first user interface identifier indicates a backward change from the additional user interface identifier, displaying the second user interface in the browser by utilizing the user interface identifier from the hidden frame.

11. The machine readable medium of claim 10, wherein elements of the first and second sets of user interface elements are individually selectable to specify a characteristic of the listed items to be returned in connection with a search.

12. A method comprising:

responsive to selection of a first element that is displayed in a browser as part of a first user interface, receiving, by the browser, a second user interface that includes a client application program and a first set of user interface elements which facilitate narrowing searches for listed items;

invoking, by the browser, the client application program to cause display of the second user interface in the browser;

responsive to selection of a second element of the first set of user interface elements, generating a third user interface by the client application program and causing display of the third user interface in the browser, the third user interface including a second set of user interface elements which facilitate narrowing the searches for the listed items;

identifying, by the client application program, an update of a hidden frame to include a user interface identifier that identifies the second user interface, the update being responsive to selection of a single back navigation element of the browser;

comparing, by the client application program, the user interface identifier and an additional user interface identifier that identifies the third user interface, the additional user interface identifier being included in the hidden frame; and responsive to a determination, by the client application program and based on the comparing, that the first user interface identifier indicates a backward change from the additional user interface identifier, displaying the second user interface in the browser by utilizing the user interface identifier from the hidden frame.

13. The method of claim 12, wherein the second element is displayed with an indication indicating that selection causes display of more of the user interface elements which facilitate narrowing the searches for listed items.

14. The method of claim 13, wherein the second set of user interface elements included in the third user interface includes at least one element of the first set of user interface elements and at least one additional element which facilitates narrowing searches for listed items.

15. The method of claim 12, further comprising causing, by the client application program, the browser to retrieve a hidden user interface that corresponds to the second user interface responsive to the determination that the first user interface indicates the backward change, the hidden user interface further being processed by the browser to enable the second user interface to be displayed in connection with the selection of the single back navigation element of the browser.

16. The method of claim 15, wherein display of the hidden user interface in the hidden frame does not include generation of visible user interface elements.

17. The method of claim 12, wherein the first, second, and third user interfaces are allocated a visible area of display in the browser.

18. The method of claim 12, wherein the first user interface identifier includes a universal resource locater.

19. The method of claim 12, wherein elements of the first and second sets of user interface elements are individually selectable to specify a characteristic of the listed items to be returned in connection with a search.

20. The method of claim 12, wherein the client application program includes at least one of an applet or a script.

* * * * *